(12) United States Patent
Greunke

(10) Patent No.: US 12,499,630 B2
(45) Date of Patent: Dec. 16, 2025

(54) MULTIMODAL PROCEDURAL GUIDANCE CONTENT CREATION AND CONVERSION METHODS AND SYSTEMS

(71) Applicant: THE UNITED STATES OF AMERICA, AS REPRESENTED BY THE SECRETARY OF THE NAVY, Arlington, VA (US)

(72) Inventor: Larry Clay Greunke, Seaside, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 365 days.

(21) Appl. No.: 18/203,495

(22) Filed: May 30, 2023

(65) Prior Publication Data

US 2023/0343044 A1    Oct. 26, 2023

Related U.S. Application Data

(63) Continuation-in-part of application No. 18/137,177, filed on Apr. 20, 2023.

(60) Provisional application No. 63/388,322, filed on Jul. 12, 2022, provisional application No. 63/346,783, filed on May 27, 2022, provisional application No. 63/333,053, filed on Apr. 20, 2022.

(51) Int. Cl.
| | | |
|---|---|---|
| G06T 19/00 | (2011.01) | |
| G06T 19/20 | (2011.01) | |
| G06F 111/10 | (2020.01) | |

(52) U.S. Cl.
CPC ............ G06T 19/006 (2013.01); G06T 19/20 (2013.01); *G06F 2111/10* (2020.01)

(58) Field of Classification Search
None
See application file for complete search history.

(56) References Cited

U.S. PATENT DOCUMENTS

| | | | |
|---|---|---|---|
| 2019/0147260 A1* | 5/2019 | May ...................... | B60W 50/14 382/103 |
| 2021/0407210 A1* | 12/2021 | Maggiore ............... | H04W 4/33 |
| 2023/0017202 A1* | 1/2023 | Zhang .................... | G06V 20/46 |
| 2023/0247168 A1* | 8/2023 | Eng ........................ | G06F 16/954 345/629 |

\* cited by examiner

*Primary Examiner* — Tapas Mazumder
(74) *Attorney, Agent, or Firm* — Heber Martin Carbajal Chavez; Scott Bell

(57) ABSTRACT

This disclosure and exemplary embodiments described herein provide methods and systems for multimodal procedural guidance content creation and conversion, however, it is to be understood that the scope of this disclosure is not limited to such application. One of the implementations described herein is related to the generation of content/instruction set that can be viewed in different modalities, including but not limited to mixed reality, VR, and audio text, however it is to be understood that the scope of this disclosure is not limited to such application.

17 Claims, 28 Drawing Sheets

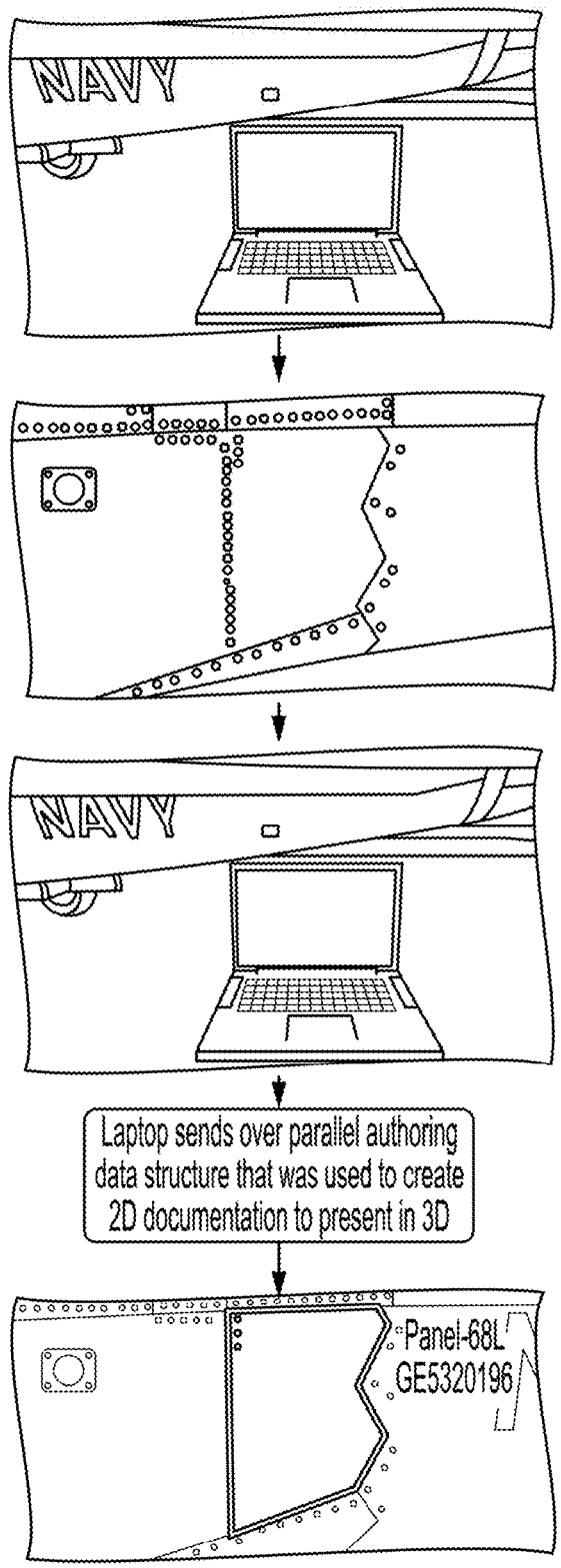

Example of 2D application with an AR companion Application

Maintainer reads work item for corrosion and reads discrepancy location

Maintainer is physically standing in front of aircraft and is not able to see or understand where corrosion discrepancy is.

Maintainer needs to get a better understanding and clicks button to "Show in AR"

Maintainer puts on AR glasses or phone using pass-through AR and is now able to see desired information that is on the 2D screen but in 3D.

Laptop sends over parallel authoring data structure that was used to create 2D documentation to present in 3D

FIG. 14

MULTIMODAL PROCEDURAL GUIDANCE CONTENT CREATION AND CONVERSION METHODS AND SYSTEMS

CROSS REFERENCE TO RELATED PATENT(S) AND APPLICATION(S)

This application is a continuation-in-part of U.S. patent application Ser. No. 18/137,177, filed Apr. 20, 2023, and entitled Multimodal Procedural Guidance Content Creation And Conversion Methods And Systems, which claims the benefit of U.S. Provisional Application No. 63/333,053, filed Apr. 20, 2022, and entitled Using Mixed-Reality for the Creation of in-situ CAD Models, U.S. Provisional Application No. 63/388,322, filed Jul. 12, 2022, and entitled Multimodal Creation and Editing for Parallel Content Authoring, and U.S. Provisional Application No. 63/346,783, filed May 27, 2022, and entitled Blockchain-Based Digital Twins and Traditional Document Conversion, which are hereby incorporated in its entirety by reference.

BACKGROUND

This disclosure, and the exemplary embodiments described herein, describe methods and systems using mixed-reality for the creation of in-situ cad models, however it is to be understood that the scope of this disclosure is not limited to such application.

Furthermore, this disclosure, and the exemplary embodiments described herein, describe methods and systems for multimodal procedural guidance content creation and conversion, however, it is to be understood that the scope of this disclosure is not limited to such application.

Furthermore, this disclosure, and the exemplary embodiments described herein, describe methods and systems for Blockchain-Based Digital Twins for Maintenance Systems, however, it is to be understood that the scope of this disclosure is not limited to such application.

Typically, virtual objects are replicated in mixed reality environments using specifications of the physical objects. Creating mixed reality experiences from computer-aided design (CAD) data, supplied by manufacturers, of physical objects may be correct but is not guaranteed. For example, equipment can be upgraded or modified so that CAD models are no longer accurate. Further, it can be expensive to obtain access to the CAD models in the first place. Another option is to reverse engineer the object; however, reverse engineering can also be quite costly. There are vast amounts of preexisting equipment where no 3D model exists to utilize and poses a barrier for mixed reality implementation. Further, in the cases where CAD models do exist, the models are often not immediately viable fora mixed reality experience—first requiring clean up, decimation, texturing, or other work.

Having cost prohibitive, suspect, or missing models have forced content developers to create mixed reality experiences with workflows relying on tool chains geared towards reverse engineering. Some workflows model via 3D scanning equipment creating point clouds where surfaces can be derived through algorithms; however, this is laborious and requires further contextual manipulation to be usable. Other workflows capture discrete points with a portable coordinate measuring machine.

The virtual objects can be used to guide a user through a workflow in the mixed reality environment; however, regardless of instructional delivery method (e.g., memory, book, computer screen, mixed reality experience, etc.), it can be difficult to objectivity assure that the human activity is performed according to the workflow. Most processes for quality assurance are management centric and inject significant human decisions into the process. Inspections of activity, audits of the inspection, sampling, random lot sampling are but a few. Every subjective act, like a signature that attests to the correctness or completeness of a task, adds risk (lost resources). Some companies are exploring techniques that record a person during the process (both with traditional cameras as well as spatial position) or take photographs at key points, but currently these are reviewed by humans for quality assurance and are therefore subjective or they are used for training purposes (expert showing a novice).

Some device designs attempt to incorporate connectivity to enhance the user's experience. For example, an electronically connected torque wrench can send torque values through the connection. However, there is no real time feedback, connectivity to procedure or dynamic adjustments (e.g., whether the tool calibrated and set to the proper setting for that particular activity), archival with location data, or human performance metrics that can make this process more objective.

Internet of things (IoT) sensors can be used to determine device states (e.g., temperature, pressure, connectivity, etc.), which is a good source of objective measure. However, the sensors does not focus on the granularity of the, for example, repair/assembly procedure. Some procedures can look and operate correctly according to IoT sensors while being constructed incorrectly (wrong width washer, wrong strength bolt—early fail states).

Factory quality assurance can employ automated techniques that are objective. For example, a laser sensor (or computer vision) that determines the size of a widget can reject one that is not the correct size. However, such sensors currently do not evaluate human actions as part of a quality assurance program.

INCORPORATION BY REFERENCE

The following publications are incorporated by reference in their entirety.

U.S. patent application Ser. No. 18/111,440, filed Feb. 17, 2023, and entitled Parallel Content Authoring Method and System for Procedural Guidance;

U.S. patent application Ser. No. 18/111,458, filed Feb. 17, 2023, and entitled Remote Expert Method and System Utilizing Quantitative Quality Assurance in Mixed Reality;

US Published Patent Application 2019/0139306, by Mark Billinski, et al., published May 9, 2019, and entitled Hybrid 2D/3D Data in a Virtual Environment, now U.S. Pat. No. 10,438,413.

US Published Patent Application 2021/0019947, by Larry Clay Greunke, et al., published Jun. 21, 2021, and entitled Creation Authoring Point Tool Utility To Recreate Equipment, now U.S. Pat. No. 11,062,523.

US Published Patent Application 2021/0118234, by Christopher James Angelopoulos, et al., published Apr. 22, 2021, and entitled Quantitative Quality Assurance For Mixed Reality, now U.S. Pat. No. 11,138,805.

BRIEF DESCRIPTION

In accordance with one embodiment of the present disclosure, disclosed is a method for creation of in-situ 3D CAD models of objects using a mixed reality system, the mixed reality system including a virtual reality system, an augmented reality system, and a mixed reality controller operatively associated with blending operational elements of both the virtual reality system and augmented reality system, the method comprising: using the mixed reality controller to define a 3D coordinate system frame of reference for a target physical object, the 3D coordinate system frame of reference including an initial point of the target physical object and three directional axes that are specified by a user of the mixed reality controller; using the mixed reality controller to define additional points of the target physical object; generating a virtual 3D model of the target physical object based on the coordinate system frame of reference, and the additional points; aligning the virtual 3D model of the target physical object with a visual representation of the target physical object using the augmented reality system, the augmented reality system displaying to the user the virtual 3D model of the target physical object superimposed with the visual representation of the target physical object; and the user refining the virtual 3D model of the target physical object to match the visual representation of the target physical object, wherein the mixed reality controller provides the user with a 3D object creation and placement interface to create and modify 3D objects associated with the virtual 3D model of the target physical object.

In accordance with another embodiment of the present disclosure, disclosed is a mixed reality system for the creation of in-situ 3D CAD models of objects, the mixed reality system comprising: a virtual reality system; an augmented reality system; and a mixed reality controller operatively associated with blending operational elements of both the virtual reality system and augmented reality system, and the mixed reality system performing a method comprising: using the mixed reality controller to define a 3D coordinate system frame of reference for a target physical object, the 3D coordinate system frame of reference including an initial point of the target physical object and three directional axes that are specified by a user of the mixed reality controller; using the mixed reality controller to define additional points of the target physical object; generating a virtual 3D model of the target physical object based on the coordinate system frame of reference, and the additional points; aligning the virtual 3D model of the target physical object with a visual representation of the target physical object using the augmented reality system, the augmented reality system displaying to the user the virtual 3D model of the target physical object superimposed with the visual representation of the target physical object; and the user refining the virtual 3D model of the target physical object to match the visual representation of the target physical object, wherein the mixed reality controller provides the user with a 3D object creation and placement interface to create and modify 3D objects associated with the virtual 3D model of the target physical object.

In accordance with another embodiment of the present disclosure, disclosed is a non-transitory computer-readable medium comprising executable instructions for causing a computer system to perform a non-transitory computer-readable medium comprising executable instructions for causing a computer system to perform a method for creation of in-situ 3D CAD models of objects using a mixed reality system, the mixed reality system including a virtual reality system, an augmented reality system, and a mixed reality controller operatively associated with blending operational elements of both the virtual reality system and augmented reality system, the method comprising: using the mixed reality controller to define a 3D coordinate system frame of reference for a target physical object, the 3D coordinate system frame of reference including an initial point of the target physical object and three directional axes that are specified by a user of the mixed reality controller; using the mixed reality controller to define additional points of the target physical object; generating a virtual 3D model of the target physical object based on the coordinate system frame of reference, and the additional points; aligning the virtual 3D model of the target physical object with a visual representation of the target physical object using the augmented reality system, the augmented reality system displaying to the user the virtual 3D model of the target physical object superimposed with the visual representation of the target physical object; and the user refining the virtual 3D model of the target physical object to match the visual representation of the target physical object, wherein the mixed reality controller provides the user with a 3D object creation and placement interface to create and modify 3D objects associated with the virtual 3D model of the target physical object.

In accordance with another embodiment of the present disclosure, disclosed is a method for converting unstructured and interactive modality-derived information into a data structure using a mixed reality system including a virtual reality system, an augmented reality system, and a mixed reality controller operatively associated with blending operational elements of both the virtual reality system and augmented reality system, the data structure configured for multimodal distribution and the data structure configured for parallel content authoring with a plurality of modalities associated with the multimodal distribution, the method comprising: a) acquiring source information by importing or opening one of a document file, a video file, a voice recording file in a conversion application, and an interactive modality data file including one or more of a virtual reality data file, an augmented reality data file, and a 2D virtual environment data file; b) identifying specific steps within a procedure included in the acquired source information through manual selection, programmatically, or by observing user interactions in an interactive modality; c) parsing the identified steps into distinct components using AI-based machine learning algorithms, advanced human toolsets, or a combination of both; d) categorizing the parsed components based on their characteristics, the characteristics including one or more of verbs, objects, tools used, and reference images, using AI-based classification methods; e) generating images or videos directly from one or both of source images or known information about a step and its context within the procedure; and f) storing the parsed and categorized components, and the generated images or videos, in a data structure designed for multimodal distribution.

In accordance with another embodiment of the present disclosure, disclosed is a mixed reality system for converting unstructured and interactive modality-derived information into a multimodal data structure configured for multimodal distribution and the data structure configured for parallel content authoring with a plurality of modalities associated with the multimodal distribution, the mixed reality system comprising: a virtual reality system; an augmented reality system; and a mixed reality controller operatively associated with blending operational elements of both the virtual reality system and augmented reality system, and the mixed reality system performing a method comprising: a) acquiring source information by importing or opening one of a document file, a video file, a voice recording file in a conversion application, and an interactive modality data file including one or more of a virtual reality data file, an augmented reality data file, and a 2D virtual environment data file; b) identifying specific steps within a procedure included in the acquired source information through manual selection, programmatically, or by observing user interactions in an interactive modality; c) parsing the identified steps into distinct components using AI-based machine learning algorithms, advanced human toolsets, or a combination of both; d) categorizing the parsed components based on their characteristics, the characteristics including one or more of verbs, objects, tools used, and reference images, using AI-based classification methods; e) generating images or videos directly from one or both of source images or known information about a step and its context within the procedure; and f) storing the parsed and categorized components, and the generated images or videos, in a data structure designed for multimodal distribution.

In accordance with another embodiment of the present disclosure, disclosed is a non-transitory computer-readable medium comprising executable instructions for causing a computer system to perform a method for converting unstructured and interactive modality-derived information into a data structure using a mixed reality system including a virtual reality system, an augmented reality system, and a mixed reality controller operatively associated with blending operational elements of both the virtual reality system and augmented reality system, the data structure configured for multimodal distribution and the data structure configured for parallel content authoring with a plurality of modalities associated with the multimodal distribution, the instructions when executed causing the computer system to: a) acquiring source information by importing or opening one of a document file, a video file, a voice recording file in a conversion application, and an interactive modality data file including one or more of a virtual reality data file, an augmented reality data file, and a 2D virtual environment data file; b) identifying specific steps within a procedure included in the acquired source information through manual selection, programmatically, or by observing user interactions in an interactive modality; c) parsing the identified steps into distinct components using AI-based machine learning algorithms, advanced human toolsets, or a combination of both; d) categorizing the parsed components based on their characteristics, the characteristics including one or more of verbs, objects, tools used, and reference images, using AI-based classification methods; e) generating images or videos directly from one or both of source images or known information about a step and its context within the procedure; and f) storing the parsed and categorized components, and the generated images or videos, in a data structure designed for multimodal distribution.

BRIEF DESCRIPTION OF THE DRAWINGS

For a more complete understanding of the present disclosure, reference is now made to the following descriptions taken in conjunction with the accompanying drawings.

FIG. 14 shows an example of having an interaction between a 2D application and an AR companion application utilizing a common data structure according to an exemplary embodiment of this disclosure.

DETAILED DESCRIPTION

Figure 1A:
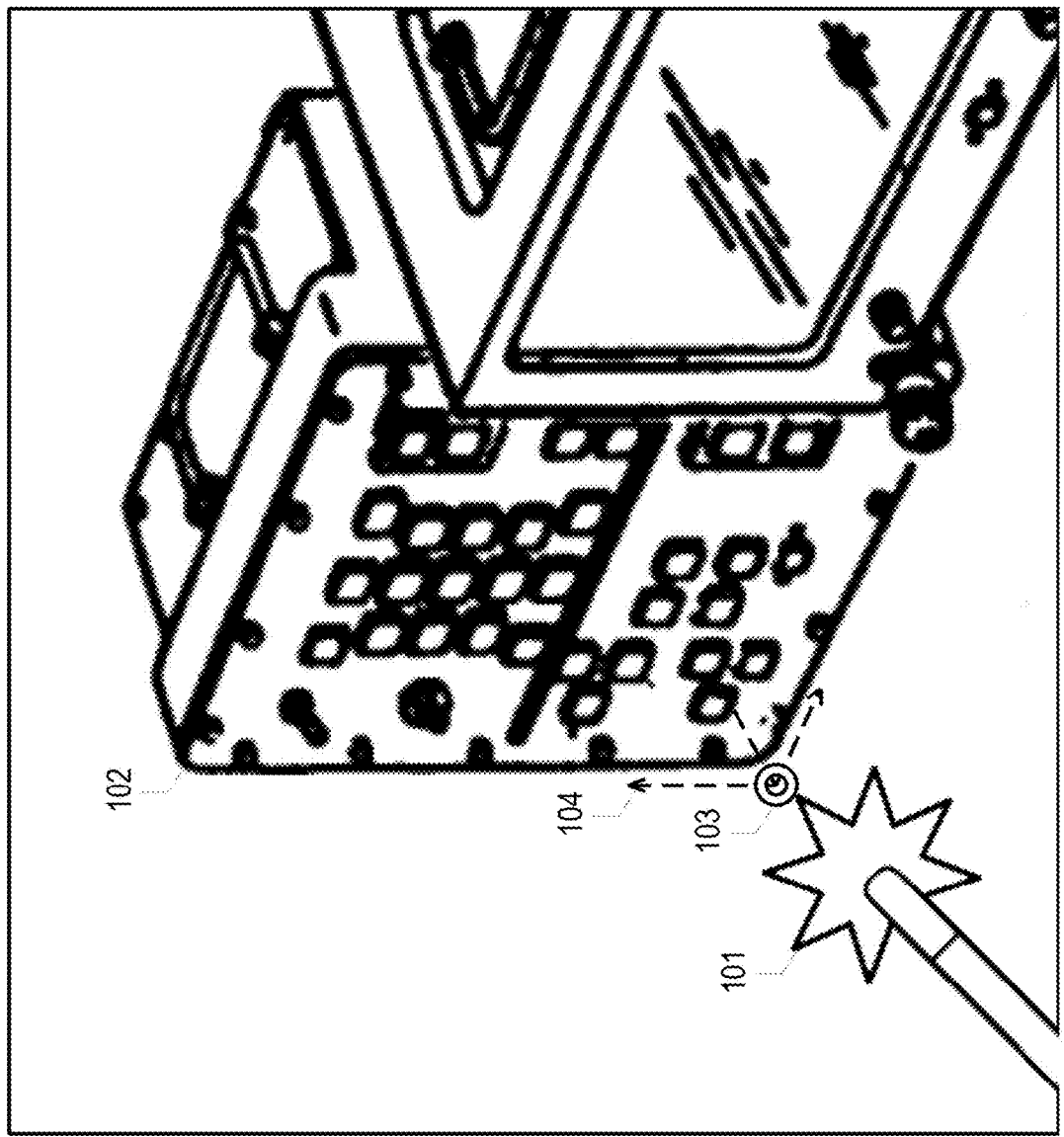
FIGS. 1A-1C illustrate positional data collection for a creation authoring point tool utility.

This disclosure and exemplary embodiments described herein provide methods and systems using mixed-reality for the creation of in-situ cad models, and methods and systems for multimodal procedural guidance content creation and conversion, however, it is to be understood that the scope of this disclosure is not limited to such application. The implementation described herein is related to the generation of content/instruction set that can be viewed in different modalities, including but not limited to mixed reality, VR, audio text, however it is to be understood that the scope of this disclosure is not limited to such application.

Initially, described immediately below, is a Creation Authoring Point Tool Utility/Quantitative Quality Assurance For Mixed Reality (See also U.S. Pat. No. 11,062,523 and see U.S. Pat. No. 11,138,805) as applied to the exemplary embodiments disclosed herein. This description provides some fundamental understanding of the Parallel Content Authoring Method and System for Procedural Guidance and Remote Expert Method and System further described below.

Viable mixed reality experiences, where the matching digital domain can be spatially and contextually overlaid within the real world, require known precise positional and dimensional information about objects in the physical environment. Acquiring the digitization of physical objects attributes (e.g., height, width, length) is the first challenge. Context should also be added to these models so that the user can be guided within the mixed reality environment. Once a 3D model exists, in any form, content producers adapt them (e.g., decimate, add context) to provide a key element within mixed reality experiences. These digitized objects along with their context enable operations like step by step instructions for fixing/maintenance of an item or detailing physical object placement within a space.

As operating environments become more complex, the need for objective measures of performance become critically important. Historically, quality assurance of human centric manual production relies on indirect human observation or process driven assurance programs. The subjective nature of quality assurance processes poses significant risk when repair, assembly, or human monitoring are required. A completed assembly or repair that works does not necessarily mean the process was complied with at an acceptable adherence to specification. Traditionally layered human inspection provides a second or third look to ensure the work meets specification. The subjectivity of the traditional process, in general, inserts uncertainty into any process that can transfer into the resulting quality assurance. Subjective quality assurance measures can eventually, and potentially spectacularly, fail to spotlight substandard performance.

Embodiments described herein relate to performing quantitative quality assurance in a mixed reality environment. In the embodiments, subtasks can be associated with human performance bounding, expected actions can be defined, and sensors can be used to add objectivity to metrics. Real time evaluation of indirect and direct measures can include machine learning for observing human performance where no credible performance metrics exist. Immediate feedback based on these metrics can be provided to the user. All appropriate human performance data, object recognitions, task data, etc. can be archived for both task quality assurance and for evaluating human performance. For example, this performance data can be used to perform targeted training or to evaluate performance for excellence awarding.

Figure 1B:
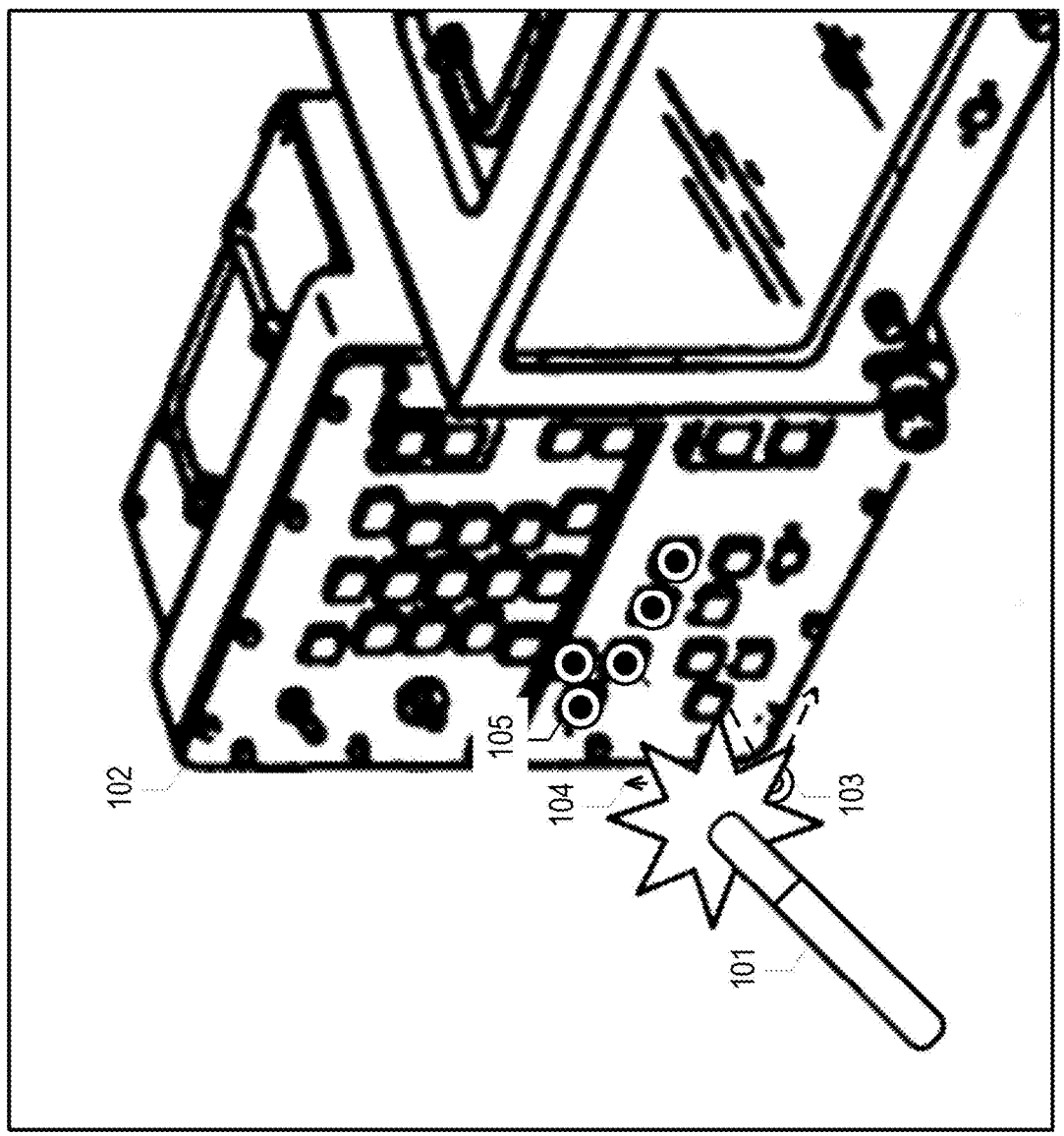
Figure 1C:
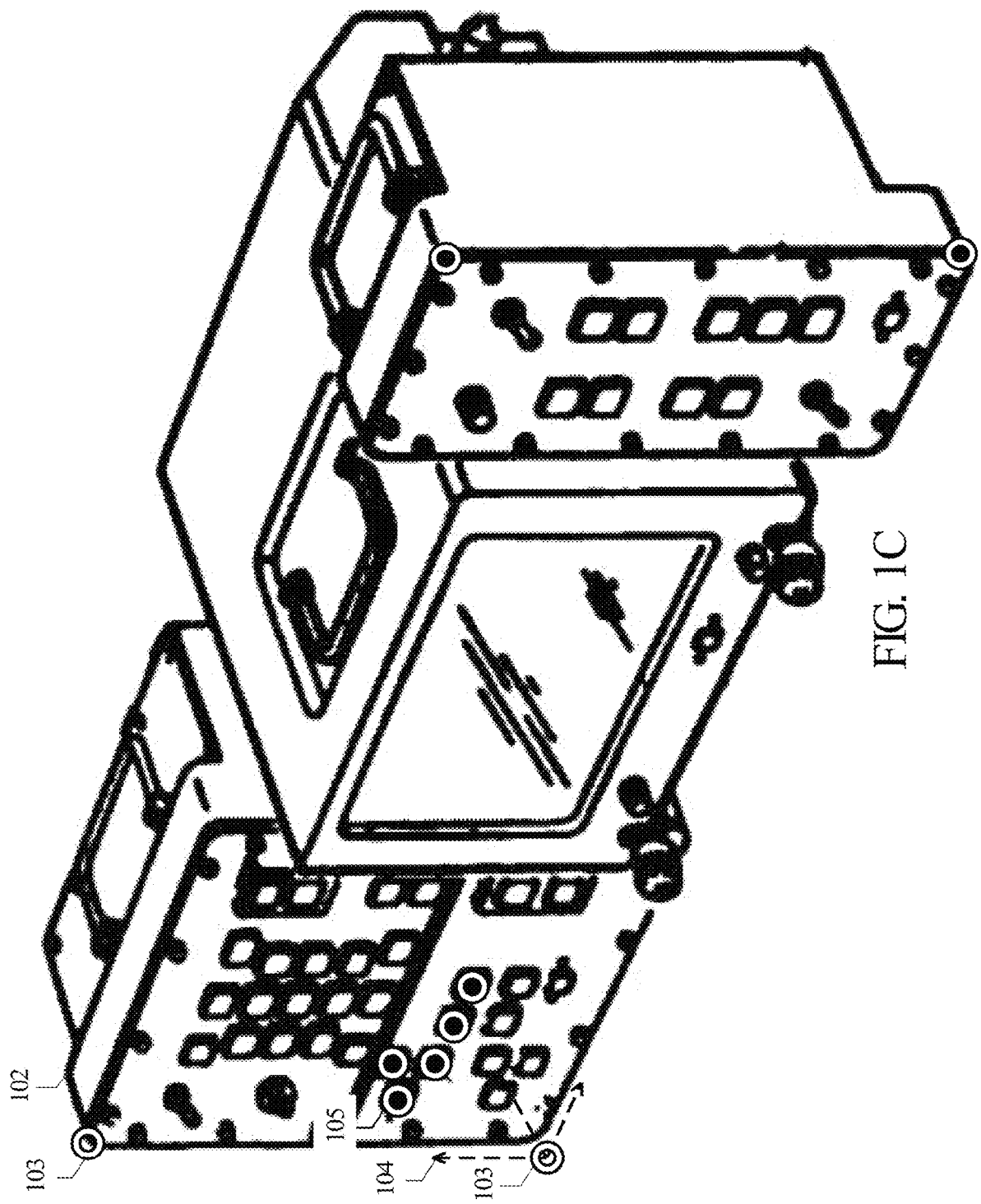

FIGS. 1A-1C illustrate a procedure for collecting positional data for a creation authoring point tool utility. Specifically, each of FIGS. 1A-1C shows the data collection at different stages as it is being used to generate a 3D model of a physical object for use within a mixed reality environment. Various embodiments may not include all the steps described below, may include additional steps, and may sequence the steps differently. Accordingly, the specific arrangement of steps described with respect to FIGS. 1A-1C should not be construed as limiting the scope of the creation authoring point tool utility.

FIG. 1A shows a mixed reality controller 101 that is being wielded by a user (not shown) to define a coordinate system frame of reference 103, 104 for a physical object 102. The mixed reality controller 101 is being used to position the coordinate system frame of reference 103, 104 on a corner of the physical object 102. The coordinate system frame of reference 103, 104 includes an initial object point 103 and three-dimensional directional axes 104. After the mixed reality controller 102 is used to position the initial object point 103, the direction of the three dimensional directional axes 104 can be modified to be in sync with the geometry of the physical object (e.g., aligned with the corner of a box-like physical object 102. The coordinate system frame of reference 103, 104 may be used as a reference point for any additional points specified by the mixed reality controller 101.

FIG. 1B shows the mixed reality controller 101 being used to define an interface element 105 in the mixed reality environment. Specifically, the user uses the mixed reality controller 101 to position the interface element 105 over a corresponding physical interface of the physical object 102. In this example, the user has defined five interface elements 105 that correspond to physical buttons on the physical object 102. Those skilled in the art will appreciate that the mixed reality controller 101 could be used to define any number of interface elements of various interface types (e.g., buttons, levers, switches, dials, etc.). As each interface element 105 is defined, its position is determined with respect to the coordinate system frame of reference 103, 104.

FIG. 1C shows point data specified by the user for a physical object 102. The point data for the physical object 102 includes four object points 103, one of which is a part of the coordinate system frame of reference 103, 104, and five interface elements 1105. Once submitted by the user, the point data can be processed to generate a 3D model (not shown) of the physical object 102. The 3D model can then be used to collect metadata and generate a workflow as described below.

Figure 2:
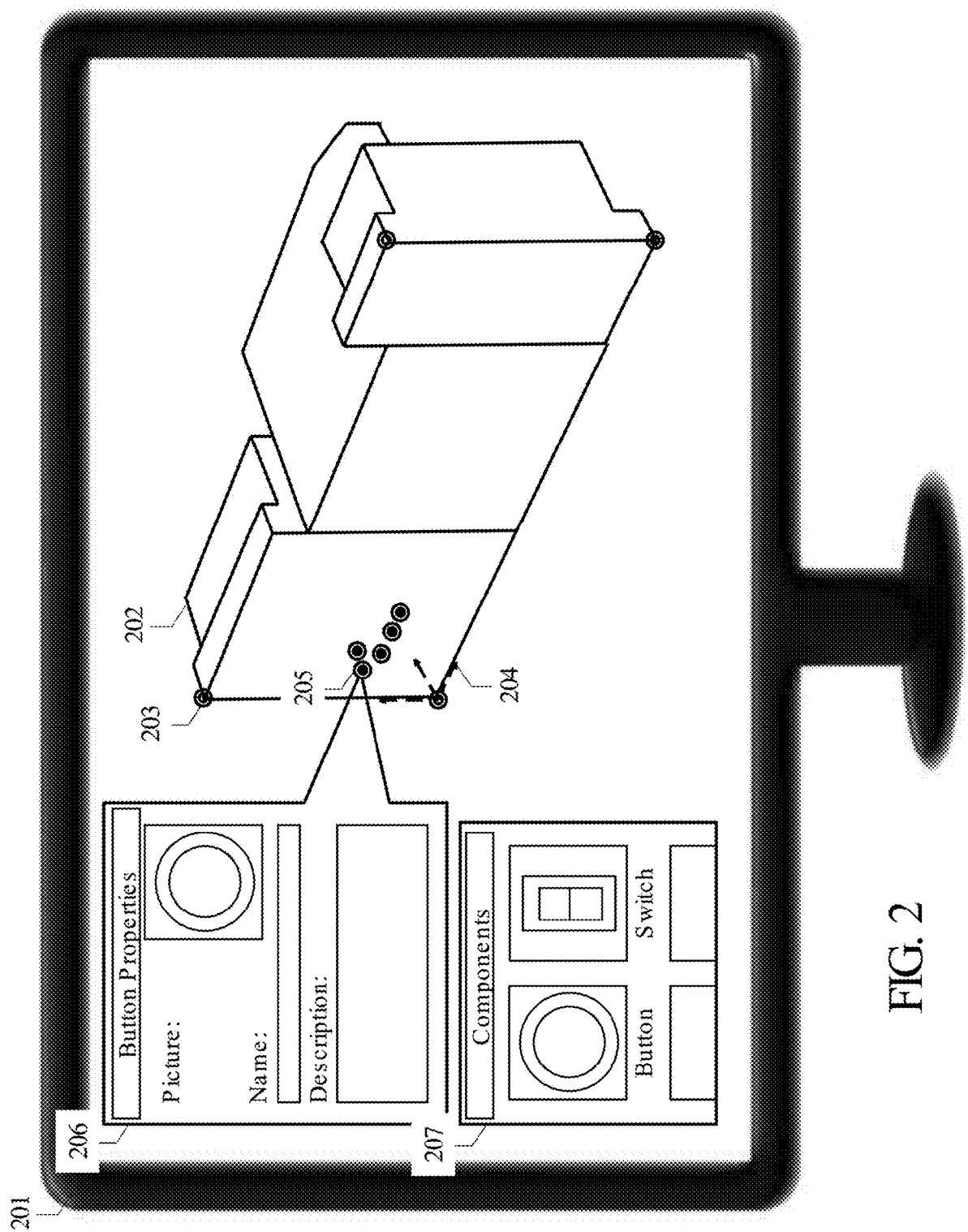
FIG. 2 shows an editor for collecting metadata for a creation authoring point tool utility.

FIG. 2 illustrates an editor 201 for collecting metadata for a creation authoring point tool utility. The editor 201 shows a 3D model 202 of a physical object that includes positional data 203, 204, 205 collected, for example, as described above with respect to FIGS. 2A-2C. The editor 201 allows a user to review the positional data for accuracy and to specify metadata for individual positional points in the 3D model 202.

When the user selects an interface element 205, an interface properties window 206 is displayed. The interface properties window 206 allows the user to specify metadata such as a picture, a name, a description, workflow information, etc. In this manner, the user may select each interface element 205 and specify the corresponding metadata in the interface properties window 206. In some cases, the metadata allows the interface element 205 to be used in workflows that describe how to operate the physical object in a mixed reality environment.

The editor 201 also includes a component type window 207 that allows the user to select the type of each interface element 205. In the example, the user can drag a component type from the window 207 and drop the selected type to a corresponding interface element 205 to set the interface type of the element 205.

The editor 201 can also allow the user to reposition object points 203, three dimensional directional axes 204, and interface elements 205. In this example, the user can reposition the positional data 203, 204, 205 by simply dragging it to a different location. The editor 201 can also allow the user to define workflows with the interface metadata.

In FIG. 2, the editor 201 is implemented as a standard user interface of a user computing device (e.g., laptop computer, desktop computer, tablet computer, etc.). In other embodiments, the editor could be implemented as a virtual interface of a virtual reality computing device. In these other embodiments, the user can interact with the 3D model 302 in a virtual environment interface that is similar to the editor 201.

Figure 3:
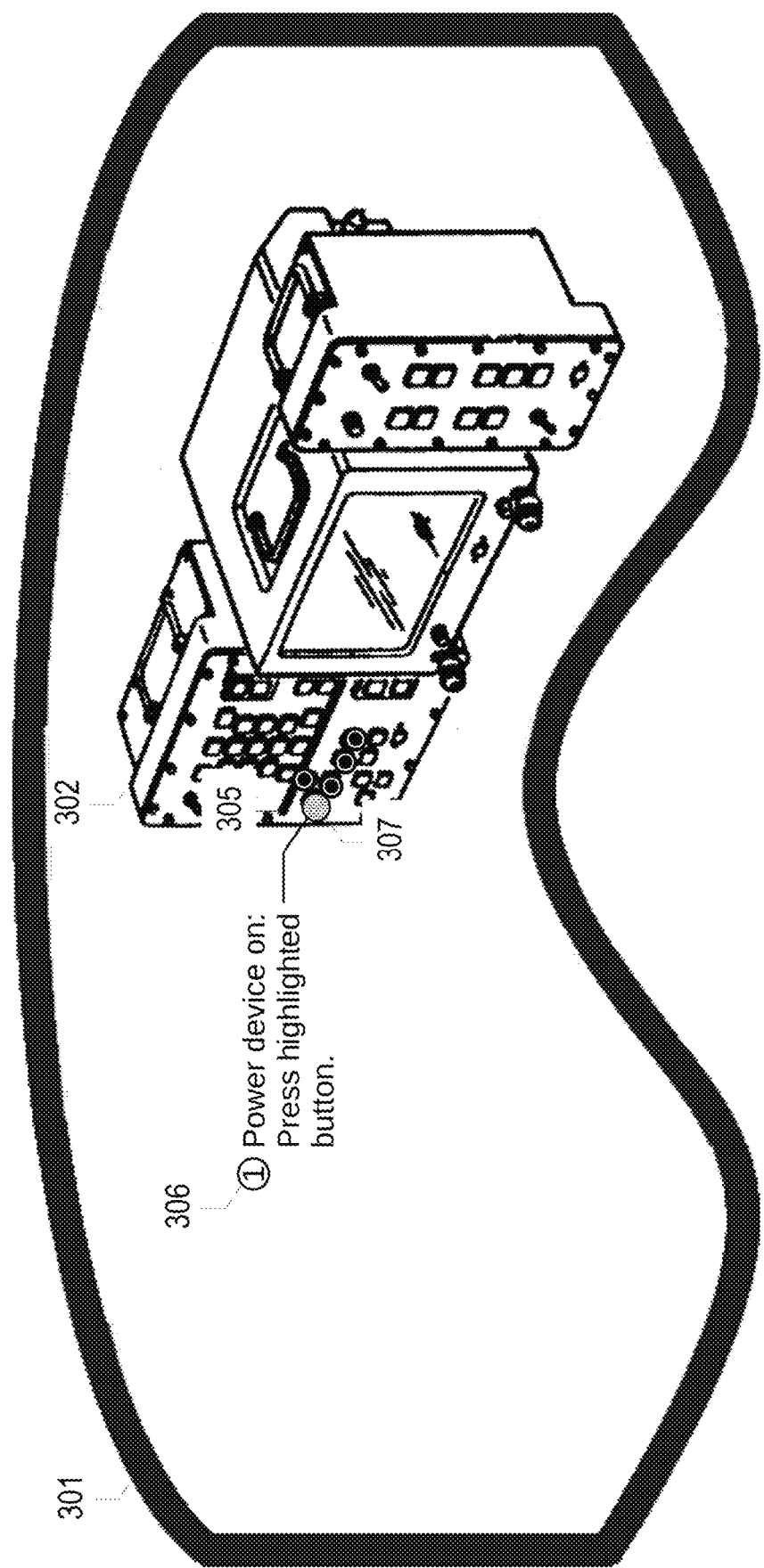
FIG. 3 shows a mixed reality environment as view through a virtual reality headset display.

FIG. 3 shows a mixed reality environment as view through a virtual reality headset display 301. In the display 301, the actual physical object 302 is overlaid with virtual representation of interface elements 305, workflow information 306, and a highlighted element 307. In a mixed reality environment, the overlaid virtual representation follows the physical object 302 as the user changes his view. The workflow information 306 can described an operation that the user should perform using the highlighted element 307.

The user can also use a mixed reality controller (not shown) to navigate through a wizard of the workflow. When the user completes a step of the workflow, he can use the controller to proceed to the next step in the workflow, where the workflow information 306 and highlighted element 307 are updated to provide instructions for the next interface element used in the next step. In this manner, the user can perform each step in the workflow until the workflow is completed. Because the 3D model of the physical object 302 is defined in reference to coordinate system frame of reference that is tied to a position on the physical object 302, the use can be guided through the workflow regardless of the actual location of the physical object 302 (i.e., the workflow guide still operates if the location of the physical object 302 is changed).

Figure 4:
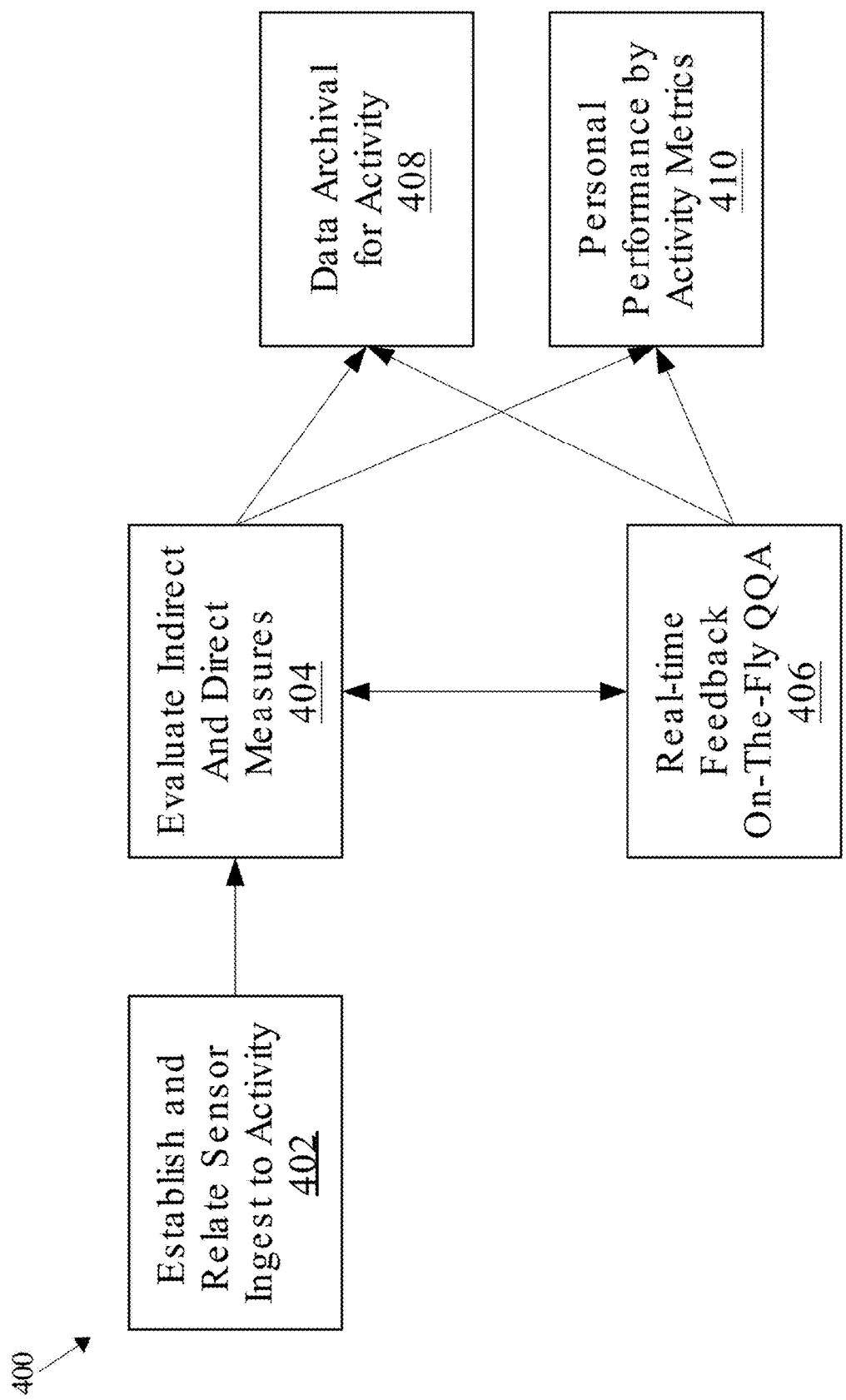
FIG. 4 shows a workflow for quantitative quality assurance in a mixed reality environment.

FIG. 4 shows a flowchart 400 for quantitative quality assurance in a mixed reality environment. As is the case with this and other flowcharts described herein, various embodiments may not include all of the steps described below, may include additional steps, and may sequence the steps differently. Accordingly, the specific arrangement of steps shown in FIG. 4 should not be construed as limiting the scope of quantitative quality assurance.

In block 402, sensor ingest is established and related to subtasks of a workflow. The workflow may include a number of subtasks that a user should perform in a mixed reality environment. Expected actions and performance bounds can be defined for each subtask, where sensor ingests can then be related to the performance bounds of each subtask. For example, a performance bound of a subtask can be the amount of time required for a user to complete the subtask, and the sensor ingest can be defined as the elapsed time until motion sensors in a virtual reality controller determine that the subtask is completed.

In block 404, indirect and direct measures of sensors are evaluated while the user is performing the workflow. As the user is performing subtasks, the virtual environment is aware of the state of the procedure (i.e., what subtask is currently being performed) and relevant movements by the user are being recorded and logged. These movements can be recorded by sensors as indirect and/or direct measures.

Indirect measures are sensing, metrics, and algorithms that feed both real time and archival quality assurance. For example, during an assembly task, indirect measures can include the location of the user's hands, detecting whether the proper hand physical action matches the expected action (e.g., modern phones can detect a 'shake' gesture vs. 'rotation' same logic could be to detect a turning action vs. pulling action with hand), and visual dwell time and focal distance, which can be used as a metric to understand completeness of an assembly task. In this example, an individual looking past an object cannot be inspecting that object for the purposes of completing an action in the workflow.

In another example during a repair task, indirect measures can include computer vision that recognizes the new subcomponent, old subcomponent, and the process of removal and replacement. The computer vision of the repair task can be performed regardless of human visual activity (objectively evaluating and documenting actions) or as a comparison to what the human is visually observing (e.g., 1) Why is the user focusing outside the expected work area? 2) Focal distance and sight line in expected parameters for expected dwell time, 3) User cannot monitor work visually due to obstruction). For this example, computer vision of imagery taken from a camera sensor can also process user's hand position. The user's hand position can be relevant to determine whether the subtask is performed correctly by the user. The headset (or sensor) can collect measures related to the location of the subcomponents, the user, the user's hand position, and the current step of the procedure, which are then used to determine an objective confidence score for the current subtask.

Direct measures incorporate feedback from the object or system where actions of the workflow are being performed. For example, a test bench can have a sensor to detect that a connection has been made with a wire. Other examples of direct measures include detectors or sensors for network connectivity, temperature, pressure, voltage, etc. In another example for network connectivity, the connector itself can be the sensor validator (i.e., the act of the connection with the connector becomes the validation).

In block 406, real-time feedback of quantitative quality assurance is provided to the user. For example, after the user completes a subtask in the workflow, a confidence score can be displayed for the user to show how well (e.g., compliance, speed, accuracy, etc.) the user performed. The confidence score can be determined based on the indirect and direct measures as described above in block 404.

In block 408, data metrics for the subtask's performance are archived. For example, the indirect and direct measurements along with the resulting confidence value can be stored in a database. These data metrics can be used to, for example, gauge the effectiveness of training, develop modifications to the workflow, etc.

In block 410, the personal performance of the user can be determined by the data metrics. For example, a report can be generated for the user that shows the confidence value for each subtask along with an overall grade to assess the completion of the workflow. Tracking the personal performance of the user can be used to build a personal profile that encourages the user to improve his performance in completing the workflow, assess the job performance of the user, etc.

Figure 5:
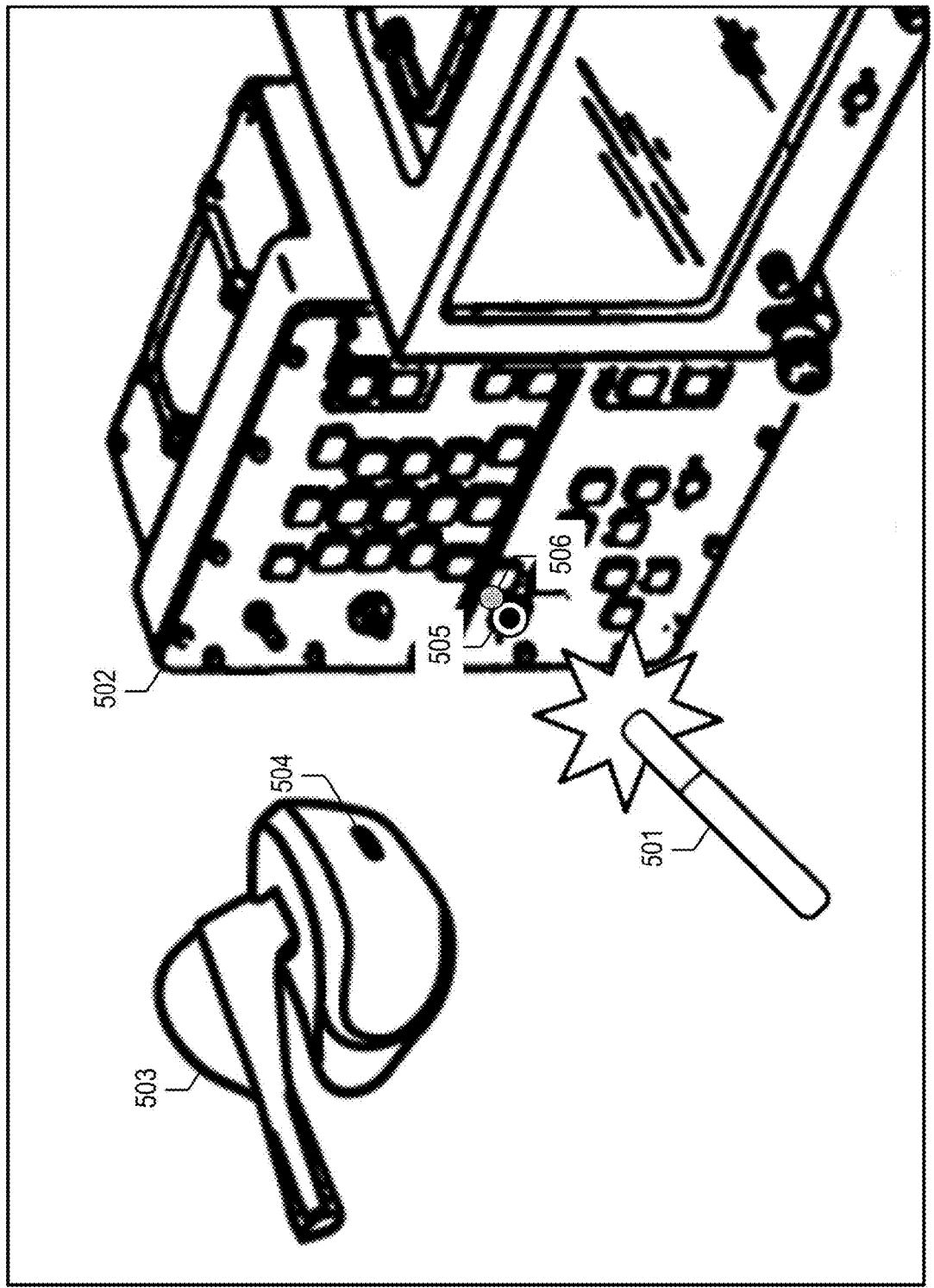
FIG. 5 illustrates quantitative quality assurance being performed in a mixed reality environment.

FIG. 5 illustrates quantitative quality assurance being performed in a mixed reality environment. A user's virtual headset 503 and virtual controller 501 are shown interacting with a piece of equipment 502. The user is working on a current subtask that involves a physical interface that is highlighted 505 in the mixed reality environment. As the user completes the current subtask, indirect and direct measurements are collected by the headset (camera/sensor set information—indirect: pose, hand position/movement relative to the user and workspace/object, user location relative to workspace/object, etc. vs. direct: computer vision identification of correct parts for example), 504 and the virtual controller 501, and direct measurements are collected by an interface sensor 506. The interface sensor 506 detects when the user interacts (e.g., flips a switch, pushes a button, completes a connection, etc.) with the physical interface, which is interpreted in the mixed reality environment as completion of the subtask. When the subtask is completed, the collected indirect and direct measurements can be used to determine a confidence value, which can be presented to the user on the virtual headset 503.

Parallel Content Authoring Method and System for Procedural Guidance.

Humans have effectively communicated procedural activity individually and at scale in two-dimensional (2D) instructions (digital, printed, or etched) for thousands of years. This pathway is suboptimal due to an assortment of factors, one of which is the double translation error of 3D actions into words or pictures from both the designer and the worker. Also, we naturally interact with our 3D environment in 3D. Instructions without translation errors maintaining their native domain reduce communication friction and misinterpretation presented with words and abstracted diagrams. Over the last 140 years, our ability to describe or present information has evolved far beyond a static 2D representation. Spatiotemporal continuity afforded by animation (I.e., film) is one evolution. For example, in a single continuous shot, a 3D scene is slowly revealed, enriching our understanding of a physical space. When a medium provides spatiotemporal enrichment, we refer to it as two and a half (2.5D), resulting in an enhanced 3D physical space awareness.

"YouTube"-style limited context ('flat') videos are ubiquitous for general population task preparation and knowledge transfer. Increasingly, stakeholders are requesting a better medium to transport and deploy knowledge in addition or in lieu of traditional text or hyperlinked documents. This is an admission of the failure of text and hyperlinked flat documentation to transfer 3D instructions that require a spatial understanding to complete. Viewing tasks performed through 2.5D projection provides an improvement over text. Mixed reality (augmented reality (AR) and virtual reality (VR)) are even more advantaged in this regard removing any medium translation by ensuring 3D tasks remain in 3D where 2.5D is still bound to medium translation and merely a temporal 2D representation.

Figure 6:
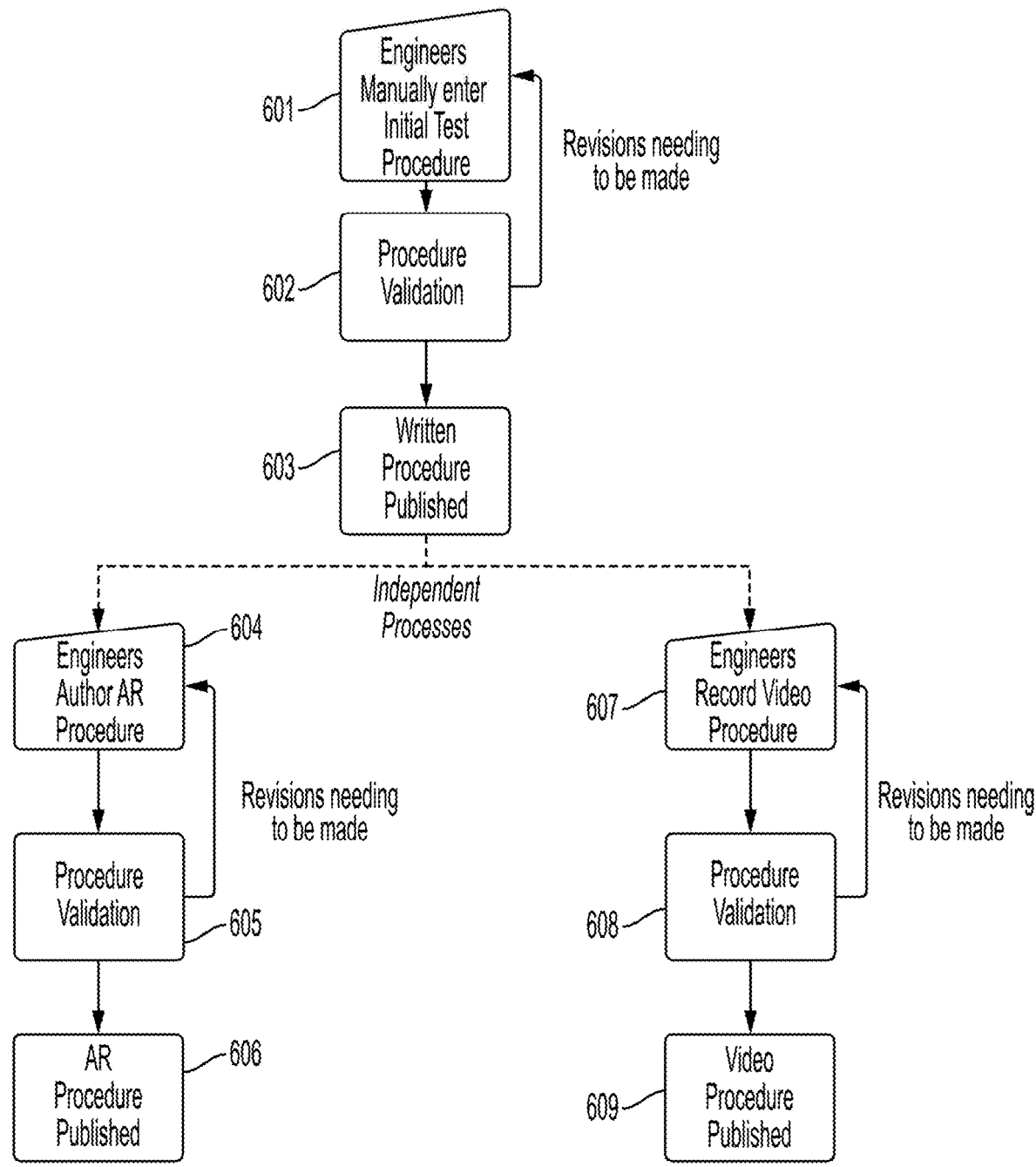
FIG. 6 shows a process for developing a procedure and converting that information into an augmented reality (AR) instruction and/or "YouTube" video instructions.

Currently, workflows for authoring content for a medium (e.g., augmented reality, paper, video, digital 2D document) that depicts 2D, 2.5D, or 3D information are independent of one another (FIG. 6 shows a process for developing a procedure and converting that information into an augmented reality (AR) instruction and/or "YouTube" video instructions.) For example, an engineer generates 2D instructions through software (e.g., an XML writer or word processing software), as a text document (e.g., digital or printed) remaining in that format for various purposes. 601, 602, 603 To translate that into another format (e.g., AR, video), a separate evolution creates content based on the original information, for example AR 604, 605, and 606; and video 607, 608 and 609. An array of problems emerges when attempting to scale this process. A prime growth and adoption inhibitor for 2.5D and 3D medium translation of the current process is unscalable resource demands. Another underlying driver for traditional 2D creation (e.g., word/text and diagram instructions) is current policies/processes require it and stakeholders recognize the increased resources 2.5D and 3D mediums demand.

Other limitations of the current process that affect scalability include: 1) Each written/authored procedure must be individually validated; 2) Keeping version control and making sure everything is 'up to date' with the wide array of formats is challenging. In the current process, changes would have to be manually cascaded and managed per instruction procedure. Meaning, once the original (usually 2D text document) is changed, another separate effort must be taken to alter and keep other content mediums up to date and correspond with each other (e.g., film a new video corresponding with the procedure); and 3) further, all these formats and files produced per procedure most be transmitted, stored, and managed.

Figure 7:
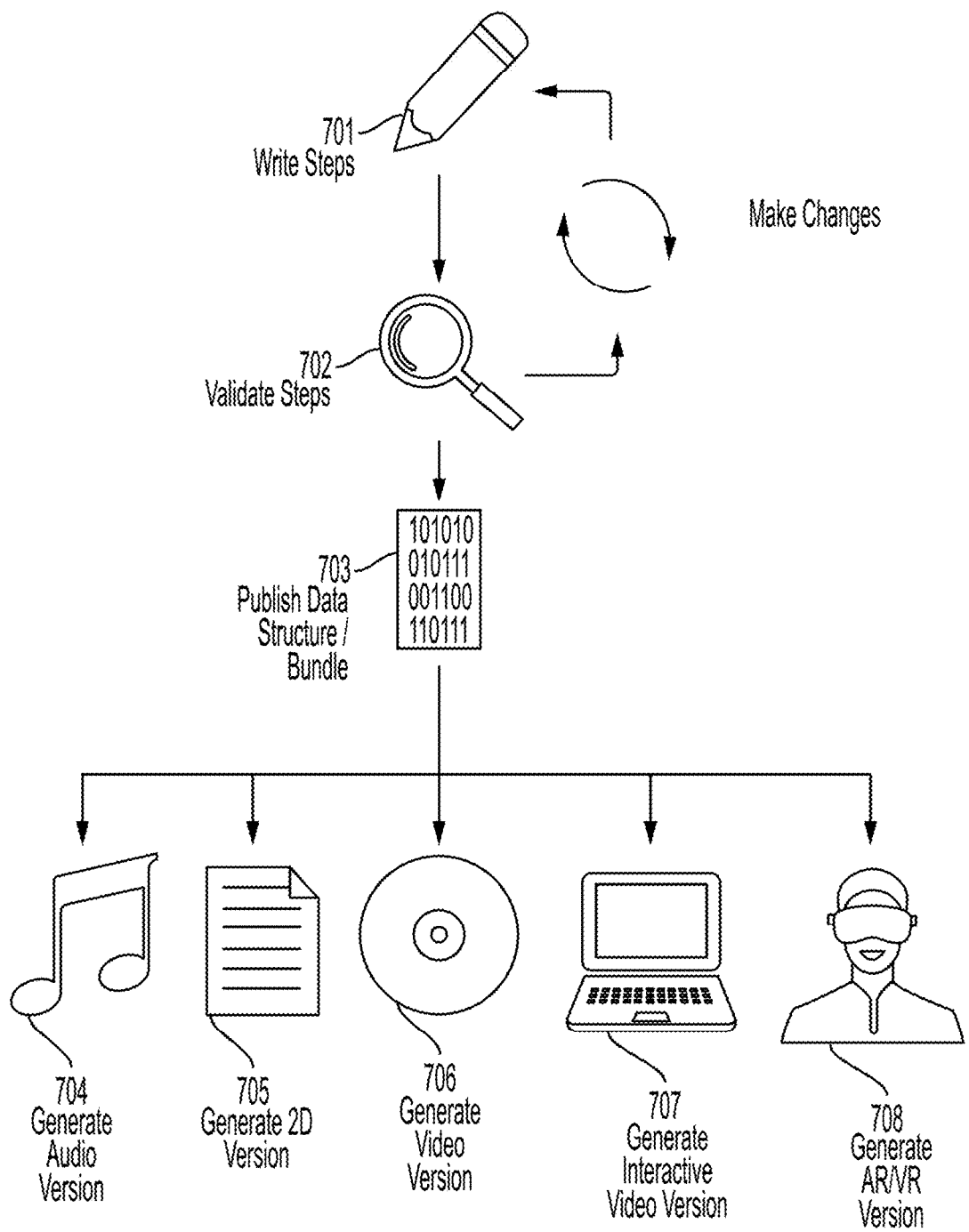
FIG. 7 is a high level process diagram showing a process for developing an instruction (e.g., queued annotations) set that can be viewed in different modalities, according to an exemplary embodiment of this disclosure.

With reference to FIG. 7 shown is a high level process diagram showing a process for developing an instruction set (e.g., queued annotations) that can be viewed in different modalities, according to an exemplary embodiment of this disclosure. This process including writing steps 701, validation steps 702 and a published data structure/bundle 703. FIG. 7 demonstrates a procedural authoring system to store bundled information in a medium that can be directly and automatically translated into all derivative mediums (2D, 2.5D, or 3D) 703 or translated into individual formats (e.g., PDF or .MP4) 704, 705, 706, 707 and 708. The bundle (or individual format) is easily distributed as needed at scale. By this method, for example, a 2D PDF file could be produced and used on its own or a 2D application could be created (e.g., showing text, images, and video) with an AR companion application (where they are able to be synchronized together), or a video could be made by itself. The original data bundle could be parsed later to create any derivative form either as a stand-alone or as a combination of end mediums (2D, 2.5D, 3D). Different approaches could be done to execute the experience on the end medium, for a non-limiting example, by having all the necessary information to run the procedure in bundle (e.g., code, model information, procedure information, other data), or having an end device contain a subset of that information already (e.g., model information, application to run procedure) and sending the updated procedure.

The current leading mindset translating content into a new medium is to run an application after the original documentation is established. That application can then parse the written (e.g., PDF, XML) documentation, matching words with parts and positions (creating structure linking words with objects post 2D source document creation), and generate other forms of AR content (e.g., linked "smart" diagrams, showing information step by step text information in AR). The described concept has structure in the authoring. The prior art depends on parsing human language (e.g., French, English) which migrates over time and has problems translating between languages, where the new art depends more on math (e.g., defining objects, coordinate systems, positions, rotations, translations/paths, state of the system) and is language agnostic, meaning it can translate between language easier (math is the universal language) by using language grammar rules for a given language. Of note, this prior art only discusses single translation paths vice simultaneous translations paths with multiple outputs. Three impactful drivers explain the non-scalability of single translation path method.

1) Most "2D" documentation/instructions do not keep track or label the positions of items in 3D space. When 3D AR or VR content is being created, the author must know 'where' to put the spatial content in relationship to the system (e.g., where a particular button is on a machine). Since 3D spatial information (meaningful to AR or VR applications) is not stored in traditional 2D documentation, it would have to be recovered from a CAD model (manually through an algorithm, or through an undefined process) or manually recreated from the original object.

2) Documentation is not reliability standardized sufficiently for a parsing application to generate/parse a wide range of publications. Further, Individual authors will describe processes and items differently according to their own style and preference. This means specialized parsers would have to be created. This could even be the case where tasks are effectively identical but stored within proprietary formats (e.g., Toyota vs. Ford documentation to change a tire).

3) Every time a change is made in the original procedure, derivative mediums based on that procedure would require another parsing, revalidation, and distribution. This overhead impedes the scalability of the current process and increases the likelihood of mismatching documentation.

Figure 8:
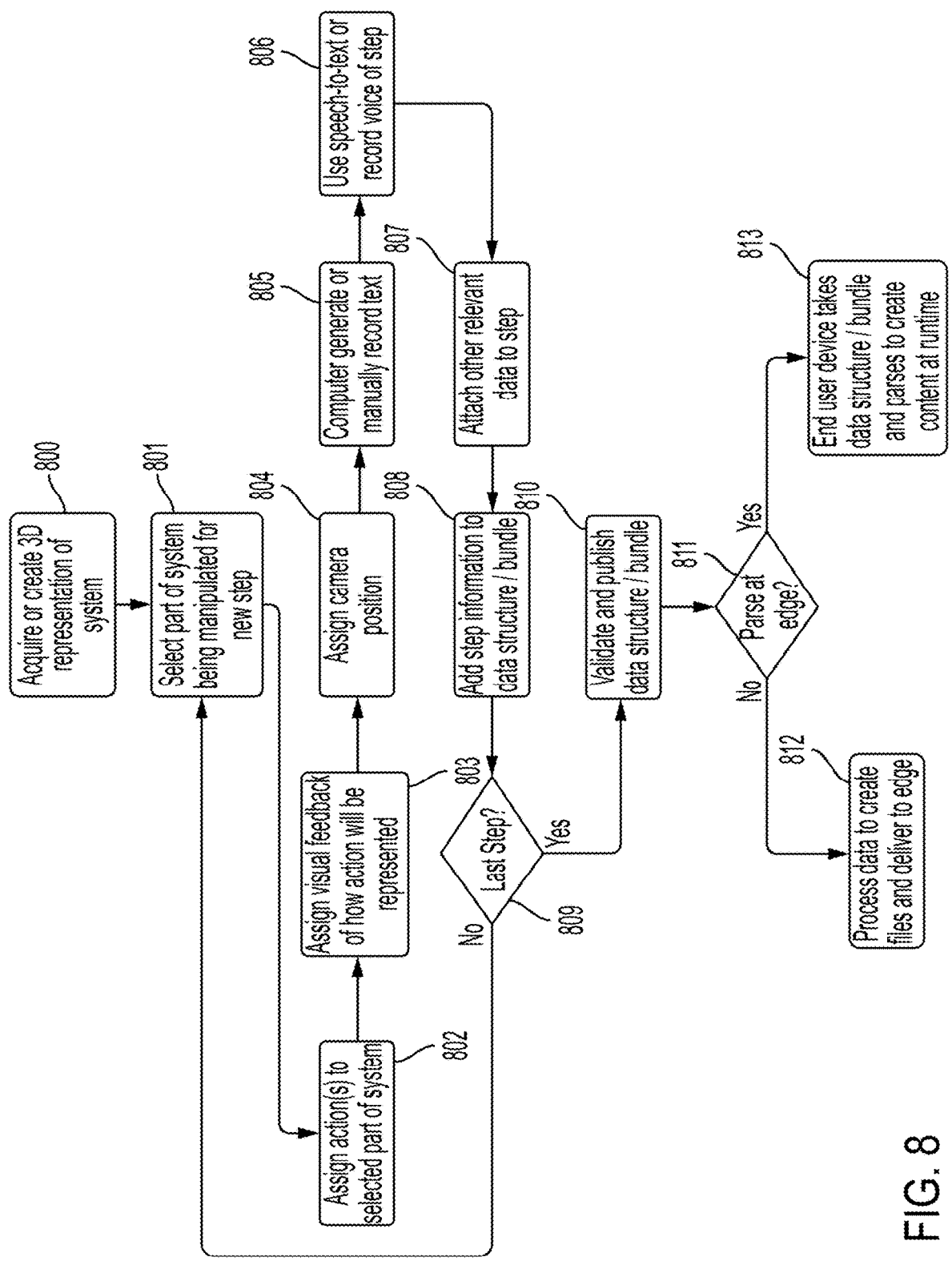
FIG. 8 shows an example workflow for Parallel Content Authoring according to an exemplary embodiment of this disclosure.

There are multiple forms that one could take to create the end result of this process. FIG. 8 shows an example workflow for Parallel Content Authoring according to an exemplary embodiment of this disclosure.

The process flow in FIG. 8 shows one potential route for generating the information required for to display the information in multiple modalities. Each portion of information that can be entered (e.g., position, text) represent modules. For other relevant data, pointed out in step 807, other modules of information can be added to the data structure in the future that will allow it to evolve with technology over time. A subset of modules in FIG. 8, for example, position along with other relevant data (e.g., corrosion type as shown in 13) can be used for documentation about a system and are inline with the Parallel Authoring concept. Regardless, the described approach authors structure (linking words and objects described in 3D) in the source documentation and modules described can both be considered optional (because some information like camera position can be calculated using other modules and/or may not be necessary for a given implementation) as well as non-limiting.

1) (800) Acquire or create a necessary 3D representation of a system to execute the desired procedure (creation of 3D representation can be performed during authoring). The 3D model can be acquired in different ways such as ingesting CAD data, hand modeling using Blender or Autodesk, in situ hand modeling (such as using individual points of interest (see Creation Authoring Point Tool Utility to Recreate Equipment (U.S. Pat. No. 11,062,523) and discussion above)), or in situ procedural modeling such as photogrammetry or simultaneous localization and mapping. For any procedure, only a subset of 3D position information of the system needs to be known (except in the simplest of systems) additional representations of a systems may help an end user better understand the spatial environment where the task takes place. The creation of the 3D representation may either be done before or during the authoring process. For the latter, the author(s) can be in front of the actual physical system and using mixed reality to facilitate recording of the procedure. This could be done by defining a point in an object's coordinate space and later replacing that with a more fully formed model). Of note, this can be a collaborative process with multiple authors. For example, one author can be in mixed reality marking objects in 3D space while the second author is on a PC putting in other details.

Figure 12:
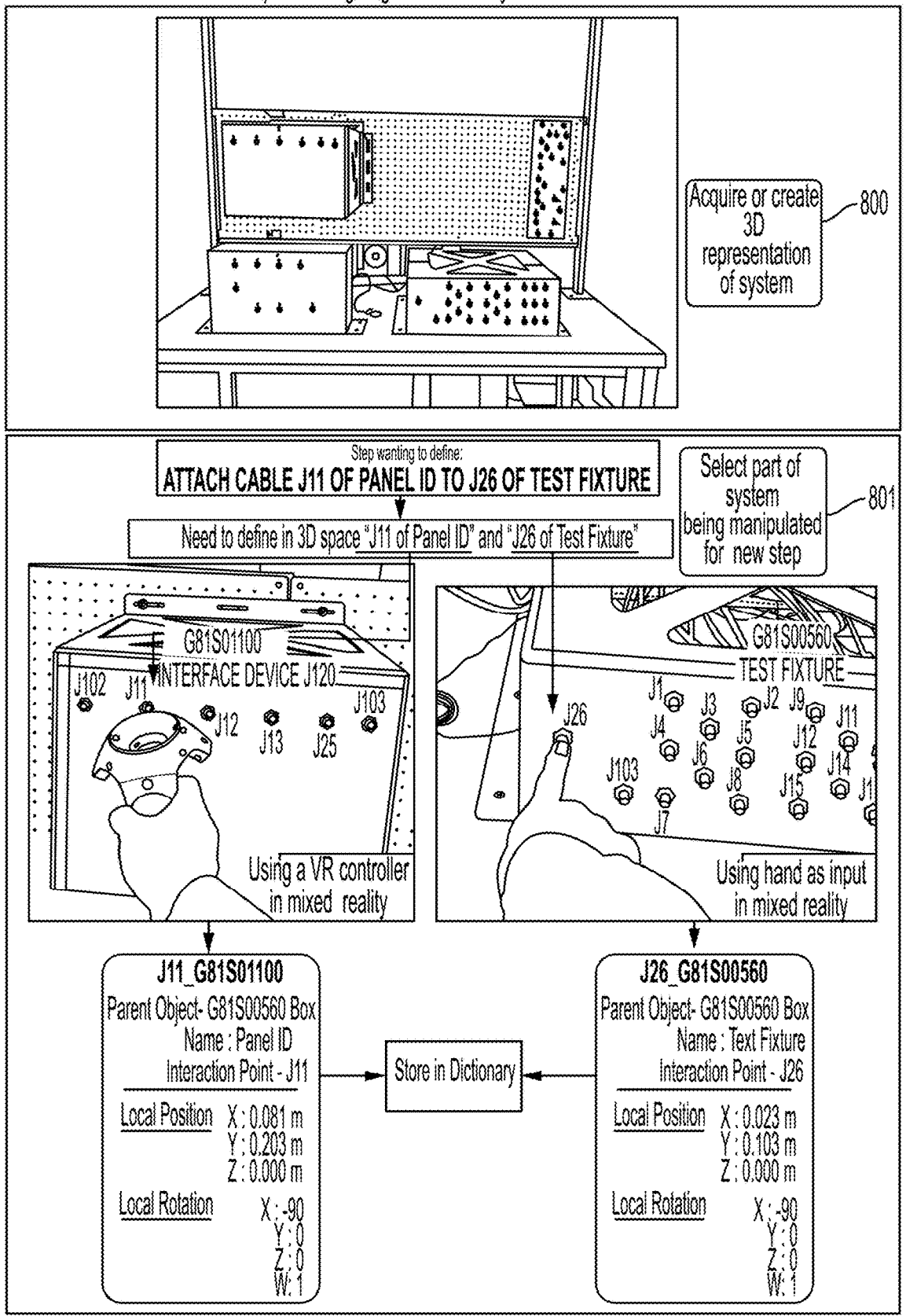
FIG. 12 shows an example of information collected in mixed reality being used to create a 3D representation of the system, where positions of points are stored and used in the creation of instructions (e.g., queued annotations) according to an exemplary embodiment of this disclosure.

2) (801) (The author(s) selects the part of the system needing to be altered either on a computer (e.g., clicking a mouse on a part of a 3D model, clicking a controller in VR on a specific part of a 3D model), alternatively selecting, or defining the part on the actual physical system using mixed reality. That specific object has a known 3D location to a defined coordinate system for the model. FIG. 12 shows two examples of this in mixed reality.

3) (802) Individual action(s) in a step are assigned (e.g., 'turn') to the selected object (e.g., 'left lever'). That process may be manually selected (e.g., selecting 'turn' from a drop-down menu on a computer screen) or the physical action on the real system is detected using mixed reality and applicable sensors (e.g., understanding that the author's hand is on the left lever and detecting through computer vision that the lever is turned).

4) (803) In non-limiting examples, Aa marker, animation, or some way to signify the action showing where the task needs to be performed is generated (important for 3D, and 2.5D video outputs).

5) (804) A camera (virtual or real) position is manually recorded or dynamically generated (either at the time the procedure is authored or calculated at runtime when procedure is executed) based on the type of task and location of the object (important for the 2D pictures or 2.5D video output).

6) (805) A text description of the step can be either computer-generated or manually created. In non-limiting examples of how this could be done an application could process the data structure and creating a template sentence (filling in words in a "mad-lib" style (FIG. 10)), using words to fill in a sentence structure (subject, verb, object for example) (FIG. 15), or processing the animation of an object in context to the step to derive a sentence. Processing could also be done on the text to format it in a way that a person executing would be understand it (e.g., language localization, word style preferences). These computer-generated text description examples could be done during the authoring (i.e., a full sentence published in the instruction), or generated at runtime by the program running the procedure file.

7) (806) A sound file is computer-generated containing the description of the step based on the individual action and specific object. Alternatively, an audio recording could be made where the author records a voice-over for the step and assigned to it. For the former, text-to-speech could be done by the end application processing the text description described previously.

8) (807 and 808) Other non-limiting relevant data or modules are attached to the step (e.g., real-life pictures, screenshots from the virtual camera, qualitative quality assurance expected sensor readings (see Qualitative quality assurance for mixed reality (See Quantitative Quality Assurance for Mixed Reality U.S. Pat. No. 11,138,805 and discussion above), training data such as xAPI information, code, a neural network or algorithm for validation, or haptic information) or is placed in between action steps as its own step.

9) (809) Steps 2-8 are repeated to complete the procedure being created or modified.

10) (810) Once the procedure goes through a user-defined validation process (i.e., inside, or outside of the program) it is ready to be delivered. That delivery (111) can take the form of a bundle of data (that the end user's application can parse and run) (113) or individual outputs (e.g., text, AR instructions, video) can be created and delivered (112).

Now Provided are Further Details of Some of the Features and Aspects of this Disclosure Related to a Parallel Content Authoring Method and System for Procedural Guidance.

Figure 9:
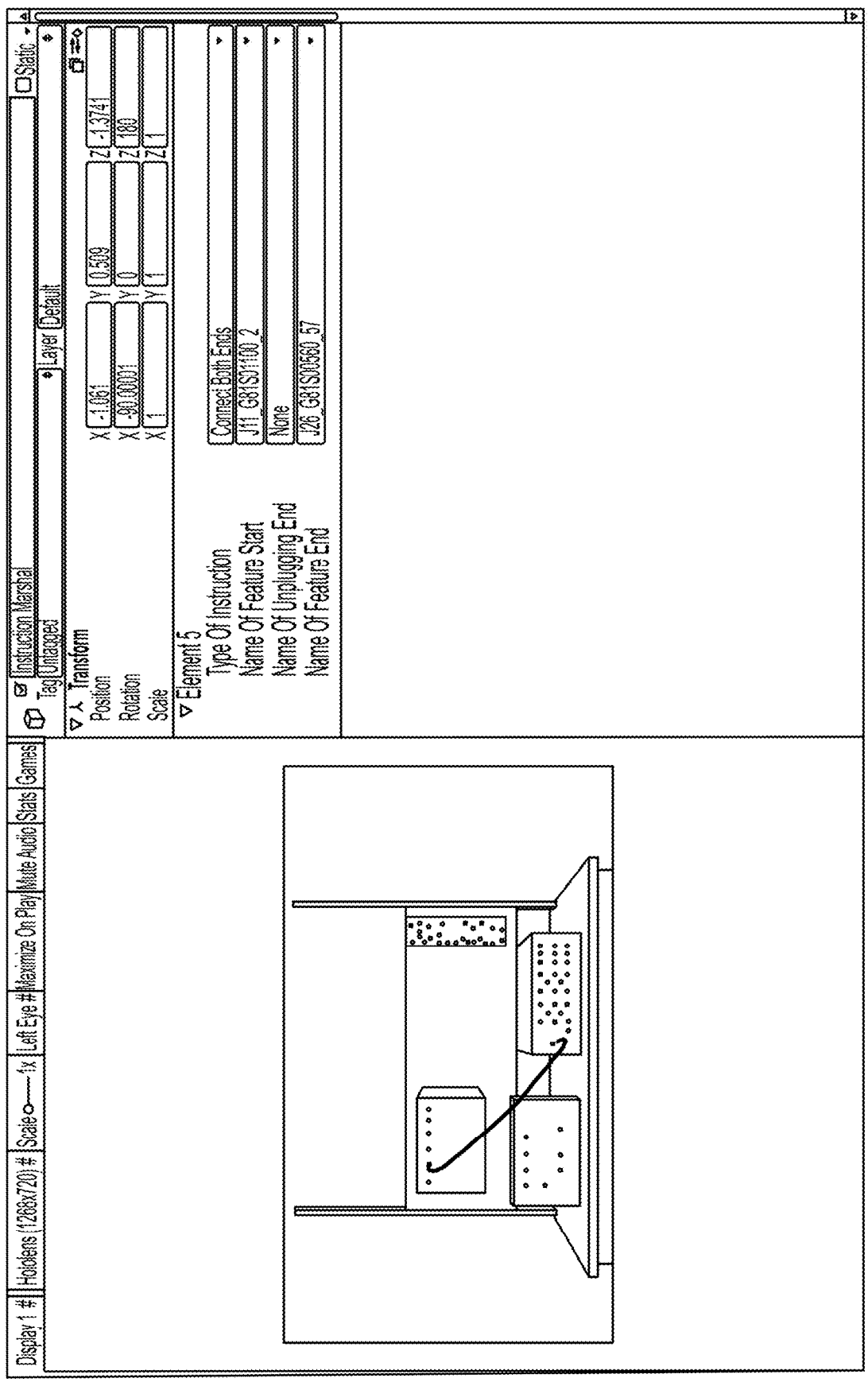
FIG. 9 shows a variation of an application editor geared towards plugging wires into boxes (J11 in Panel G81S01100 "ID Panel" to J26 in panel G81S00560 the "Test Fixture" shown).

With reference to FIG. 9, shown is a variation of an application editor geared towards plugging wires into boxes (J11 in Panel G81S01100 "ID Panel" to J26 in panel G81S00560 the "Test Fixture" shown). The editor, in this specific case, generates a procedural wire going from the feature start point (J11 in Panel G81S01100) to the end point (J26 in panel G81S00560). Showing dynamic modeling can help validate to the author that the step is described correctly.

Figure 10:
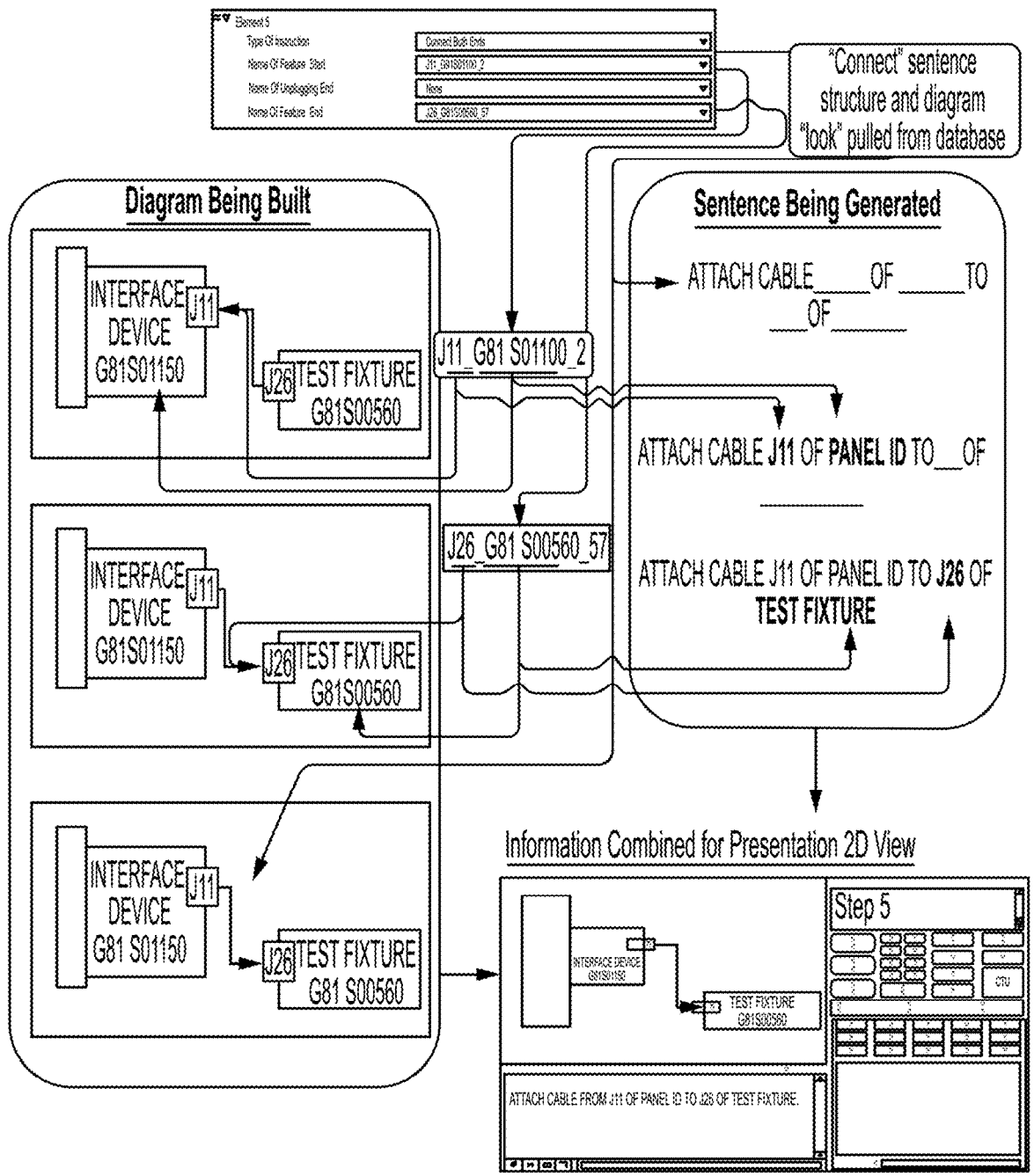
FIG. 10 expands on FIG. 9 to shows a common data structure being used to generate multiple forms of 2D data (a 2D diagram on the left and a sentence on the right).

With reference to FIG. 10, shown are further details of FIG. 9 to shows a common data structure being used to generate multiple forms of 2D data (a 2D diagram on the left and a sentence on the right). In the example instruction, the type of connection is known ("Connect Both Ends") along with the start and end points, with this information a look up could be done on the symbology needing to generate a 2D diagram and a type of sentence needing to be written.

Figure 11:
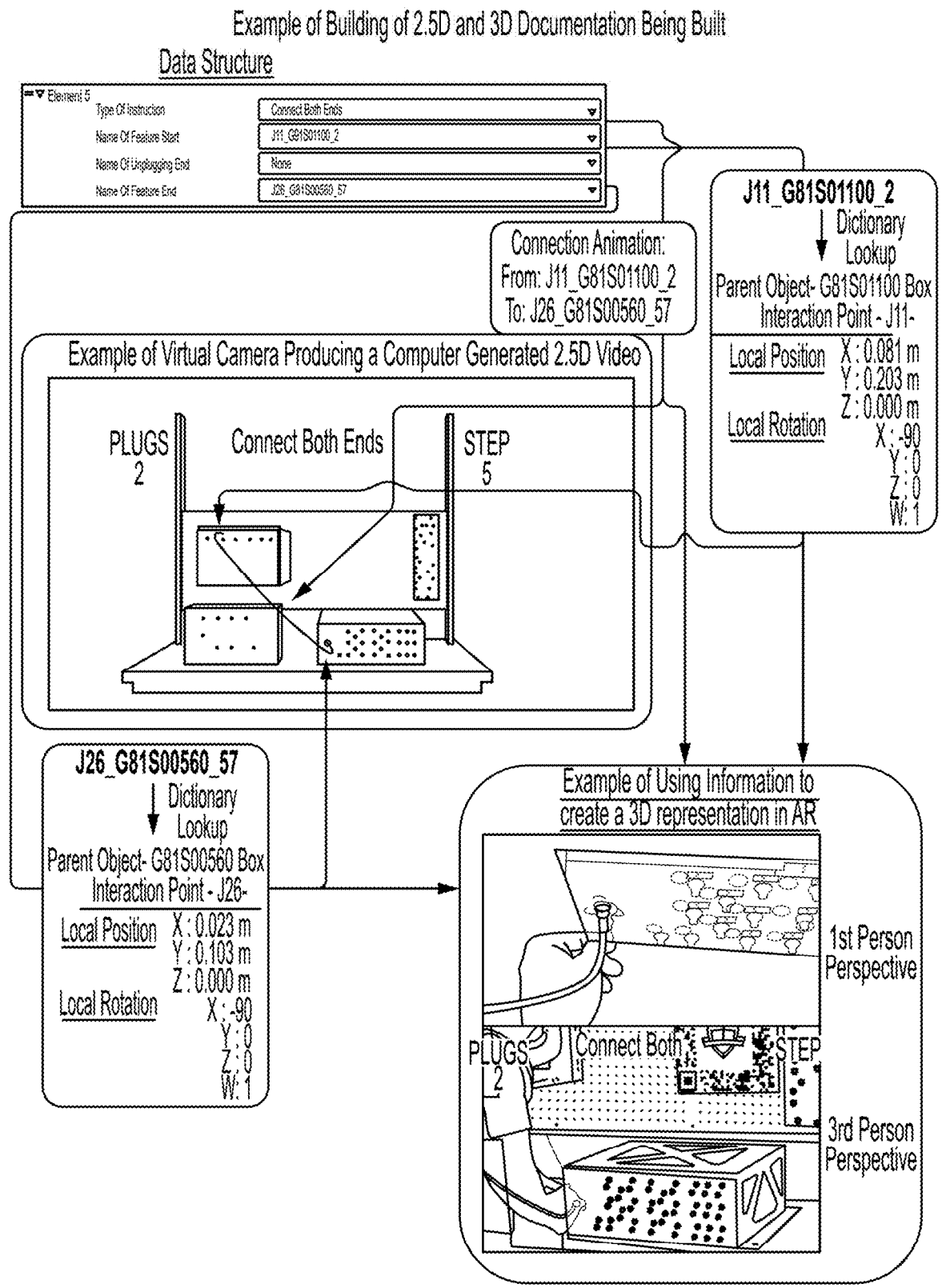
FIG. 11 shows the common data structure authored in FIG. 9 being used to generate a 2.5D computer generated video and a 3D experience using augmented reality according to an exemplary embodiment of this disclosure.

With reference to FIG. 11, shown is a common data structure authored in FIG. 9 and being used to generate a 2.5D computer generated video and a 3D experience using augmented reality. For the example, the positions of J11 and J26 are both known and the "connect both sides" describes the visualization that needs to occur and can be generated programmatically between the two points. The information is able to be viewed different ways, in one through a virtual camera for the 2.5D video (which was authored in the step) and in an optical-see-through AR example, the head position is the camera position for the virtual environment (the position of the virtual camera in the step was not necessary and discarded).

With reference to FIG. 12, shown is an example of information collected in a mixed reality environment being used to create a 3D representation of the system, where positions of points are stored and used in the creation of instructions (e.g., queued annotations) according to an exemplary embodiment of this disclosure.

Figure 13:
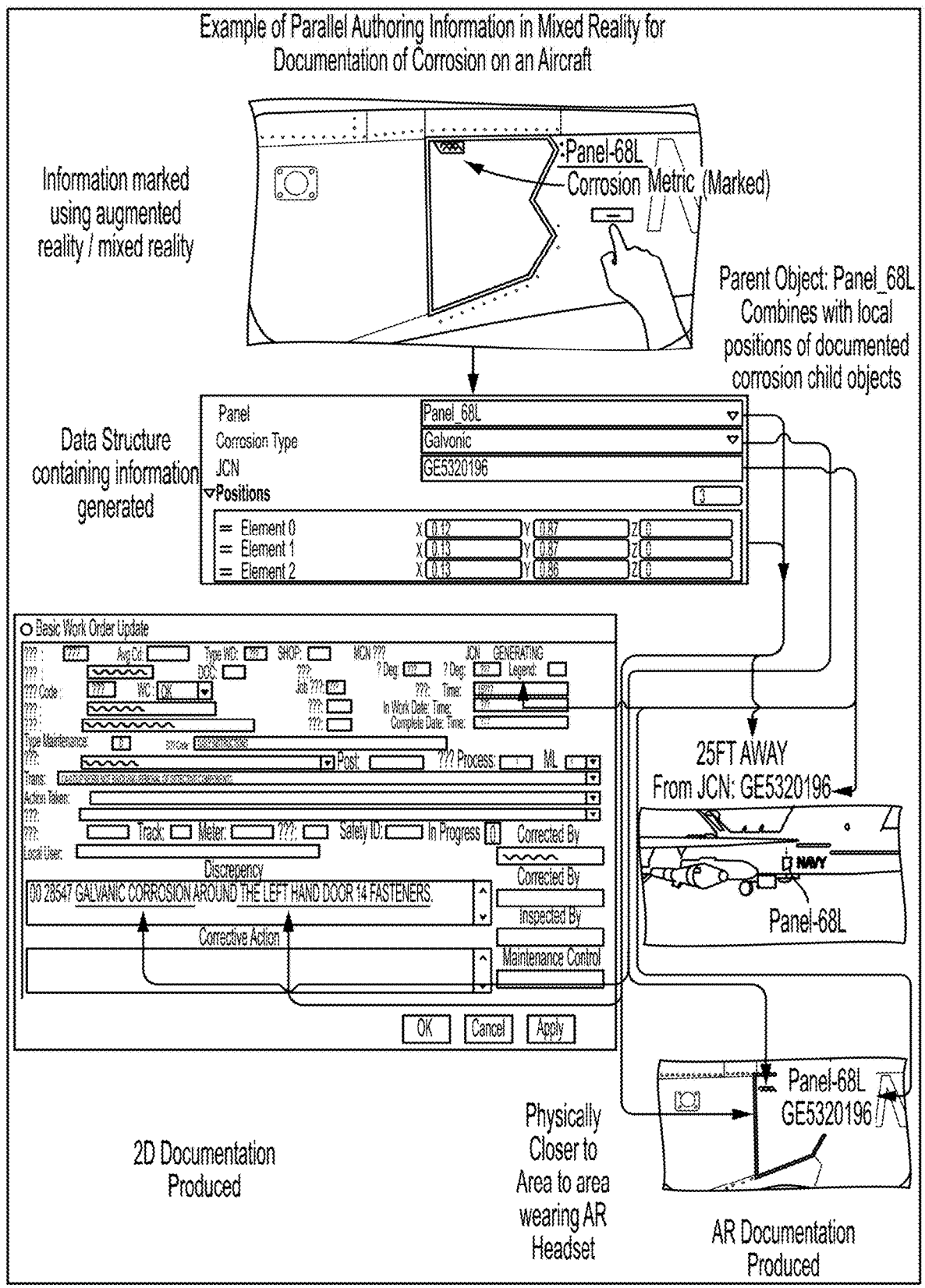
FIG. 13 shows an example of information collected in mixed reality creating a data structure that is used to parallel author multiple outputs, in this case 2D and AR presentations for corrosion information according to an exemplary embodiment of this disclosure.

With reference to FIGS. 13, shown is an example of information collected in a mixed reality environment creating a data structure that is used to parallel author multiple outputs, in this case 2D and AR presentations for corrosion information according to an exemplary embodiment of this disclosure. In the example, it shows how a subset of modules (e.g., position, corrosion type, and job control number (JCN), while leaving out others like virtual camera position) can be used to describe the necessary information but action for the maintainer (e.g., how to repair it) are left out. The embodiment shows that this process works for parallel authored documentation. Of note, when using sensors, it is possible to put that information procedurally into a data structure instead of relying on human input. For an example, the sensor can detect the corrosion through computer vision, understand where it is occurring in 3D space and document it in a parallel authoring data structure.

For example, as shown in FIG. 13, "documentation" such as a Basic Work Order includes information indicating work to be performed on a particular part/system, including sentences describing, for example, corrosion location on an aircraft. Then a recording process can be used to record a visual indication of the work to be completed in 3D, which can then be recreated as 2D documentation (because it is known where on the aircraft something is) and use this information it create a new 3D viewing of the information (AR Documentation Produced). Details about tasks to be performed, for example a repair, can then be authored and included.

With reference to FIGS. 14, shown is an example of having an interaction between a 2D application and an AR companion application utilizing a common data structure according to an exemplary embodiment of this disclosure. There are different approaches that can be performed to achieved this (in the example, the 2D version sending a message to the AR version with the data structure contained), but the main desire is for both to be reading the same state of information (i.e., single source of truth).

Figure 15:
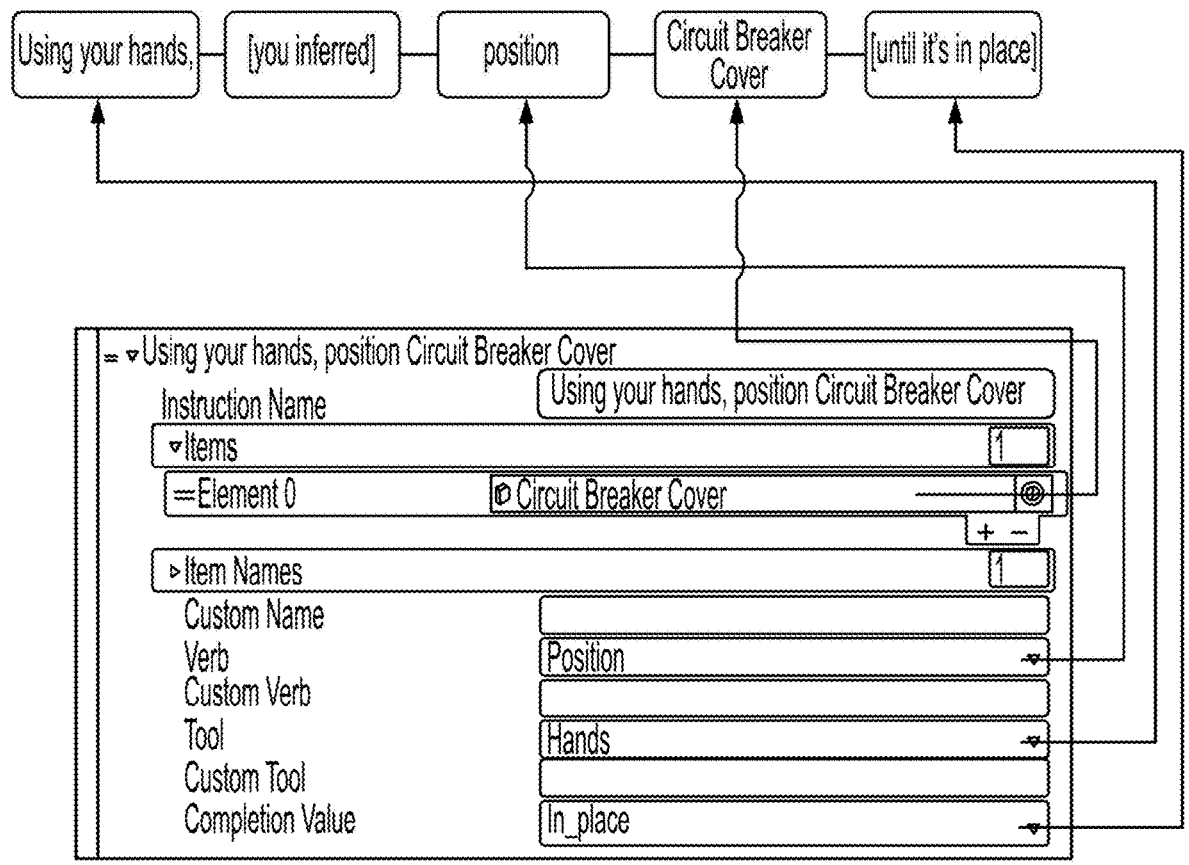
FIG. 15 shows an example of the basics of a sentence (subject, verb, object) being incorporated into a data structure and arranged to create a sentence. In the example, the pieces put together create a full sentence which can be extendable to translate into any language.

With reference to FIG. 15, shown is an example of the basics of a sentence (subject, verb, object) being incorporated into a data structure and arranged to create a sentence. In the example, the pieces put together create a full sentence which can be extendable to translate into any language.

Figure 16:
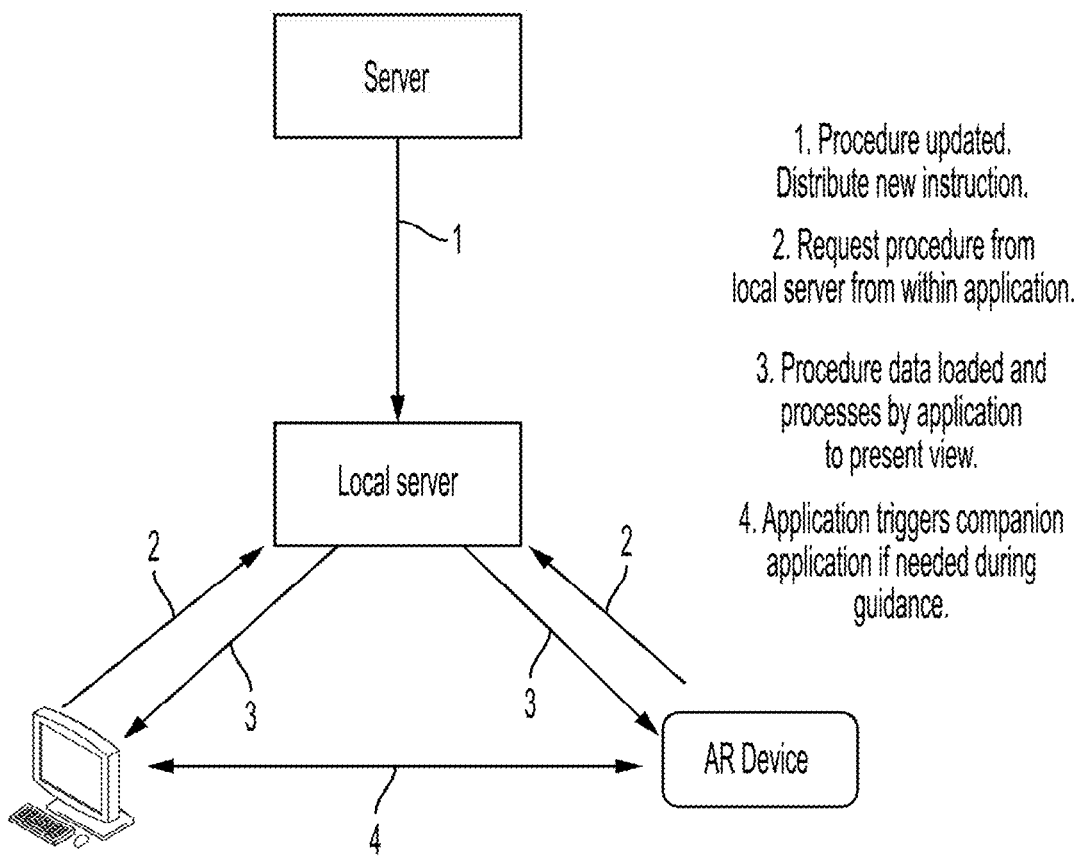
FIG. 16 shows an example of a procedure being loaded at runtime by an application and processed to show a specific view according to an exemplary embodiment of this disclosure.

With reference to FIG. 16, shown is an example of a procedure being loaded at runtime by an application and processed to show a specific view according to an exemplary embodiment of this disclosure.

As shown this disclosure, and the exemplary embodiments described herein, has broad application. It applies to any industry and aspect where movement is involved and needs to be understood. This applies basically to any spatial data where information is retained and includes, but is not limited to:

Construction—example: putting in a piece of equipment in a certain position in a room;
Manufacturing—example: assembling a rocket or jet engine;
Maintenance—example: visual inspection of a system, documenting corrosion, or repairing a subsystem;
Agriculture—example: planting of crops in a certain position or order in a field;
Fire Fighting—documenting where fire is active in a wild fire;
Logistics—example: loading and unloading cargo;
Food service—example: preparing a recipe;
Retail—example: replacing items on a shelf to maintain a certain amount of stock, or picking out a specific order;
Retail—example: customer putting together a piece of furniture ordered from a catalog.
Warehousing—example: creating a path for an employee to walk around the room and pick up specific parts for an order;
Landscaping—example: describing the proper size to trim a bush, or the plan to decorate a yard;
Transportation—example: conductor on a train, or how to operate a truck;
Home repair—example: fixing a faucet or installing a new stove;
Tattoo Artist—example: steps to create a certain tattoo;
Dancing—example: creating a dance routine;
Music—example: playing a piano;
Photography—example: using a camera and where to frame a subject in the frame;
Medical—example: showing where to insert stitches on a wound;
Physical therapy—example: exercises for rehabilitation;
Occupational therapy—example: fine motor skills training;
Vocational Rehabilitation—Spatial audio instructions in a headset guiding a blind person around a building;
Speech therapy—example: describing of vocal exercises;
Sports—example: swinging a golf club, a bat, how to throw a football; and
Games—example: where to move in chess.

Methods and Systems Using Mixed Reality for the Creation of In-Situ CAD Models.

Described now is a method and system for generating and managing in-situ 3D CAD models of real-world objects using mixed reality technology. This system can be used as a standalone solution or in conjunction with a PC and accommodates both single-user and multi-user environments. By incorporating mixed reality technology and facilitating human-machine collaboration, provided is a flexible, efficient, and user-friendly approach to creating and managing 3D models, with broad applications across various industries.

The present disclosure relates generally to the field of computer-aided design (CAD) and more specifically to a method and system for generating and managing in-situ 3D CAD models of real-world objects using mixed reality technology. The exemplary embodiments described herein, accommodate both single-user and multi-user environments, allowing for efficient and user-friendly creation and management of 3D models with applications across various industries.

Mixed reality (MR), also known as hybrid reality, extended reality refers to the merging of real-world and virtual environments, creating a new form of reality. Blending elements of both virtual reality and augmented reality, mixed reality enables users to interact with digital objects within the real world and vice versa. Within the context of this disclosure, mixed-reality is defined as aligning the virtual environment (I.e., digital world) on top of the physical world and visualizing that overlap with augmented reality.

The evolution of computer-aided design (CAD) technology has significantly impacted various industries, including design, engineering, and manufacturing. Early CAD systems primarily focused on two-dimensional drafting, but as technology advanced, 3D modeling capabilities were introduced, enabling more complex and accurate representations of real-world objects. However, despite these advancements, several limitations and challenges persist in current CAD modeling processes.

One significant issue with current 3D modeling practices is the inability to easily achieve varying levels of fidelity based on the specific task requirements. Traditional modeling processes often involve creating a complete and detailed model before distribution, which may be inefficient and unnecessary for certain tasks. While engineering tasks may require high-fidelity models, daily tasks performed by operators often demand significantly less information.

There is a need for a system that leverages mixed reality technology to enhance the design process. Such a system can enable users to interact with both digital and physical objects simultaneously, providing a more intuitive and immersive design experience. Additionally, a mixed reality-based design tool should be user-friendly and accessible to individuals with varying levels of expertise, promoting collaboration and reducing barriers to entry in the field of CAD modeling.

By combining the capabilities of mixed reality with the precision of traditional CAD tools, this innovative approach overcomes the limitations of current technologies, revolutionizing the way 3D models are created and managed. This system allows for the efficient creation of models with varying levels of fidelity, tailored to the specific needs of different tasks and users, resulting in a more flexible and streamlined design process.

The method involves defining a coordinate system for the object being modeled, creating, and placing 3D objects onto the defined coordinate system in an iterative process, applying constraints to ensure accurate representation and functionality of the modeled object, performing quality assurance assessments to verify the accuracy of the virtual model, and storing the operation sequence for future modifications.

The system also enables users to attach metadata to the 3D model components and supports model export and compatibility with traditional CAD programs. By incorporating mixed reality technology and promoting human-machine collaboration, the discloser and the exemplary embodiments described herein, provide a flexible, efficient, and user-friendly approach to creating and managing 3D models across various industries, revolutionizing the way 3D models are developed, refined, and utilized.

The following detailed description provides an overview of the various components and steps involved in an exemplary embodiment of this disclosure.

1) Coordinate System Definition: The user establishes a coordinate system for the object being modeled. This coordinate system serves as the reference point for positioning and orienting all subsequent 3D objects within the model. The user can define the coordinate system manually using a controller or automatically using 2D or 3D markers.

2) 3D Object Creation and Placement: The user can create and place 3D objects, including primitive shapes or custom pre-built models, onto the defined coordinate system in an iterative process. The mixed reality environment, enabled by a headset or a combination of a headset and a PC, allows for real-time alignment of the digital model with the physical object, enabling users to easily adjust and refine the model as needed.

3) Constraint Application: During the modeling process, users may apply various constraints, such as pivots, axes of articulation, joint constraints, and parent-child relationships, to ensure accurate representation and functionality of the modeled object.

4) Quality Assurance Assessment: Users can verify the accuracy of the virtual model compared to the physical object by performing quality assurance assessments. These assessments can be conducted subjectively through visual inspection of the model or objectively by comparing point cloud data from the mixed reality device to the position of the 3D model's mesh.

5) Operation Sequence Storage: The system records the order of operations used to create the model, allowing users to revisit and modify the model at a later stage if needed.

6) Model Metadata Attachment: The 3D model components can be associated with pertinent metadata by users, including but not limited to names, material properties, or manufacturing information.

7) Iterative Modeling Process: Users repeat steps 2-6 until the desired level of model fidelity is achieved. The mixed reality environment enables users to create models with varying levels of detail, depending on the specific task requirements.

8) Model Export and Compatibility: The system saves the geometry and history of operations in a file format that can be imported into traditional CAD programs. This allows users to further refine the model or adapt it for use in other software applications.

By incorporating mixed reality technology and facilitating human-machine collaboration, the discloser provides a flexible, efficient, and user-friendly approach to creating and managing 3D models in both single-user and multi-user scenarios. The disclosed method and system has broad applications across various industries and can revolutionize the way 3D models are developed, refined, and utilized.

Embodiments

This section outlines the hardware and software requirements for using mixed reality for the creation of in-situ CAD models as an embodiment of this disclosure, as well as the classes necessary for functionality.

Hardware Requirements

Mixed Reality Device: A mixed reality headset, such as the MICROSOFT HOLOLENS, provides the user with an immersive mixed reality environment. This device captures the physical surroundings and overlays 3D CAD models, allowing the user to interact with the virtual and real-world objects simultaneously. The mixed reality device is essential for creating and managing in-situ 3D CAD models as it offers real-time alignment of digital models with physical objects.

Sensors: The mixed reality device is equipped with various sensors, such as depth sensors, cameras, and accelerometers, which are necessary for capturing the physical environment, tracking user movements, and determining the user's position and orientation within the environment. These sensors provide the data required for accurate model placement and alignment with real-world objects.

PC (Optional): In some embodiments, the mixed reality device may be used in conjunction with a PC to enhance the computational power, storage capacity, and user interface. The PC may also facilitate the use of traditional CAD software for further model refinement and compatibility.

Software Requirements

UNITY: UNITY is a widely-used game engine that serves as the software platform for developing a mixed reality application. It offers a powerful and versatile environment that supports mixed reality device integration, 3D object manipulation, and user interaction. UNITY is crucial for implementing the various functionalities described herein, such as object creation and placement, constraint application, and quality assurance assessment. Other game engine platforms suitable for implementation of the disclosed methods and systems include, but are not limited to, UNREAL.

Main Classes and Functionality of the Application

CoordinateSystem: This class is responsible for defining and maintaining the coordinate system for the object being modeled. It interacts with sensor data to establish the reference point for positioning and orienting all subsequent 3D objects within the model.

ObjectCreation: This class enables the creation and placement of 3D objects within a mixed reality environment. It interacts with the CoordinateSystem class to ensure proper alignment with the defined coordinate system and allows the user to create and modify the 3D objects in real-time.

ConstraintManager: This class manages the application of various constraints, such as pivots, axes of articulation, joint constraints, and parent-child relationships. It ensures accurate representation and functionality of the modeled object by enforcing the specified constraints between different components of the 3D model.

QualityAssurance: This class performs quality assurance assessments on the virtual model to verify its accuracy compared to the physical object. It interacts with the mixed reality device's sensors to gather point cloud data and compare it to the position of the 3D model's mesh, providing feedback to the user.

OperationSequence: This class records the order of operations used to create the model, allowing users to revisit and modify the model at a later stage if needed. It maintains a history of operations that can be accessed and edited during the modeling process.

MetadataManager: This class allows users to attach metadata to the 3D model components, such as names, material properties, or manufacturing information. It ensures that metadata is properly stored and accessible when needed.

ModelExport: This class is responsible for exporting the 3D model in a file format compatible with traditional CAD programs. It saves the geometry and operation history, enabling users to refine the model or adapt it for use in other software applications.

Implementation Section

This section outlines the steps required for implementing the mixed reality system for the creation of in-situ CAD models as an embodiment of this disclosure, using the hardware, software, and classes described in the previous sections.

1) Hardware Configuration: Set up and configure the mixed reality device, sensors, and optional PC to ensure proper communication and data transfer between devices. This includes calibrating the mixed reality headset's sensors for accurate tracking and alignment within the mixed reality environment.
2) Software Setup: Install and configure UNITY to develop the mixed reality application. This includes setting up the development environment, importing the necessary libraries and packages for mixed reality support, and configuring the build settings for the target mixed reality device.
3) Class Development: Develop the main classes for the mixed reality application, including CoordinateSystem, ObjectCreation, ConstraintManager, QualityAssurance, OperationSequence, MetadataManager, and ModelExport. Implement the methods and properties for each class, ensuring proper functionality and interaction with the mixed reality environment and other classes.
4) User Interface Development: Design and implement a user interface that allows users to interact with the 3D models in the mixed reality environment. This may include creating menus, buttons, sliders, and other interactive elements for object creation, manipulation, constraint application, and quality assurance assessment.
5) Integration: Integrate the developed classes, user interface, and mixed reality environment within the UNITY application.
6) Model Export and Compatibility: Implement the ModelExport class to ensure that the 3D models created within the mixed reality environment can be exported in a file format compatible with traditional CAD programs. Test the exported models in various CAD software applications to ensure proper geometry, operation history, and metadata are preserved.

By following these implementation steps, the mixed reality system for the creation of in-situ CAD models can be successfully developed and deployed, providing users with an intuitive, efficient, and accurate method for creating and managing 3D models based on real-world objects and environments.

Single-User Embodiment

In an exemplary embodiment, the system allows individual users to create and manage 3D CAD models in a mixed reality environment using hand gestures, voice commands, or controllers. Real-time alignment of digital models with physical objects ensures easy adjustments and refines models across various industries.

Multi-User Embodiment

In an exemplary embodiment, the system enables multiple users to collaborate on 3D CAD models in a mixed reality environment. The real-time alignment of digital models with physical objects facilitates efficient collaboration, enhancing communication and speeding up the modeling process across various industries.

Marker-Based Positioning Embodiment

In an exemplary embodiment, the system uses marker-based positioning for accurate placement and alignment of 3D CAD models within a mixed reality environment. Physical markers provide a reliable reference, ensuring precise alignment between digital models and real-world objects for streamlined modeling and enhanced model quality.

Multi-Modal Input Embodiment

In an exemplary embodiment, the system supports multi-modal input methods in a mixed reality environment for versatile and intuitive 3D CAD model creation and management. Users can choose their preferred input method to place and manipulate 3D objects, apply constraints, and perform quality assurance checks, catering to diverse user needs and application scenarios.

Figure 17:
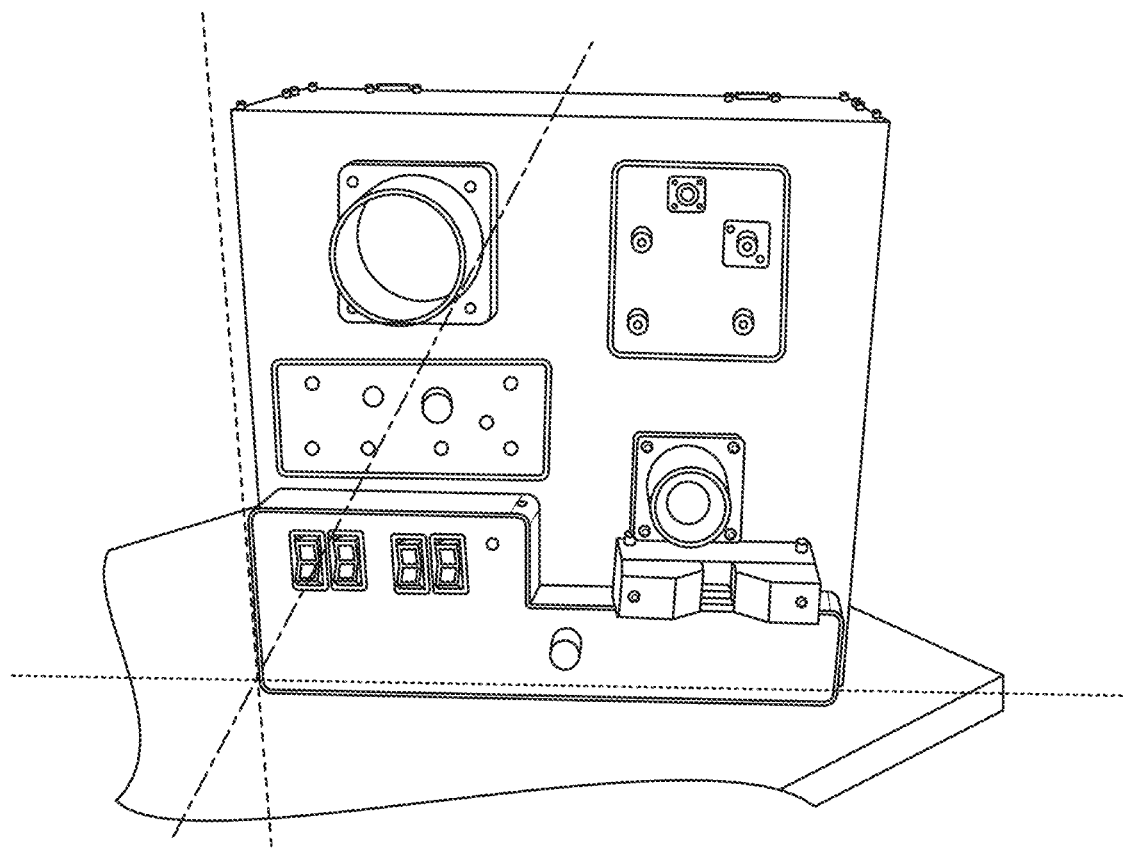
FIG. 17 shows a coordinate system being put in position manually for a system being 3D modeled according to an exemplary embodiment of this disclosure.

With reference to FIGS. 17, shown is a coordinate system being put in position manually for a system being 3D modeled according to an exemplary embodiment of this disclosure.

Figure 18:
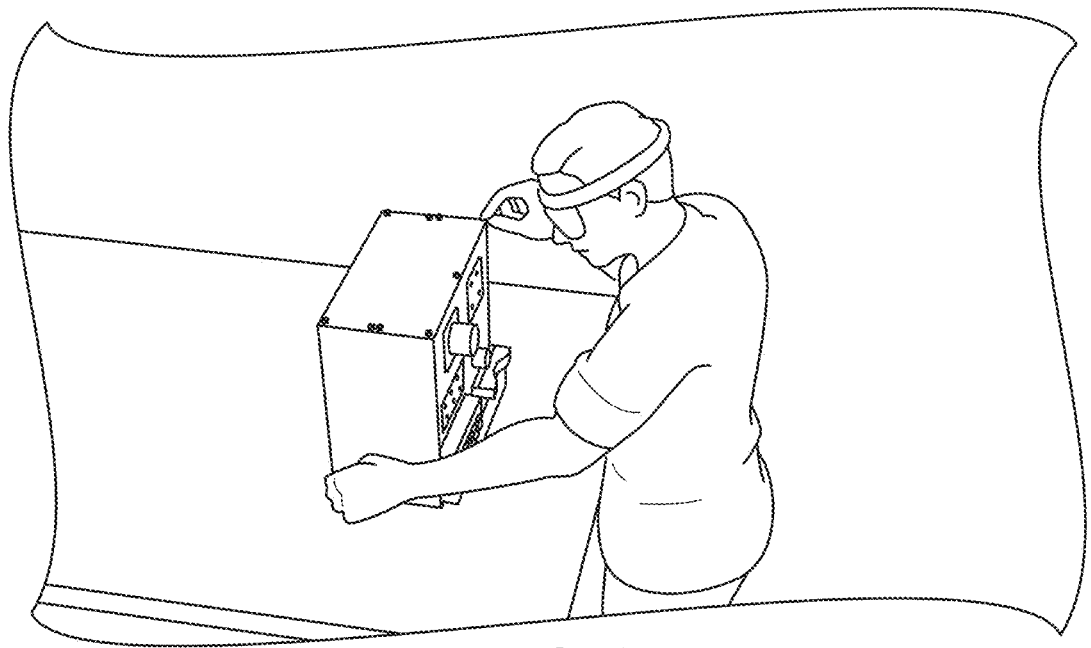
FIG. 18 shows a user in a mixed reality environment using his hands to create a primitive shape on the system being modeled according to an exemplary embodiment of this disclosure.

With reference to FIG. 18, shown is a user in a mixed reality environment using his hands to create a primitive shape on the system being modeled according to an exemplary embodiment of this disclosure.

Figure 19:
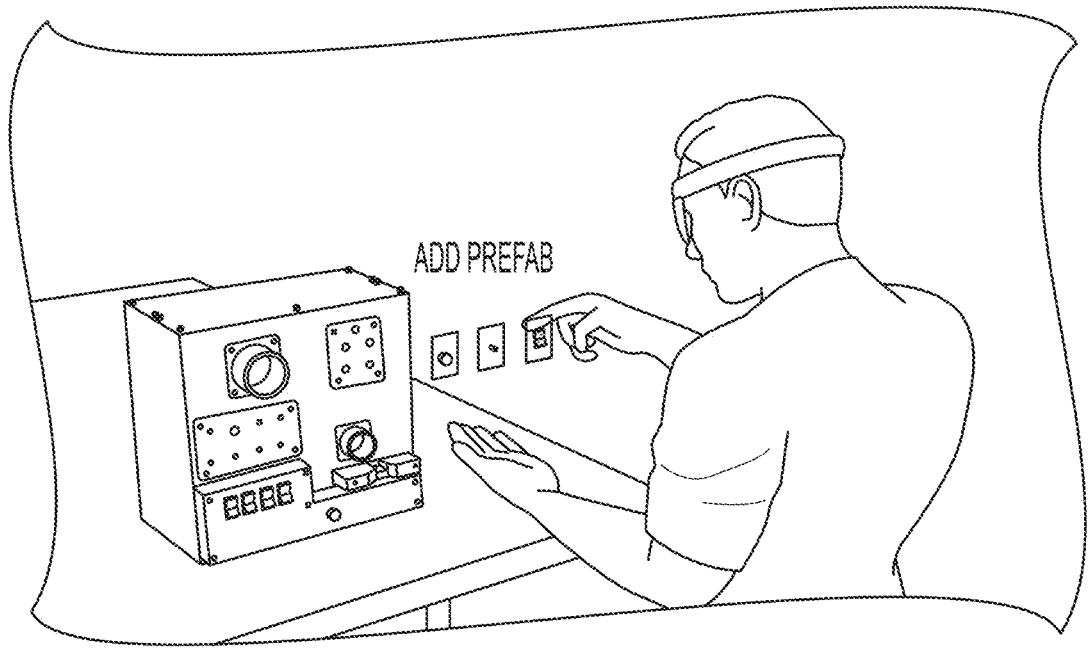
FIG. 19 shows the user selecting a prefab object out of a virtual library, in this particular case a switch 3D model is chosen, according to an exemplary embodiment of this disclosure.

With reference to FIG. 19, shown is the user selecting a prefab object out of a virtual library, in this particular case a switch 3D model is chosen, according to an exemplary embodiment of this disclosure.

Figure 20:
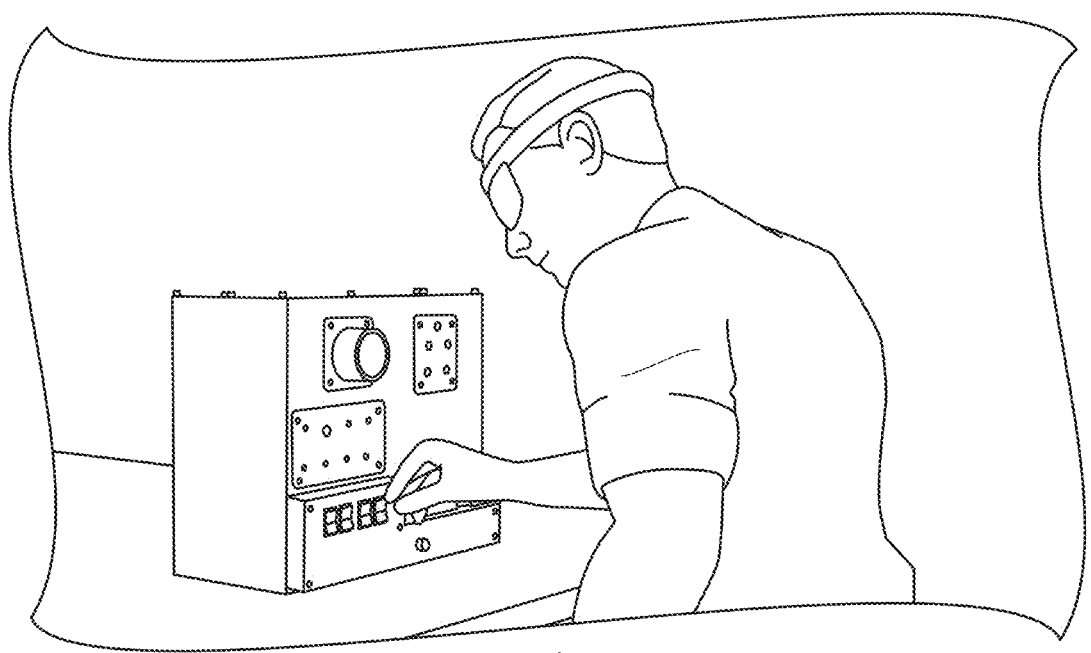
FIG. 20 shows the user placing the virtual switch prefab on the physical location of the system according to an exemplary embodiment of this disclosure.

With reference to FIG. 20, shown is shows the user placing the virtual switch prefab on the physical location of the system according to an exemplary embodiment of this disclosure.

Figure 21:
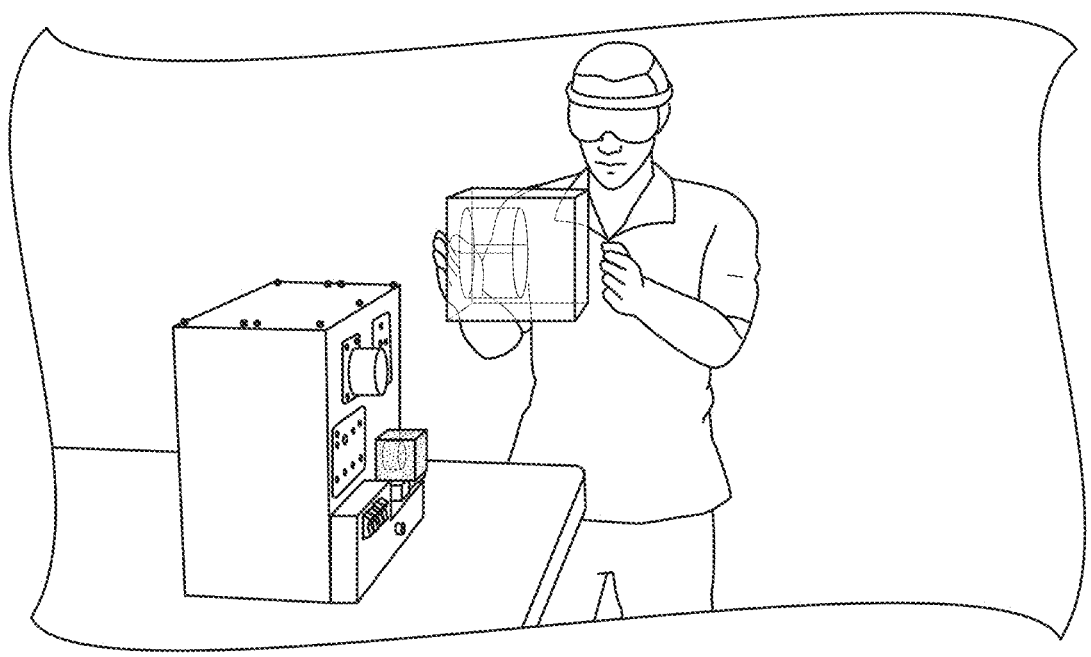
FIG. 21 shows the user interacting with a 3D model using a manipulation technique according to an exemplary embodiment of this disclosure. However, since the object being modeled is too small to be directly manipulated on the physical system, the method of "Quantum Entanglement" is employed. This technique involves working with two virtual models: the physical system's model and the model being manipulated. Specifically, in this scenario, as shown, the user is interacting with a larger virtual version of the model, with changes made to the virtual model being replicated onto the smaller physical model in real-time. It is worth noting that the same method can be applied when dealing with objects that are too large to be modeled directly by a user.

With reference to FIG. 21, shown is the user interacting with a 3D model using a manipulation technique according to an exemplary embodiment of this disclosure. However, since the object being modeled is too small to be directly manipulated on the physical system, the method of "Quantum Entanglement" is employed. This technique involves working with two virtual models: the physical system's model and the model being manipulated. Specifically, in this scenario, as shown, the user is interacting with a larger virtual version of the model, with changes made to the virtual model being replicated onto the smaller physical model in real-time. It is worth noting that the same method can be applied when dealing with objects that are too large to be modeled directly by a user.

Figure 22:
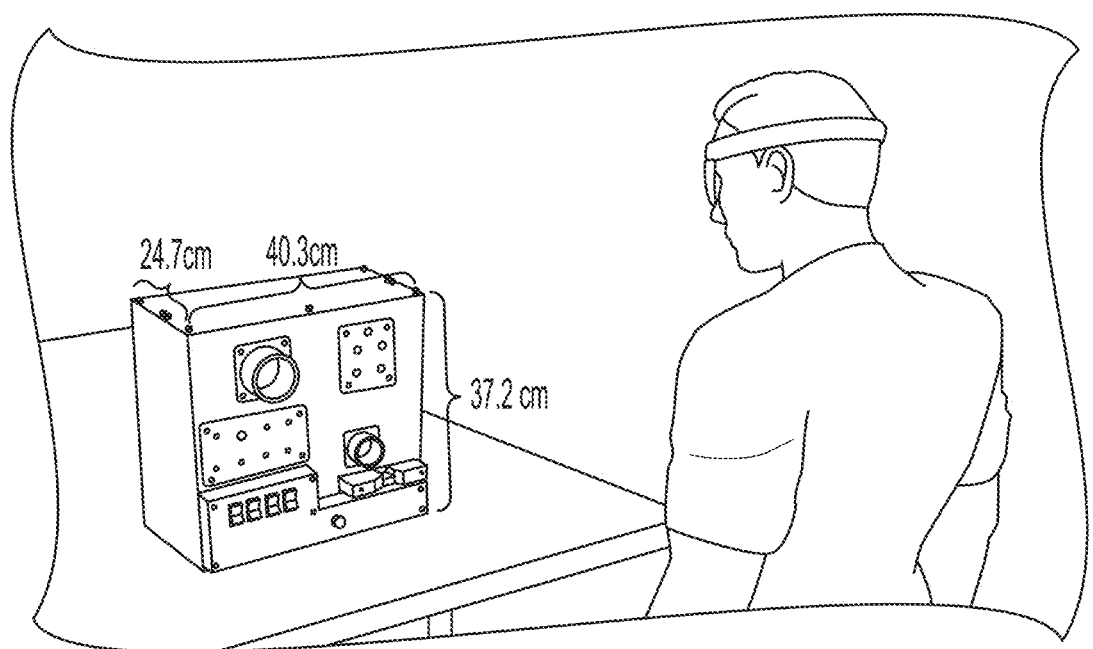
FIG. 22 shows the user seeing virtualized dimensions corresponding to the size of the model produced through augmented reality according to an exemplary embodiment of this disclosure.

With reference to FIG. 22, shown is the user seeing virtualized dimensions corresponding to the size of the model produced through augmented reality according to an exemplary embodiment of this disclosure.

Figure 23:
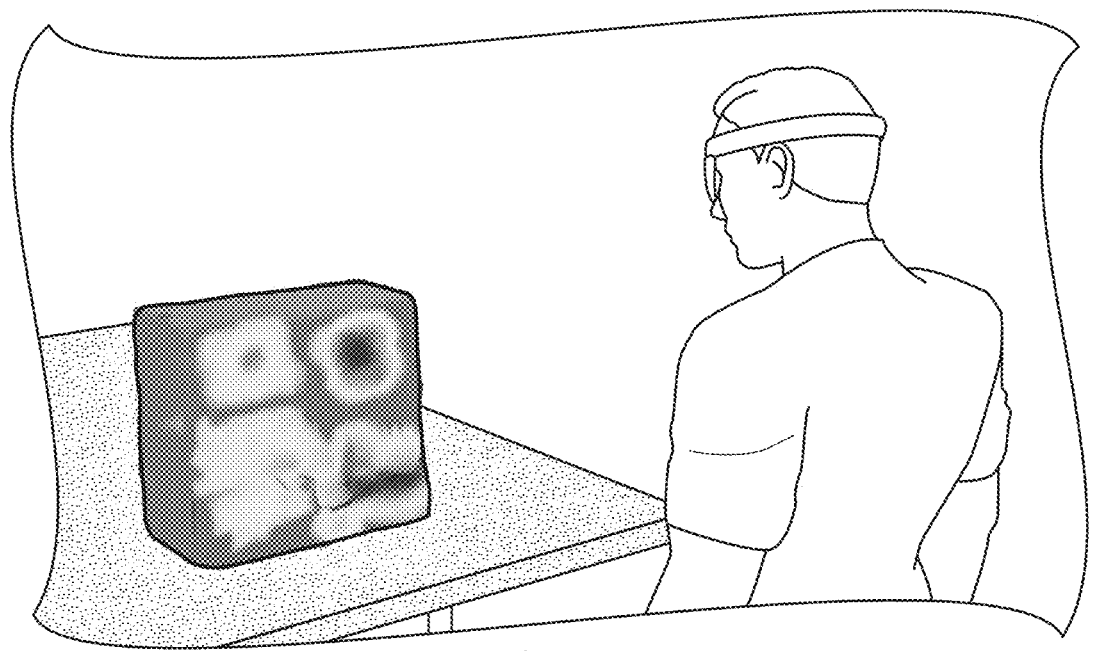
FIG. 23 shows the user seeing a heatmap of the differences between the 3D model created and the physical object being modeled for quality assurance according to an exemplary embodiment of this disclosure.

With reference to FIG. 23, shown is the user seeing a heatmap of the differences between the 3D model created and the physical object being modeled for quality assurance according to an exemplary embodiment of this disclosure. Multimodal Procedural Guidance Content Creation and Conversion Method and System.

Now described is a Multimodal Procedural Guidance Content Creation and Conversion System (MC3) for the generation and conversion of procedural guidance content. By employing mixed reality (MR), augmented reality (AR), virtual reality (VR) technologies, traditional PC interfaces, machine learning algorithms, and advanced software tooling, MC3 facilitates efficient and intuitive content creation and conversion for step-by-step procedural guidance. This disclosure, and the exemplary embodiments described herein, enables seamless collaboration between multiple users with different modalities, allowing them to create, edit, and review content synchronously or asynchronously. The document conversion process transforms traditional documentation into data structures or bundles suitable for parallel content authoring, which significantly improves the efficiency of content generation and conversion while streamlining the document conversion process, paving the way for more widespread adoption of augmented reality integration in various workplace environments.

This Multimodal Procedural Guidance Content Creation and Conversion System described herein is related to content creation and conversion, with a specific focus on creating procedural guidance content for various industries. The main objective is to capture, process, share, and convert procedural guidance content across different modalities such as augmented reality, virtual reality, traditional computing devices, and various document formats. To accomplish this, advanced software tooling, sensor data, and machine learning algorithms are used to create a multimodal system for authoring and converting procedural guidance content. The ultimate goal is to enhance efficiency, accessibility, and collaboration in creating and converting procedural guidance materials for industries such as manufacturing, maintenance, and training, among others.

For millennia, humans have depended on text documentation for recording and transmitting knowledge, with the earliest instances originating from the Sumerian civilization in Mesopotamia around 3500 BCE. Throughout history, writing systems have developed and diversified, allowing societies to document religious beliefs, historical events, scientific knowledge, and various aspects of human culture. As civilizations became more complex, the demand for written documentation grew, rendering text documentation vital for trade, governance, and communication.

The 15th-century invention of the printing press revolutionized text documentation, making it more widespread and accessible. Currently, text documentation remains crucial in diverse fields and industries, such as science, medicine, law, education, and technology. As digital technology progresses, the methods for creating, sharing, and accessing text documentation continue to evolve, but the fundamental importance of written documentation endures.

Standardization of documentation across different industries has facilitated the creation and utilization of information by establishing expectations. Maintenance instructions exemplify essential text documentation, ensuring the proper functioning of equipment, machinery, and infrastructure. Historically, these instructions were documented in hard copy manuals or technical guides. With the emergence of digital technology and standards like S1000D, which ensure consistency and standardization within publications, maintenance instructions are now documented and shared in various digital formats, such as PDF, Microsoft Word, HTML, and XML. However, despite improvements in standards, challenges persist with translation issues between 3D and 2D, as different engineers can author the same task differently while still complying with the standard. This forces end-users to understand the variances between authors and retranslate tasks to 3D, leading to errors. In response, industries have begun creating new content modalities, including authoring information in videos, augmented reality (AR), and virtual reality (VR), although these have traditionally been separate, non-scalable pathways.

Parallel Content Authoring (PCA), as previously described, is a vital method and system that addresses these challenges by enabling the creation of bundled information in a structured format, breaking each step into components that can be directly and automatically translated into all derivative mediums or individual formats. This process allows for more efficient distribution and management of content across various mediums, including 2D, 2.5D, and 3D. However, much information remains locked in legacy documentation (e.g., video, text, voice recordings, AR-only format), forcing stakeholders to choose between continuing to use legacy systems, supporting both legacy and PCA formats, or rewriting the procedure from scratch in a PCA format and performing a hard switch.

The PCA process has partially addressed this, for example, by enabling both a PC and AR interface for authoring, but legacy documentation methods remain isolated. To overcome these challenges, the presently disclosed Multimodal Procedural Guidance Content Creation and Conversion (MC3) method and system focuses on the conversion of traditional documentation into data structures or bundles suitable for parallel content authoring and employing other interactive modalities for editing the data structure synchronously and asynchronously.

Traditional content creation interfaces and documentation formats have constrained scalability and generated inefficiencies in the process. MC3 builds upon the foundation laid by PCA. While PCA focuses on creating and presenting parallel content using 3D representations, annotations, and spatial data being able to be captured in a mixed reality environment, MPG expands on this by incorporating a broader range of modalities and features. Here's how MPG relates to and expands upon PCA:

1. Multiple modalities: MPG supports not only mixed reality but also various other output formats like 2D pictures, 2.5D videos, and text instructions. This allows for greater flexibility and accessibility for different users and devices.
2. Procedural guidance: MPG emphasizes the creation and delivery of procedural guidance content, making it more focused on assisting users in performing tasks, whereas PCA is more general in its scope of parallel content authoring.
3. Collaborative authoring: While PCA allows for collaborative work between editors, MPG emphasizes the collaborative nature of the authoring process, enabling multiple authors to work together, for example, with one author marking objects in 3D space in mixed reality while another author adds details using a computer.

Benefits of the MC3 system include:
1. Real-time feedback and validation: As authors create and edit content, they can receive immediate feedback and validation within the multimodal environment (e.g., being able to run simulated 3D tests), ensuring accuracy and effectiveness of the procedural guidance.
2. Context-aware content creation: Authors can create content that is aware of the specific context in which it will be used, leading to more relevant and helpful instructions for end users.
3. Seamless transition between modalities: MC3 allows authors to switch between different modalities (AR, VR, MR, and traditional PC interfaces) during the authoring process, making it more efficient and convenient to create and edit content.
4. Enhanced creativity and innovation: By offering a range of modalities and tools for content creation, MC3 can stimulate authors' creativity and encourage innovative approaches to creating procedural guidance materials.
5. Integration of real-world data: MC3 enables authors to incorporate real-world data, such as sensor readings or real-time feedback, into the procedural guidance, making it more relevant and effective for end users.
6. Improved collaboration between subject matter experts: MC3's multimodal approach allows subject matter experts from various domains to collaborate on creating procedural guidance, ensuring that the content is accurate, comprehensive, and useful.
7. Dynamic content adjustment: As new information becomes available or processes change, authors can easily adjust the procedural guidance within the MC3 system to ensure it remains up-to-date and effective.

These benefits demonstrate the potential of the MC3 system to enhance the authoring process and create more effective procedural guidance materials beyond the basic advantages of content creation and conversion.

The present disclosure addresses the challenges of content generation and conversion for step-by-step procedural guidance in workplace settings by introducing a multimodal creation and editing system for parallel content authoring and a document conversion process that transforms traditional documentation into data structures or bundles suitable for parallel content authoring.

This disclosure, and the exemplary embodiments described herein, employs mixed reality (MR), augmented reality (AR), virtual reality (VR) technologies, traditional PC interfaces, machine learning algorithms, and advanced software tooling to facilitate more natural and intuitive content creation and conversion. The captured data is segmented, labeled, and categorized for each step of the procedure, making it easier to understand and replicate. Furthermore, seamless collaboration between multiple users with different modalities is enabled, allowing them to create, edit, and review content synchronously or asynchronously.

In summary, the present disclosure revolutionizes the way procedural guidance materials are created, shared, and converted, significantly improving the efficiency of content generation and conversion, paving the way for more widespread adoption of augmented reality integration in various workplace environments, and streamlining the document conversion process.

Figure 24:
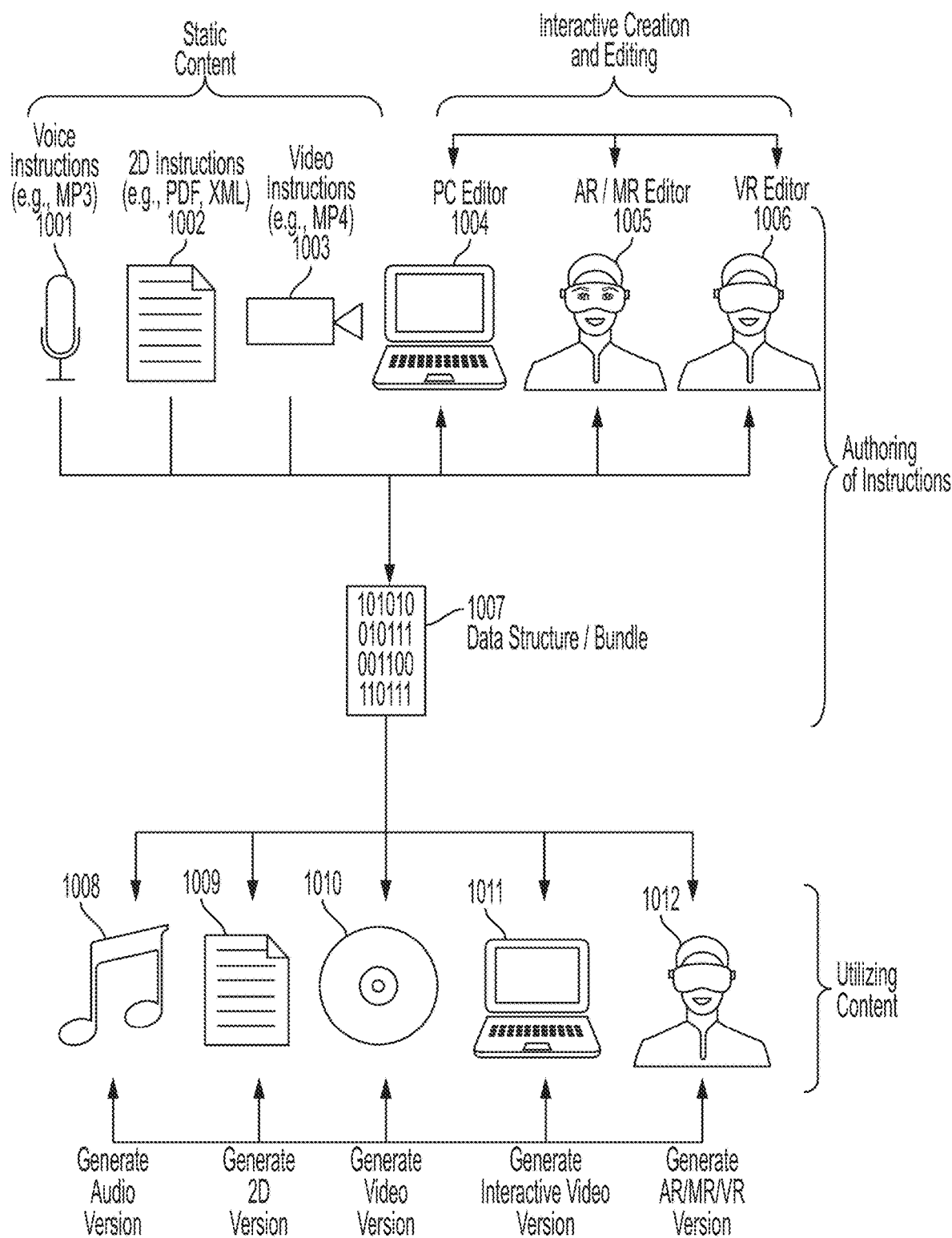
FIG. 24 shows a simplified view of six paths through different modalities (i.e., PC, AR/MR, and VR) to author content into a common data structure/bundle (this should be considered non-limiting), according to an exemplary embodiment of this disclosure. The created data bundle can then be leveraged by any modality described in Parallel Content Authoring. Of note, any modal can work independently or in tandem with other modalities, either during content authoring or content use.

With reference to FIGS. 24, shown is a simplified view of six paths (1001-1006) through different modalities (i.e., PC, AR/MR, and VR) to author content into a common data structure/bundle 1007 (this should be considered non-limiting), according to an exemplary embodiment of this disclosure. The created data bundle can then be leveraged by any modality described in Parallel Content Authoring, including an Audio Version 1008, 2D Version 1009, Video Version 1010, Interactive Video Version 1011, and AR/MR/VR Version 1012. Of note, any modal can work independently or in tandem with other modalities, either during content authoring or content use.

Figure 25:
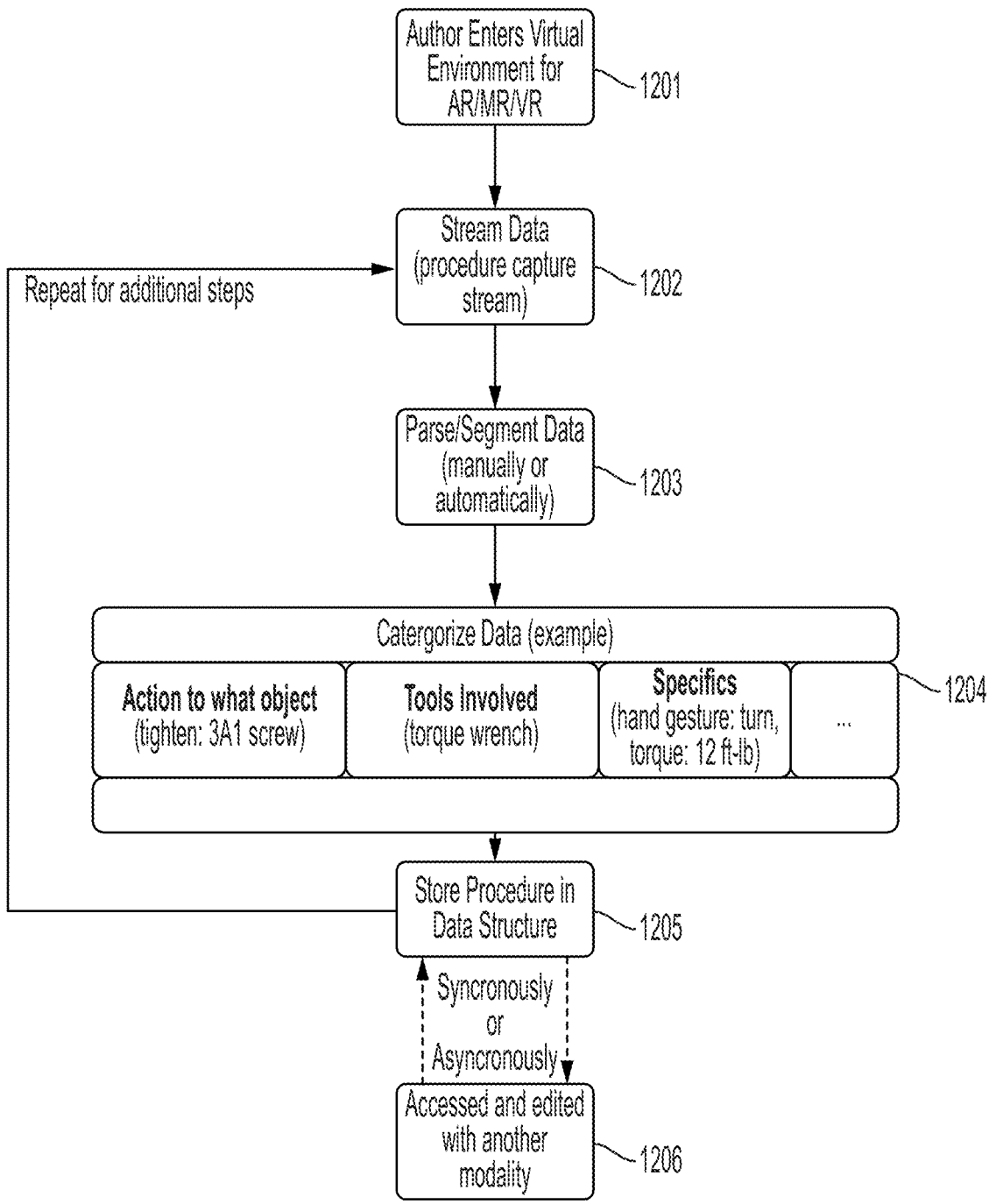
FIG. 25 shows a conceptual workflow for AR, VR, and MR procedural content creation according to an exemplary embodiment of this disclosure. Ideally, passive procedural content creation is employed, where a maintainer carries out a procedure and meaningful content is captured without any direct interaction from the maintenance professional. This concept extends the ideas presented in Quantitative Quality Assurance for Mixed Reality (U.S. Pat. No. 11,138,805), in which the methodology involves capturing sensor data and assigning meaning to the maintainer's movements. In alternative embodiments, the process can be adapted to simplify the recording of intent.

With reference to FIG. 25, shown is a conceptual workflow for AR, VR, and MR procedural content creation according to an exemplary embodiment of this disclosure. Ideally, passive procedural content creation is employed, where a maintainer carries out a procedure and meaningful content is captured without any direct interaction from the maintenance professional. This concept extends the ideas presented in Quantitative Quality Assurance for Mixed Reality (U.S. Pat. No. 11,138,805), in which the methodology involves capturing sensor data and assigning meaning to the maintainer's movements. In alternative embodiments, the process can be adapted to simplify the recording of intent.

The process can be summarized as follows:
Content Capture and Authoring (1201-1206): Focuses on capturing and authoring procedural guidance content using various interactive modalities, such as a 2D virtual environment in a PC, AR, VR, and MR.
1) (1201) The author enters a virtual environment (e.g., AR, VR, or MR) to capture content for a procedure. In mixed reality, the author aligns (registers) the digital world on top of the physical world, such as placing a 3D CAD model on its physical counterpart.
2) (1202) As the author goes through the procedure in the sensor-enabled virtual environment, movements are recorded. These movements may include eye-tracking, hand pose, speech, and tool usage (real or virtual). If electronic tools are used, additional data can be captured from the tool.
3) (1203) The data streams from these movements are segmented for each step of the procedure. This segmentation can occur manually (e.g., pressing a virtual button to start or stop each step) or automatically with the help of a computer.
4) (1204) The data streams are then labeled and categorized for each step. For example, a data stream from sensors tracking hand motions could categorize a gripping motion followed by a twisting motion (e.g., tightening an object) in specific 3D space locations. Alternatively, a more straightforward implementation could involve pointing to an object to 'select' it and choosing an action from a virtual dropdown menu (e.g., selecting "tighten item with hand"). These data streams can later be used for quality assurance metrics as described in Quantitative Quality Assurance for Mixed Reality (U.S. Pat. No. 11,138,805).

5) (1205) The step procedure, along with its desired context, is stored. Steps 1202-1205 are repeated as necessary to complete the content capture.

6) (1206) In one embodiment, as information is being captured in an PC/AR/MR/VR virtual environment, it can be accessed and edited in another modality (asynchronously or synchronously). This enables seamless collaboration and interaction between various modalities during content creation or usage, allowing for a more efficient and unified authoring process.

Figure 26:
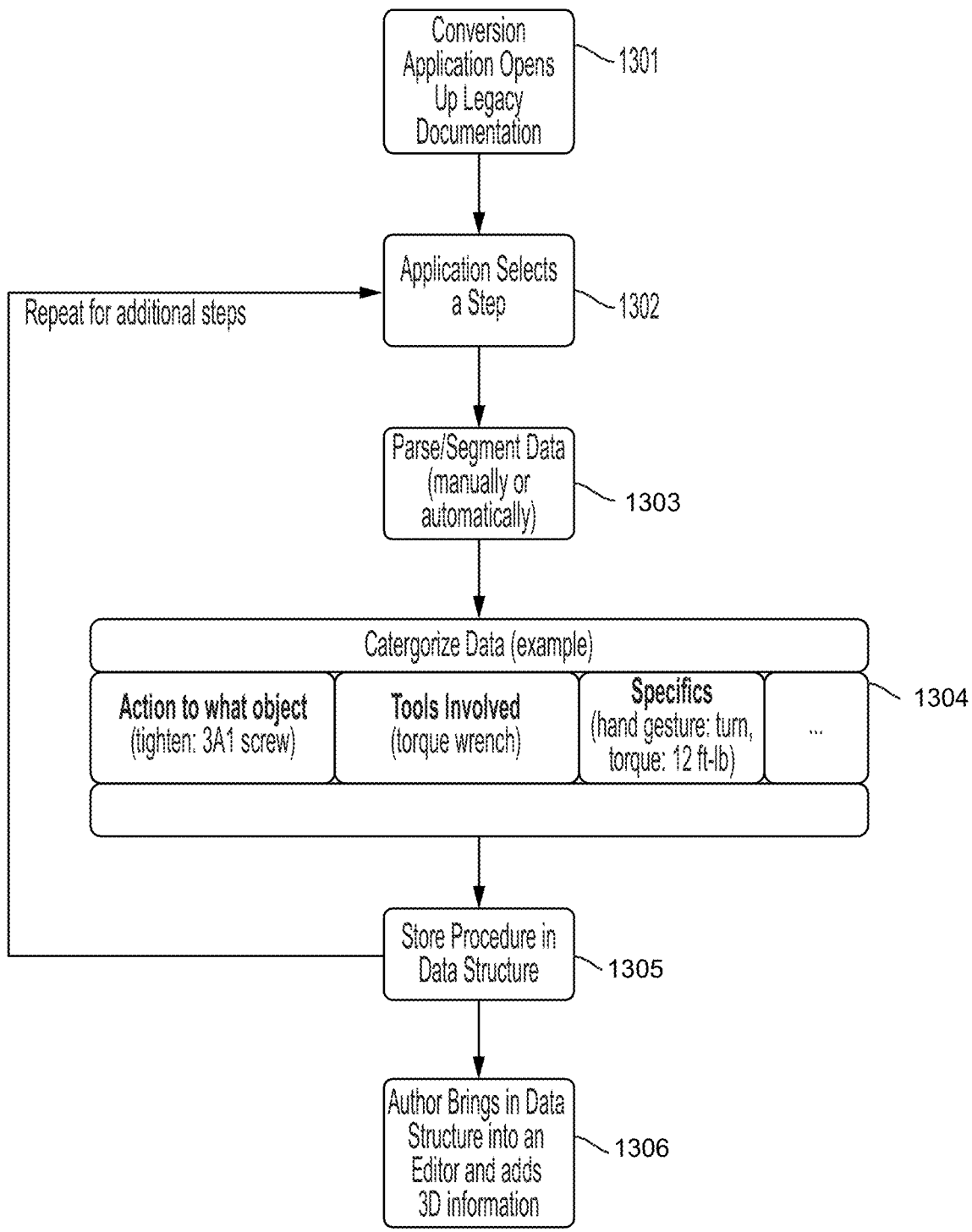
FIG. 26 shows a conceptual workflow for procedural content conversion according to an exemplary embodiment of this disclosure. Passive procedural conversion is ideal with a machine learning/algorithm based approach based on information from the original content (e.g., LLM). An example of that is the Department of Defense's MIL-STD-38784B which covers format requirements for technical manuals. Less structured information would likely need natural language processing and/or tools that people could use to streamline the conversion (e.g., labeling images in documents and cropping/saving them, "copy and paste" functionality). The "Editor" in 1306 and "Application" in 1302 can be the same software or different applications.

With reference to FIG. 26, shown is a conceptual workflow for procedural content conversion according to an exemplary embodiment of this disclosure. Passive procedural conversion is ideal with a machine learning/algorithm based approach based on information from the original content (e.g., LLM). An example of that is the Department of Defense's MIL-STD-38784B which covers format requirements for technical manuals. Less structured information can likely need natural language processing and/or tools that people could use to streamline the conversion (e.g., labeling images in documents and cropping/saving them, "copy and paste" functionality). The "Editor" in 1306 and "Application" in 1302 can be the same software or different applications.

Document Conversion (1301-1306): This stage focuses on transforming traditional documentation into data structures or bundles suitable for parallel content authoring, using machine learning algorithms, automated procedures, and advanced software tools. (1301) The author imports or opens an existing document (e.g., PDF, XML, MP4, MP3) into a conversion application. This application could be integrated into a PCA editor, eliminating the need for a separate application.

1) (1302) The application focuses on a specific step within a procedure, either through manual selection or programmatically.
2) (1303) The application uses machine learning algorithms (e.g., large language models (LLMs), advanced human toolsets, or a combination of both) to parse the step into distinct components.
3) (1304) These components are then categorized based on their characteristics, such as verbs, objects, tools used, and reference images. If the editor application is performing the parsing, 3D information about the process (e.g., hierarchy of the models with accompanying metadata, labeled images of the system or process being performed) could be fed to an LLM, for example, to provide best guesses about which object the instruction refers to. These would later be reviewed and validated by a qualified human or another process.
4) (1305) The step procedure, along with its relevant context, is stored in the data structure. Steps 1302-1305 are repeated as necessary for each step in the procedure.
5) (1306) In an embodiment, the information being converted can be accessed and edited in another mode or modality, either asynchronously or synchronously, while the conversion process is ongoing.

Embodiments

Exemplary Embodiment of a Data Structure for PCA

The following is a list of fields that can be useful in a PCA data structure. The specific fields used will depend on the task at hand. The way PCA instructions are processed (i.e., how the application interprets the value) can vary according to the implementation. For instance, a tool could be represented as a "string" value, an enumeration, or an object ID in the scene. In one embodiment, the author used object lookups in the scene based on the name to find the respective object. While this approach might not be the most elegant, it serves its purpose, and alternative methods could be employed depending on the application's requirements. The step could also contain executable code or an algorithm to do determine completion. Here are some fields that might be beneficial for a PCA data structure implementation:

procedureName: The name of the procedure or task being performed.

instructions: A list of steps or actions that make up the procedure.

InstructionName: A textual description of the action to be performed in the step.

itemNames: Names of the objects involved in the action.

verb: An ID representing the action to be performed (e.g., install, remove, etc.).

tool: An ID representing the tool used for the action.

completionValue: An ID representing the criterion for completing the action.

animationClipName: The name of the animation clip associated with the action.

activeWhenComplete: A boolean indicating if the step should remain active after completion.

highlight: A boolean indicating if the action or object should be highlighted.

highLevelForDoingTask: A high-level description of the task being performed in the step.

stepAudioName: The name of the audio file associated with the step.

publicationHighlightImageName: The name of the image file highlighting the action.

publicationPageName: The name of the publication page where the action is documented.

imageReferenceFigureIfNeededName: The name of the image file used as a reference for the action.

animationSpeed: The speed at which the animation should be played.

durationOfStep: The expected duration of the step in seconds.

cameraRotationSpeed: The speed at which the camera should rotate around the scene.

CameraPosition: The position of the camera in the scene (x, y, and z coordinates).

CameraRotation: The rotation of the camera in the scene (x, y, z, and w values representing a quaternion).

fov: The camera's field of view in degrees.

procedureAttachedToName: The name of the procedure the step is attached to.

startingStatesForStep: A list of object states before the step is executed.

endingStatesForStep: A list of object states after the step is executed.

gestureExpected: A description or ID representing the expected user gesture when performing the action.

xAPIStatement: An xAPI (Experience API) statement that describes the user's interaction with the action for tracking and analytics.

algorithmToDetermineCompleteness: A reference to an algorithm or method used to assess the completion of the action.

roomForGrowth: A placeholder for additional data or metadata that may be added in the future.

prerequisites: A list of actions or conditions that must be completed before the current step can be executed.

safetyNotes: Additional safety information or precautions to be taken while performing the action.

expertTips: Tips or advice from experts to improve the efficiency or quality of the action.

alternativeMethods: A list of alternative methods or techniques for performing the action.

troubleshooting: Guidance on how to resolve potential issues or problems that may arise during the action.

Content Creation Through Immersive Modality with Traditional Documentation Conversion This section outlines the hardware and software requirements for implementing the multimodal procedural guidance content creation and conversion system as an embodiment of this disclosure, incorporating both traditional documentation conversion classes and immersive modality. In particular, it discusses working with immersive modalities and converting traditional documents into augmented or virtual reality formats.

Hardware Requirements:

AR/VR/MR headset: A compatible headset is crucial for immersing users in an augmented reality, virtual reality, or mixed reality environments. These headsets provide real-time 3D rendering and display, allowing users to visualize and interact with the digital content overlaying the physical world. The headset's spatial tracking and mapping capabilities enable accurate alignment and registration of digital content with real-world objects, which is essential for the disclosed procedural guidance applications.

Sensor-enabled input devices: These devices are necessary for capturing the user's movements, gestures, and interactions within the AR/VR/MR environment. They provide real-time data on body positional movements, hand poses, speech, and tool usage, enabling the system to recognize and interpret user actions effectively. The high fidelity and accuracy of these sensors are crucial for creating detailed procedural guidance materials, as well as facilitating intuitive content creation and manipulation.

PC with sufficient processing capabilities: A high-performance computer is essential for handling the computational demands of the system, including rendering and processing 2D, 2.5D, and 3D content, real-time sensor data processing, and AI-assisted alignment and optimization algorithms. Adequate processing capabilities ensure smooth and responsive user experiences, improving the efficiency and effectiveness of the content creation process.

Software Requirements:

UNITY: The UNITY game engine is a critical component for developing and executing AR/VR/MR applications. Its support for various platforms and compatibility with a wide range of devices make it suitable for implementing embodiments of this disclosure. UNITY's extensive 3D rendering capabilities, physics engine, and built-in support for various sensor input data enable the seamless integration of the captured data into the procedural guidance materials. Other game engine platforms suitable for implementation of the disclosed methods and systems include, but are not limited to, UNREAL.

Authoring Tool: A custom-built software tool developed within UNITY is necessary for streamlining the content capture, segmentation, labeling, categorization, and storage processes. The tool should offer an intuitive user interface and provide features that facilitate collaboration among multiple users, ensuring a more efficient and unified authoring process. The tool should also include functionality for converting traditional documents into immersive formats, making the content accessible in AR/VR/MR environments.

Authoring Tool Classes and Functionality:

ContentCapture: This class is responsible for acquiring sensor data from the input devices and processing it in real-time. It interacts with the devices' APIs to gather relevant data and convert it into a format suitable for further processing by other classes, such as SegmentationManager, LabelingManager, SensorIntegration, and DocumentConversion.

SegmentationManager: This class receives the processed data from ContentCapture and segments it into individual steps of the procedure. It interacts with the StepProcedure class to store the segmented data and may communicate with the DataManager class to save or load previous segmentation data. It also collaborates with the LabelingManager class to ensure accurate labeling of the segmented data.

LabelingManager: This class works closely with SegmentationManager and StepProcedure classes to label and categorize the segmented data streams for each step of the procedure. It uses predefined labels and categories or custom ones defined by the user to organize the data in a meaningful and easily understandable manner. This organized data is then stored in the StepProcedure class.

StepProcedure: This class serves as the central storage unit for the captured, segmented, labeled, and categorized data for each step of the procedure, along with any desired context. It interacts with the DataManager class to facilitate data storage, retrieval, and manipulation, as well as with the CollaborationManager class to enable seamless collaboration among multiple users.

CollaborationManager: This class is responsible for managing real-time or asynchronous collaboration between multiple users with different modalities. It communicates with the StepProcedure and DataManager classes to synchronize data access and editing, ensuring a smooth and efficient collaborative content creation experience.

DataManager: This class acts as an interface for managing the storage, retrieval, and manipulation of procedural guidance data. It communicates with the StepProcedure and CollaborationManager classes to ensure that the data is stored and retrieved as required, while maintaining data integrity and consistency throughout the content creation process.

SensorIntegration: This class serves as an interface between the input devices and the ContentCapture class. It ensures seamless integration of sensor data from different sources, such as body positional movements, hand poses, speech, and tool usage. By establishing a standardized data format, it allows for easy data processing and compatibility with other classes in the system.

DocumentConversion: This class is responsible for converting traditional documentation formats, such as PDFs, Word documents, or images, into immersive AR/VR/MR-compatible formats. It works in conjunction with the ContentCapture, SegmentationManager, and LabelingManager classes to ensure a smooth integration of traditional documentation within the procedural guidance materials.

Implementation Section This section outlines the steps required for implementing the multimodal creation and editing system for parallel content authoring as an embodiment of this disclosure, using the hardware, software, and classes described in the previous sections.
1) Hardware Configuration: Set up and configure the AR/VR/MR headset, sensor-enabled input devices, and high-performance PC to ensure proper communication, data transfer, and processing capabilities. This includes calibrating the headsets and input devices for accurate tracking, alignment, and registration within the AR/VR/MR environment.
2) Software Setup: Install and configure UNITY to develop the multimodal content authoring application. This includes setting up the development environment, import support and necessary libraries and packages for AR/VR/MR support, and configuring the build settings for the target platform and devices.
3) Authoring Tool Development: Design and implement the custom-built authoring tool within UNITY to streamline the content capture, segmentation, labeling, categorization, and storage processes. Develop an intuitive user interface and features that facilitate collaboration among multiple users. Incorporate functionality for converting traditional documents into a parallel content authoring format, making the content accessible in AR/VR/MR environments.
4) Class Development: Develop the main classes for the authoring tool, including ContentCapture, SegmentationManager, LabelingManager, StepProcedure, CollaborationManager, DataManager, SensorIntegration, and DocumentConversion. Implement the methods and properties for each class, ensuring proper functionality and interaction with the AR/VR/MR environment and other classes.
5) Integration: Integrate the developed classes, user interface, and AR/VR/MR environment within the UNITY application.
6) Collaboration Support: Implement the CollaborationManager class to enable real-time or asynchronous collaboration between multiple users with different modalities.
7) Documentation and Training: Create documentation and training materials to guide users in the operation of the multimodal content authoring system, including hardware setup, software installation, and basic usage of the authoring tool. Provide step-by-step instructions and best practices for capturing, segmenting, labeling, categorizing, and storing procedural guidance materials using the system, as well as converting traditional documents into immersive formats.

By following these implementation steps, the multimodal creation and editing system for parallel content authoring can be successfully developed and deployed, providing users with an efficient, effective, and virtual method for creating and managing procedural guidance materials in a virtual environments. The added functionality for converting traditional documents into immersive formats further enhances the system's usability, ensuring that existing documentation can be easily integrated and accessed within the immersive environments. This comprehensive solution streamlines the content creation process and facilitates seamless collaboration among multiple users, ultimately improving the overall effectiveness and accessibility of procedural guidance materials.

Capturing Sensor Data in an AR Environment and Translating it into Meaningful Content for Other Modalities In this embodiment, the disclosed method and system is applied in an industrial maintenance setting where an expert technician is tasked with capturing step-by-step procedural guidance for replacing a component within a complex machine. The technician utilizes an AR headset equipped with various sensors to perform the procedure while the disclosed method and system captures sensor data and translates it into meaningful content for other modalities.
1) The technician dons the AR headset, which is equipped with sensors such as cameras, accelerometers, gyroscopes, and microphones, enabling the capture of visual, spatial, and auditory information during the procedure.
2) As the technician performs the procedure, the AR headset displays relevant 3D models and instructions in real-time, overlaying them on the physical environment. The sensors capture the technician's movements, interactions with the machine, and verbal instructions or comments. Tools that the technician is using, if electronic, can stream data to headset.
3) The captured data is processed and analyzed by the disclosed underlying algorithms. These algorithms identify and segment the data into individual steps, recognizing actions such as gripping, twisting, or attaching components.
4) The segmented data is then automatically labeled and categorized according to the identified actions and their corresponding 3D spatial locations within the machine. The system may also utilize speech-to-text conversion for any verbal instructions provided by the technician, ensuring that the captured data includes both visual and textual information.
5) Then the captured sensor data is translated into a common data structure or bundle that is compatible with other modalities such as 2D, 2.5D video, and 3D. This enables the procedural guidance to be shared and accessed across multiple platforms and devices, including smartphones, tablets, PCs, and VR headsets.
6) The resulting content can be further edited, refined, or annotated by other team members using different modalities, allowing for a collaborative and efficient content creation process.

This embodiment demonstrates the ability to capture sensor data in an AR environment and translate it into meaningful content for other modalities, streamlining the process of creating procedural guidance and making it more accessible across various platforms and devices.

Utilization in a Workplace Setting for Creating and Following Procedural Guidance In this embodiment, the disclosed method and system is applied in a manufacturing facility where a team of technicians needs to create and follow procedural guidance for the assembly of a complex product. The team utilizes multimodal content creation capabilities to efficiently author and access the procedural guidance across various platforms and devices.
1) The manufacturing facility's lead technician, wearing an AR headset, performs the assembly procedure for the complex product. The AR headset captures sensor data, including the technician's movements, interactions with components, and verbal instructions.
2) The captured sensor data is processed and translated into meaningful content for other modalities, as described in the Capturing Sensor Data in an AR Environment and Translating it into Meaningful Content for Other Modalities embodiment. The resulting procedural guidance is then stored in a common data structure or bundle, making it accessible across multiple platforms and devices.

3) The lead technician collaborates with colleagues using different modalities, such as PCs and tablets, to review, refine, and annotate the procedural guidance. This collaborative process ensures the guidance is comprehensive, accurate, and easy to follow.

4) Once the procedural guidance is finalized, it is distributed to the team of technicians through their preferred modalities. For example, some technicians may access the guidance using AR headsets, while others may prefer tablets or PCs.

Exemplary Embodiment for Converting a S1000D Document into a PCA Structure Utilizing OpenAI The following is an exemplary embodiment to convert a textual instruction, in this example a S1000D document into a PCA structure using the OpenAI API and UNITY, you can follow these steps:

1) Parse the XML document: First, extract the relevant information from the S1000D XML document. You can use an XML parser to navigate and obtain the procedural steps, as well as any additional information you want to include in the PCA structure.

2) Process the steps with OpenAI API: For each step, use the OpenAI API to break down the text into subject, verb, object, and other information. You can send the step information (e.g., text, picture) to the API and get the required information.

3) Within UNITY, identify relevant objects in the UNITY scene hierarchy based on the parsed object information. You can use techniques such as string matching, or more advanced natural language processing methods to find the most likely object references in the scene.

4) Store information in a PCA structure.

5) Utilize other methods within MC3 to fill in the remaining gaps in data that were not available with the source documentation and validate.

The same logic could be used to send text information deriving from different formats (e.g., language parsing of a video, audio recording, PDF) and this example should be considered non-limiting.

Further Nonlimiting Exemplary Embodiments

A method for converting unstructured or interactive modality-derived information into a data structure suitable for multimodal distribution, incorporating AI-related technologies, comprising the steps of:

1.1. Importing or opening a document, video, or voice recording in a conversion application, or obtaining data from an interactive modality, such as virtual reality, augmented reality, or a 2D virtual environment;

1.2. Identifying specific steps within a procedure in the source information, either through manual selection, programmatically, or by observing user interactions in an interactive modality;

1.3. Parsing the identified steps into distinct components using AI-based machine learning algorithms, advanced human toolsets, or a combination of both;

1.4. Categorizing the parsed components based on their characteristics, such as verbs, objects, tools used, and reference images, using AI-based classification methods; generating images or videos directly from source images or by utilizing known information about the step and its context within the procedure, leveraging AI-based technology, such as generating 3D scene information through prompts or extracting relevant visual information from existing multimedia sources;

1.5. Storing the parsed and categorized components, including the generated images or videos, in a data structure designed for multimodal distribution; and 1.6. Enabling access and editing of the information in another mode or modality, either asynchronously or synchronously, while the conversion process is ongoing.

A system for creating tailored language guidance from a data structure intended for multimodal distribution, derived from unstructured or interactive modality-derived information, incorporating AI-related technologies, comprising:

2.1. A data structure containing parsed and categorized components of a procedure, generated from unstructured information or interactive modality-derived data;

2.2. An end application configured to parse the data structure;

2.3. A large language model (LLM), an AI-based technology, integrated with the end application;

2.4. The end application utilizing the LLM to reconstruct or tailor language guidance based on the parsed data structure; and 2.5. The reconstructed or tailored language guidance being output in the form of text or voice, based on user preferences or device capabilities.

A method for creating tailored language guidance from a data structure intended for multimodal distribution, derived from unstructured or interactive modality-derived information, incorporating AI-related technologies, comprising the steps of:

3.1. Receiving a data structure containing parsed and categorized components of a procedure, including generated images, videos, or other multimedia content, derived from unstructured information or interactive modality-derived data;

3.2. Parsing the data structure using an end application designed for processing and interpreting the multimodal data;

3.3. Integrating a large language model (LLM), an AI-based technology, with the end application to enhance the generation of language guidance and other generative content, such as images or videos, based on the parsed data structure;

3.4. Utilizing the LLM within the end application to reconstruct or tailor language guidance and other generative content based on the parsed data structure, which includes the generated images, videos, or multimedia content, while considering context, user preferences, and specific requirements;

3.5. Leveraging additional AI-based generative models, such as Generative Adversarial Networks (GANs), to create or refine images, videos, or multimedia content that complements the tailored language guidance;

3.6. Dynamically adapting the generated language guidance and other generative content to the user's interactions, preferences, or changes in the underlying data structure, ensuring an up-to-date and personalized experience; and 3.7. Outputting the reconstructed or tailored language guidance in the form of text or voice, along with the associated images, videos, or multimedia content, based on user preferences, device capabilities, and the specific context in which the guidance is being provided.

Non-Exclusive Set of General Types of Use-Cases

Agriculture and farming practices, Aircraft maintenance and repair, Art and design instruction, Assembly line worker guidance, Automotive assembly and repair, Civil engineering and construction, Computer hardware assembly and repair, Construction and building, Culinary arts and cooking techniques, Data center maintenance, Dental and medical procedures, Elevator and escalator maintenance, Electronics manufacturing, Facility maintenance and repair, Firefighting training and operations, Forestry and logging operations, Furniture assembly and repair, Hazardous materials handling, HVAC system installation and maintenance, Industrial cleaning and sanitation, Industrial machinery operation, Laboratory procedures and protocols, Law enforcement training and tactics, Marine vessel maintenance and repair, Medical device assembly, Mining and mineral extraction, Musical instrument repair and tuning, Oil and gas equipment maintenance, Pest control and extermination, Pharmaceutical manufacturing, Plumbing and electrical work, Product demonstrations and sales, Professional photography and videography, Quality control and inspection, Robotics programming and operation, Safety training and emergency response, Solar and wind energy system maintenance, Sports coaching and training, Textile and garment manufacturing, Telecommunications infrastructure setup, Virtual reality gaming and simulation, Warehouse operations and inventory management, Water treatment plant operations, Welding and metal fabrication Novel Components Multi-modal parallel content authoring: The ability to create and edit procedural guidance content across different modalities (2D, 2.5D video, and 3D) and devices (PC, AR/MR, and VR) with a single authoring process, improving efficiency and reducing the need for separate content creation processes.

1. Unified data bundle format: Utilization of a standardized data bundle format that enables the seamless interchange of actions and information captured across different modalities (VR, AR, and MR) and devices.
2. Passive procedural content creation: The system can capture meaningful content passively while users perform their tasks naturally in a mixed reality environment, without requiring explicit interaction from the users.
3. Real-time collaboration and editing: Allows multiple users with different modalities to work together synchronously or asynchronously to create, edit, and review content, fostering enhanced collaboration and efficiency.
4. Automated segmentation and categorization: The system can automatically segment and categorize captured data streams (e.g., hand motions, eye-tracking, speech, tool usage) into meaningful procedural steps, reducing the manual effort required in content creation.
5. Integration of electronic tool data: Capture and incorporate additional data from electronic tools used during the procedure, providing a more comprehensive set of information for the procedural guidance.
6. Quality assurance metrics: The captured data streams can be utilized for quality assurance purposes, ensuring that the created content adheres to specific standards or guidelines, as described in Quantitative Quality Assurance for Mixed Reality (U.S. Pat. No. 11,138,805).
7. Traditional Documentation Conversion: The system includes functionality to convert existing traditional documentation (e.g., PDFs, Word documents, and images) into immersive formats compatible with AR/VR/MR environments. This feature allows users to seamlessly integrate and access previous documentation within an immersive context, enhancing the overall utility of the system.
8. AI-assisted Alignment and Optimization: Utilization of artificial intelligence algorithms to assist in the alignment and optimization of procedural guidance content, ensuring that the content is accurately registered with real-world objects and situations. This feature increases the effectiveness and accuracy of the guidance materials, improving the user experience.
9. Context-aware Content Adaptation: The system is capable of adapting procedural guidance content based on the user's context, such as their role, expertise, or location. This context-aware feature provides personalized guidance, enhancing the learning process and ensuring that users receive relevant information tailored to their needs.
10. Multilingual Support: Incorporates multilingual support, allowing users to create, edit, and access procedural guidance materials in various languages. This feature expands the system's usability and accessibility, catering to a diverse user base and supporting global collaboration.
11. Accessibility Features: The system includes accessibility features such as text-to-speech, speech-to-text, and adjustable font sizes or colors, ensuring that users with different abilities can effectively engage with the content. These features promote inclusivity and widen the range of potential users who can benefit from the system.
12. Content Versioning and Revision Tracking: Providing versioning and revision tracking capabilities, enabling users to manage multiple versions of procedural guidance materials and track changes over time. This feature facilitates content maintenance, ensuring that users can easily access the most up-to-date and relevant information.
13. These additional novel components, along with the previously mentioned features, contribute to the uniqueness and patentability of this disclosure and exemplary embodiments described herein. By addressing the challenges and limitations of existing systems and offering a more efficient, intuitive, and collaborative approach to content authoring in mixed reality environments, this system provides a comprehensive solution for creating and managing procedural guidance materials.

By addressing the challenges and limitations of existing systems and offering a more efficient, intuitive, and collaborative approach to content authoring in mixed reality environments, this system provides a comprehensive solution for creating and managing procedural guidance materials.

Figure 27:
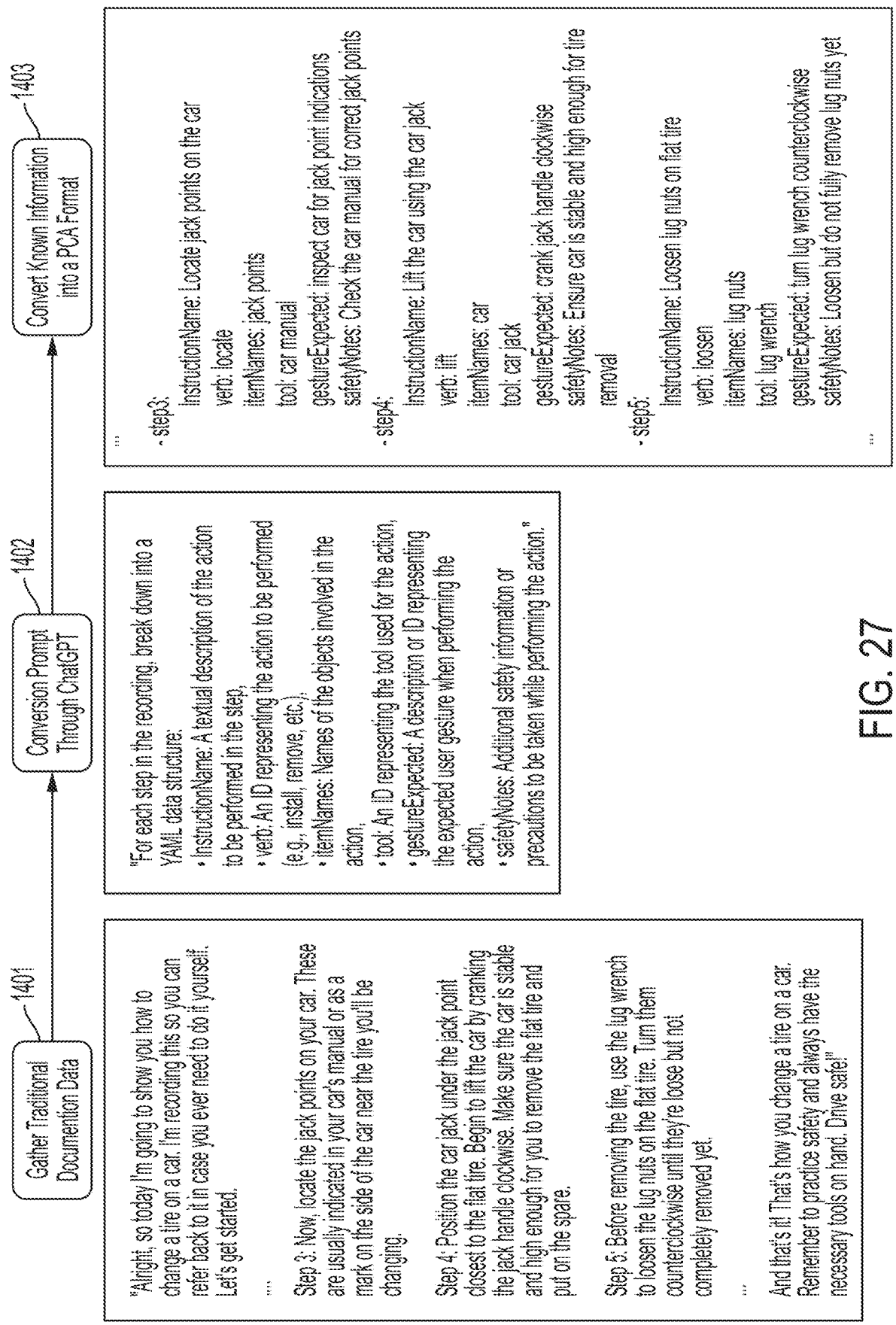
FIG. 27 shows an example of a tire changing procedure video recording used to illustrate the process of extracting the audio, converting it to text, and inserting it into a prompt with CHATGPT according to an exemplary embodiment of this disclosure. The resulting text is then parsed through the LLM and placed into a PCA data structure that is declared in another prompt. This could very easily be done all through UNITY accessing OpenAI's API. To avoid redundancy, only steps 3-5 are shown in the tire changing process. In this example, the end format chosen is YAML (could be another like JSON or XML), and only a few fields of information are extracted from the source information. It is important to note that further processing can be done to add 3D information or any other information that is not available from the source material. The opposite process is possible going from the PCA format to a full text description of the step using the fields as discussed in the original Parallel Content Authoring disclosure.

With reference to FIG. 27, shown is an example of a tire changing procedure video recording used to illustrate the process of extracting the audio, converting it to text, and inserting it into a prompt with CHATGPT (1401 and 1402) according to an exemplary embodiment of this disclosure. The resulting text is then parsed through the LLM and placed into a PCA data structure 1403 that is declared in another prompt. This could very easily be done all through UNITY accessing OpenAI's API. To avoid redundancy, only steps 3-5 are shown in the tire changing process. In this example, the end format chosen is YAML (could be another like JSON or XML), and only a few fields of information are extracted from the source information. It is important to note that further processing can be done to add 3D information or any other information that is not available from the source material. The opposite process is possible going from the PCA format to a full text description of the step using the fields as discussed in the original Parallel Content Authoring disclosure.

Blockchain-Based Digital Twins for Maintenance Systems

According to another aspect of this disclosure, provided is a Blockchain-Based Digital Twins method and system for Maintenance Systems. More specifically, disclosed is a blockchain-based system for managing discrepancies, assigning procedures, ensuring quality assurance, and updating digital twins with real-world information. This system uses a combination of smart contracts and a decentralized network to facilitate transparency, security, and efficiency in various industries such as manufacturing, construction, and maintenance. The system comprises multiple block types, each representing a specific aspect of the process: marking up discrepancies, assigning Parallel Content Authored instructions, completing tasks with quantitative quality assurance, and updating digital twins. By leveraging the inherent advantages of blockchain technology, this system aims to provide an auditable, tamper-proof record of the entire process while streamlining interactions between different blocks.

Blockchain technology is a decentralized digital ledger that enables secure, transparent transactions without the need for a central authority. Comprising a network of computers maintaining a growing list of records, or blocks, linked and secured through cryptography, blockchain offers a range of benefits including enhanced security, transparency, and efficiency. Its transparent nature allows all parties to access the same information, minimizing the risk of fraud and errors. Blockchain has the potential to revolutionize various industries by transforming how businesses and digital interactions are conducted.

Digital twins are virtual replicas of physical systems, processes, or assets that utilize real-time data and analytics to simulate behavior and performance. These digital representations facilitate monitoring, analysis, and optimization of physical systems, leading to predictive maintenance, improved performance, and reduced downtime. Digital twins can be applied across numerous industries, offering advantages such as increased efficiency, cost reductions, and enhanced safety.

Computerized Maintenance Management System (CMMS) software typically centralizes tracking and management of maintenance tasks, work orders, equipment, inventory, and personnel. However, integrating blockchain technology and digital twins with CMMS software could address challenges such as data security and privacy, data accuracy and transparency, and interoperability.

By employing a blockchain-based back end with digital twins, the security, accuracy, transparency, and interoperability of CMMS software can be significantly improved. The fusion of these technologies also yields additional benefits, including reduced downtime, improved asset utilization, increased trust and transparency, and superior cost control. These benefits contribute to an organization's overall performance and success.

Additionally, the integration of blockchain for CMMS and digital twins can provide non-obvious benefits, including enhanced compliance, superior data analysis, increased automation, and improved collaboration. These advantages enable organizations to optimize maintenance management processes, reduce costs, and boost overall performance. A notable functionality of this methodology is the ability to rewind the digital twin to a known state for testing and simulation purposes. Integrating testing and simulation of previous states of the digital twin's history into a blockchain-based system offers the following benefits over current methods:

1) What-if analysis: Rewinding the digital twin to previous states enables what-if analyses on past maintenance events or decisions. This facilitates understanding the impact of alternative actions and identifying better approaches for future events.
2) Predictive maintenance: Testing and simulating previous states of the digital twin provides insights into system wear and tear patterns. This information can be used to develop predictive maintenance strategies that proactively address potential issues, reducing downtime and maintenance costs.
3) Performance optimization: Simulations help identify bottlenecks, inefficiencies, or suboptimal configurations in the system's history. By analyzing and comparing different scenarios, maintenance teams can determine the most effective strategies for optimizing system performance.
4) Improved training: Simulating previous states of the digital twin allows new maintenance personnel and operators to be trained on historical events and scenarios. This hands-on experience with real-world data improves their understanding of the system and its needs.
5) Root cause analysis: When system failures or issues occur, rewinding the digital twin to previous states aids in conducting thorough root cause analyses. Examining historical data and simulating events leading up to the issue enables maintenance teams to identify root causes and implement corrective measures to prevent future occurrences.
6) Validation and verification: Rewinding the digital twin and simulating past events can be used to validate and verify the effectiveness of maintenance procedures, tools, and equipment, ensuring that maintenance processes are up to date and compliant with industry standards and regulations.

Integrating blockchain technology and digital twins with CMMS software can revolutionize maintenance management by addressing existing challenges and providing both obvious and non-obvious benefits. This innovative approach has the potential to significantly enhance efficiency, cost control, and overall performance across various industries.

The disclosed embodiments and systems relate to a blockchain-based digital twin maintenance system for managing and optimizing maintenance processes within various industries. The system leverages the power of digital twins, blockchain technology, smart contracts, and Internet of Things (IoT) devices to create a secure, efficient, and transparent maintenance management solution. The disclosed blockchain based system provides numerous benefits that enhance the effectiveness of maintenance operations, including:

a) Real-time monitoring and data collection: By creating digital twins for each piece of equipment and deploying IoT sensors for direct measurements and indirect sensor readings (e.g., quantitative quality assurance using mixed reality), the system provides continuous monitoring and real-time data collection on equipment and personnel performance. This allows for the timely identification of discrepancies, malfunctions, or anomalies, leading to improved decision-making and reduced downtime.
b) Immutable record of maintenance processes: The use of blockchain technology ensures that all maintenance-related transactions are securely recorded in an immutable ledger. This provides a transparent and tamper-proof history of maintenance operations, enhancing traceability and accountability.
c) Automated work order assignment: Smart contracts, which are self-executing computer programs that operate on blockchain technology. As a fundamental aspect of many blockchain systems, smart contracts facilitate the automation of numerous processes and transactions, without the involvement of intermediaries or human intervention. By leveraging smart contracts, it becomes possible to establish a streamlined system for the interaction between different blocks, triggering the creation and assignment of jobs upon the detection of discrepancies, or the initiation of subsequent logging actions upon the completion of tasks. This leads to a highly efficient and streamlined work order assignment process, reducing delays and improving overall maintenance efficiency.
d) Quantitative quality assurance measurements: The completion of repair tasks and the recording of quantitative quality assurance measurements are stored as transactions on the blockchain. This enables easy tracking and analysis of maintenance performance, promoting a high level of quality control.
e) Predictive maintenance and failure models: By analyzing the data collected from the blockchain transactions, the system can construct failure models and maintenance profiles for the equipment and technicians. This enables predictive maintenance strategies, optimizing maintenance schedules, and reducing the likelihood of equipment failures.
f) Scalable and adaptable solution: The blockchain-based digital twin maintenance system is designed to be scalable and adaptable to various industries and applications. This enables organizations to implement the system in diverse contexts, realizing the benefits of a secure, efficient, and transparent maintenance management solution.

Overall, the present disclosure provides a comprehensive and innovative solution for managing maintenance processes, leveraging the latest advancements in digital twin technology, blockchain, smart contracts, and IoT devices. By offering numerous benefits, the system aims to improve maintenance efficiency, reduce costs, and enhance equipment reliability.

Blockchain-Based Digital Twins for Maintenance Systems

A blockchain-based system, according to an embodiment, is provided to track and manage discrepancies, assign procedures, ensure quality assurance, and update digital twins with real-world information. The system includes four types of blocks, in this non-limiting example: Discrepancy/Observation Block 1501, Procedure Assignment Block 1502, Task Completion Block 1503, and Digital Twin Update Block 1504. Each block serves a specific purpose and interacts with other blocks to maintain a transparent and tamper-proof record of the entire process. A digital twin uses a ledger of historical information (1505) to present the current known state (1500). It's also worth noting that this ability to manage the state of the digital twin via blockchain, allows the functionality of simulation and testing of not only the current state, but to rewind the state of the digital twin to any point in the blockchain.

In practice, the flow of block events is created and added to the blockchain as follows, noting that the list of events/blocks are non-limiting:

Block Event 1) Discrepancy/Observation (DO) blocks 1501 can be used not only in routine observation (e.g., Internet of Things, or a manual reading) but to record defects (it's worth noting that the two can be separated to be two different types of blocks). For purposes of illustration, a discrepancy is identified in the system (e.g., during a routine inspection or as a result of a reported issue). A Discrepancy/Observation Block (1501) is created with the relevant information and added to the blockchain (1506) which contains the history of previous events (1505). A non-limiting example of a Discrepancy/Observation Block can contain:
  a) A unique identifier for the discrepancy.
  b) A timestamp indicating when the discrepancy/observation was identified.
  c) The location of the discrepancy/observation in the system.
  d) A detailed description of the discrepancy/observation.
  e) The severity or priority of the discrepancy/observation (if applicable).
  f) The status of the discrepancy/observation (e.g., open, in progress, resolved, informative).

Block Event 2) Based on the identified discrepancy, a Parallel Content Authored (PCA) instruction is assigned to resolve the issue. A Procedure Assignment Block (1502) is created, linking it to the corresponding DO Block (1501), and added to the blockchain (1507). A non-limiting example of a Procedure Assignment Block can contain:
  a) A unique identifier for the procedure assignment.
  b) The unique identifier of the associated Discrepancy Block.
  c) A timestamp indicating when the procedure was assigned.
  d) A unique identifier for the part being installed (this could also serve as a reference to that system's digital twin block chain).
  e) A detailed description of the PCA instructions.
  f) The identity of the person or entity responsible for carrying out the instructions.
  g) The status of the procedure assignment (e.g., assigned, in progress, completed).

Block Event 3) The assigned PCA instruction is carried out, and the task is completed. A Task Completion Block (1503) is created, containing the detailed report of the work performed and the results of the Quality Assurance (QQA). This block is linked to the corresponding Procedure Assignment Block (1507) and added to the blockchain (1508). A non-limiting example of a Task Completion Block can contain:
  a) A unique identifier for the task completion.
  b) The unique identifier of the associated Procedure Assignment Block.
  c) A timestamp indicating when the task was completed.
  d) A detailed report of the work performed.
  e) The results of the QQA, including confidence values and any additional metrics used for evaluation.
  f) The status of the task completion (e.g., successful, unsuccessful).

Block Event 4) The digital twin is updated (1509) with the latest information. If the update is successful, a confirmation block, linked to the Digital Twin Update Block (1504), is added to the blockchain (1510). In case the update is unsuccessful, an "Update Unsuccessful" block is added instead, indicating the need for further action. A non-limiting example of a Digital Twin Update Block can contain:
  a) A unique identifier for the digital twin update.
  b) The unique identifier of the associated Task Completion Block.

c) A timestamp indicating when the digital twin was updated.

d) A detailed description of the real-world data collected.

e) A summary of the changes made to the digital twin.

f) The status of the digital twin update (e.g., successful, unsuccessful).

Block Event 5) This process continues with new events (Discrepancy Blocks, Procedure Assignment Blocks, Task Completion Blocks, and Digital Twin Update Blocks) being added to the blockchain as new maintenance occurs. The blockchain maintains a transparent and tamper-proof history of all events, allowing stakeholders to track progress, identify patterns, and ensure the integrity of the system.

By implementing this blockchain-based system, organizations can enhance the efficiency and reliability of their maintenance processes while ensuring a secure, transparent, and auditable record of all events related to the system and its digital twin.

Test and Simulation of Digital Twin Using Blockchain Rewinding

By incorporating testing and simulation capabilities into a blockchain-based maintenance system, organizations can gain a deeper understanding of their systems, optimize performance, and proactively address potential issues, ultimately leading to more efficient and effective maintenance processes.

The methodology to achieve this includes the following steps:

Step 1) Index the digital twin states: Create an index that maps each Digital Twin Update Block (1503) to its corresponding state in the digital twin's history. This will make it easier to identify and retrieve specific states based on the associated blockchain blocks.

Step 2) Retrieve the desired state: To rewind the digital twin to a specific state, use the index to identify the Digital Twin Update Block (1504) corresponding to that state. Retrieve the block and extract the necessary data (e.g., real-world data collected and changes made to the digital twin at that point in time).

Step 3) Create a snapshot of the current state: Before making any changes to the digital twin, create a snapshot of its current state. This allows the digital twin to revert back to its present state after the testing and simulation are completed.

Step 4) Reconstruct the digital twin state: Using the data extracted from the Digital Twin Update Block (1504), reconstruct the digital twin to match the desired state. This may involve undoing certain changes or applying previous updates to the digital twin.

Step 5) Perform testing and simulation: With the digital twin rewound to the desired state, conduct the necessary testing and simulation tasks. This could include running different scenarios, analyzing the impact of specific events, or validating the accuracy of the digital twin's data.

Step 6) Revert to the current state: Once the testing and simulation tasks are completed, use the snapshot created in Step 3 to revert the digital twin back to its present state.

By following this methodology, the digital twin can effectively be rewound to a known state for testing and simulation purposes while maintaining the integrity of the blockchain and ensuring a transparent and tamper-proof record of all events related to the system and its digital twin.

Automated Work Order Assignment

To implement the automated work order assignment feature, the system needs to store additional information about each maintenance technician in a dedicated block type, referred to as the Technician Profile Block. This block can either reside on the same blockchain as the rest of the system or be referenced from another blockchain (e.g., a dedicated blockchain for personnel). This block can contain information such as their skills, certifications, availability, and location. The Task Completion Block metrics can provide valuable data on the technician's past performance, which can also be used in the assignment process.

This information could be stored on two separate blockchains. In some cases, it might make sense to have a dedicated blockchain for personnel information to ensure better privacy and data management. The Technician Profile Block data can be securely accessed and referenced from the main system blockchain using cross-chain communication protocols.

However, having all the information on a single blockchain can also provide certain benefits, such as simplified data management, easier cross-referencing between blocks, and potentially faster processing times. The choice between a single blockchain or two separate blockchains can depend on the specific requirements and constraints of the system, including data privacy, scalability, and performance considerations.

Provided below is an example flow of an automated work order:

1) A new Discrepancy Block 1501 is created when a discrepancy is identified in the system, containing relevant details about the discrepancy, such as location, description, severity, and status.

2) The system initiates the work order assignment process using smart contracts. The smart contract evaluates the requirements of the task, such as the necessary skills and certifications, the priority of the task, and the location of the equipment.

3) The smart contract searches the blockchain for Technician Profile Blocks containing relevant skills and certifications and retrieves their availability and location data. This information can be stored within the Technician Profile Block or fetched from an external system.

4) The smart contract analyzes the retrieved data, considering factors such as technician's skills, past performance (from Task Completion Block 1503 metrics), availability, and proximity to the equipment. Based on these factors, the smart contract identifies the most suitable technician for the task.

5) A new Procedure Assignment Block is created, containing details about the assigned task, the associated Discrepancy Block, and the selected technician's identity. The status of the Procedure Assignment Block is set to "assigned."

6) The selected technician receives a notification about the new work order assignment, along with relevant information from the Procedure Assignment Block 1502 and the Discrepancy Block 1501.

7) Once the technician completes the task, a Task Completion Block 1503 is created with the necessary details, including a report of the work performed and the results of the Quality Assurance (QQA) evaluation.

8) The Task Completion Block 1503 metrics are updated with the technician's latest performance data, which can be used for future work order assignments.

By automating work order assignment using smart contracts, the system can streamline the assignment process, reduce delays, and improve overall maintenance efficiency. Additionally, this approach allows for more informed decision-making by considering various factors, such as the technician's skills, past performance, availability, and proximity to the equipment. This is only one example of a smart contract possible with this methodology and this should be considered non-limiting.

Methodology

The following is an exemplary of an embodiment for a blockchain-based system that can be created to manage observations, discrepancies, assign procedures, ensure quality assurance, and update digital twins with real-world information. This system can significantly improve transparency, security, and efficiency in various industries, such as manufacturing, construction, and maintenance.

Hardware: To implement the blockchain-based system, a network of servers or nodes will be needed to maintain and synchronize the blockchain. These nodes can be built on industry-standard hardware, such as x86-based servers or even more specialized hardware like Single Board Computers (SBCs) to optimize for power consumption and footprint. The choice of hardware will depend on the performance and scalability requirements of the system.

Software: The software stack for the system includes a blockchain platform (e.g., ETHEREUM, HYPERLEDGER FABRIC, or a custom-built platform) to manage the blockchain and execute smart contracts. The choice of platform will depend on factors such as performance, security, and ease of integration with existing systems. Additionally, a user interface will be developed to facilitate interaction with the blockchain and manage the processes related to discrepancies, procedures, tasks, and digital twins.

Step-By-Step Process for Basic Implementation:
1) Define the data structure for each type of block (e.g., Discrepancy/Observation Block 1501, Procedure Assignment Block 1502, Task Completion Block 1503, Digital Twin Update Block 1504) and the smart contracts that govern their interactions.
2) Choose a suitable blockchain platform (e.g., ETHEREUM, HYPERLEDGER FABRIC) and consensus mechanism (e.g., Proof of Work, Proof of Stake) based on factors such as performance, security, and ease of integration.
3) Set up a secure and decentralized network of nodes using the chosen hardware and software components. Ensure proper configuration and synchronization of the nodes to maintain the blockchain.
4) Develop a user interface for interacting with the blockchain and managing the processes related to discrepancies, procedures, tasks, and digital twins. This interface should be intuitive and user-friendly to facilitate adoption.
5) Integrate the blockchain-based system with existing tools and technologies used for managing discrepancies, procedures, tasks, and digital twins, ensuring seamless data exchange and interoperability.
6) Test the system thoroughly to ensure that it meets performance, security, and usability requirements. Perform simulations and real-world tests to validate the effectiveness of the system.
7) Deploy the system and onboard users, providing necessary training and support to ensure successful adoption. Monitor the system's performance and address any issues that arise during the initial rollout.

By following this methodology, a comprehensive blockchain-based system can be created to manage discrepancies, assign procedures, ensure quality assurance, and update digital twins with real-world information. This system has the potential to significantly improve transparency, security, and efficiency in various industries, such as manufacturing, construction, and maintenance.

Figure 28:
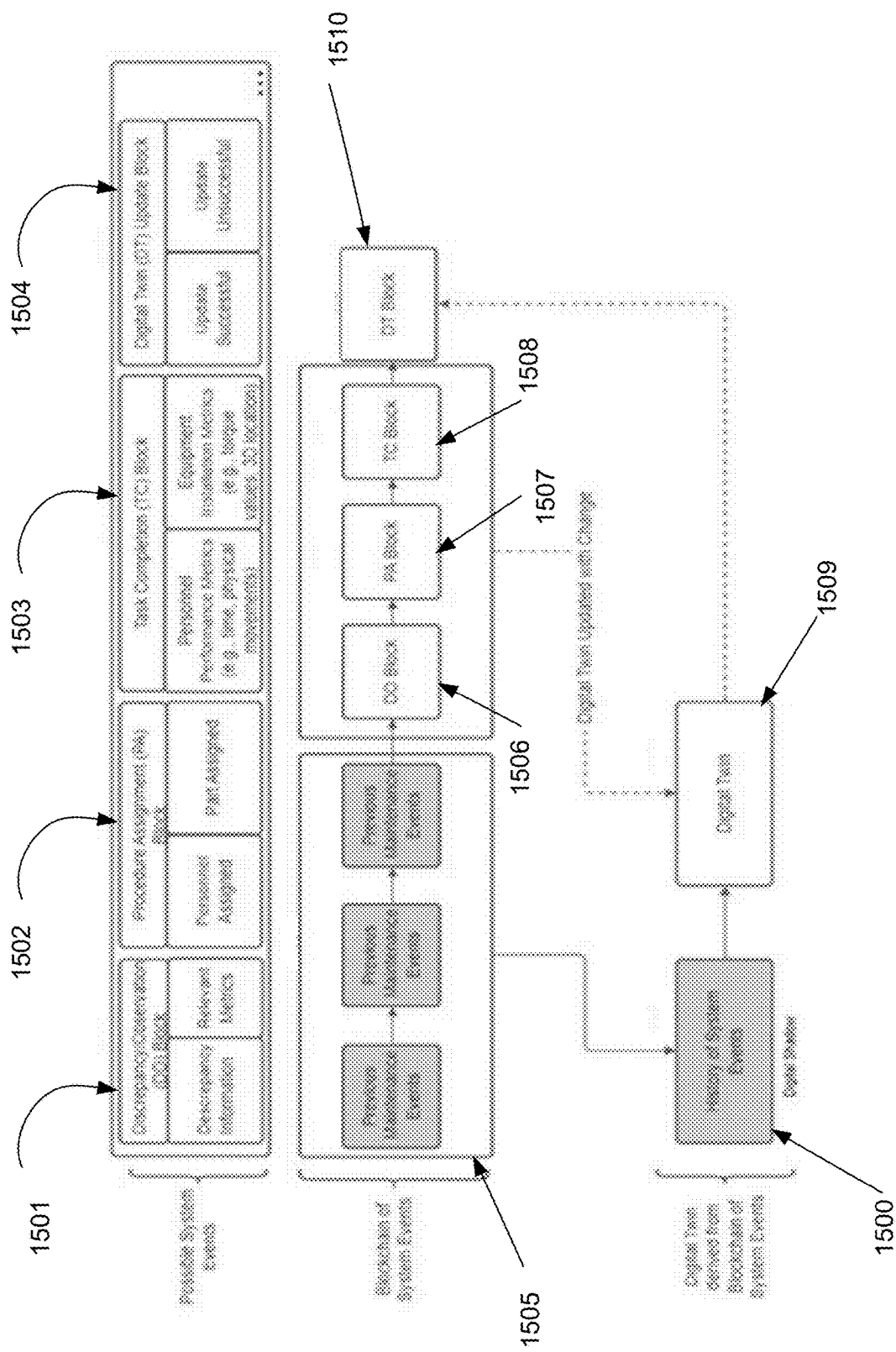
FIG. 28 illustrates three distinct concepts of information. The upper layer presents potential, non-exhaustive maintenance events/blocks (1501, 1502, 1503, and 1504). The middle layer depicts the blockchain consisting of system events. The lower layer represents the state of the digital twin of the system, which is derived from the blockchain.

FIG. 28 illustrates three distinct concepts of information. The upper layer presents potential, non-exhaustive maintenance events/blocks (1501, 1502, 1503, and 1504). The middle layer depicts the blockchain consisting of system events. The lower layer represents the state of the digital twin of the system, which is derived from the blockchain.

Figure 29:
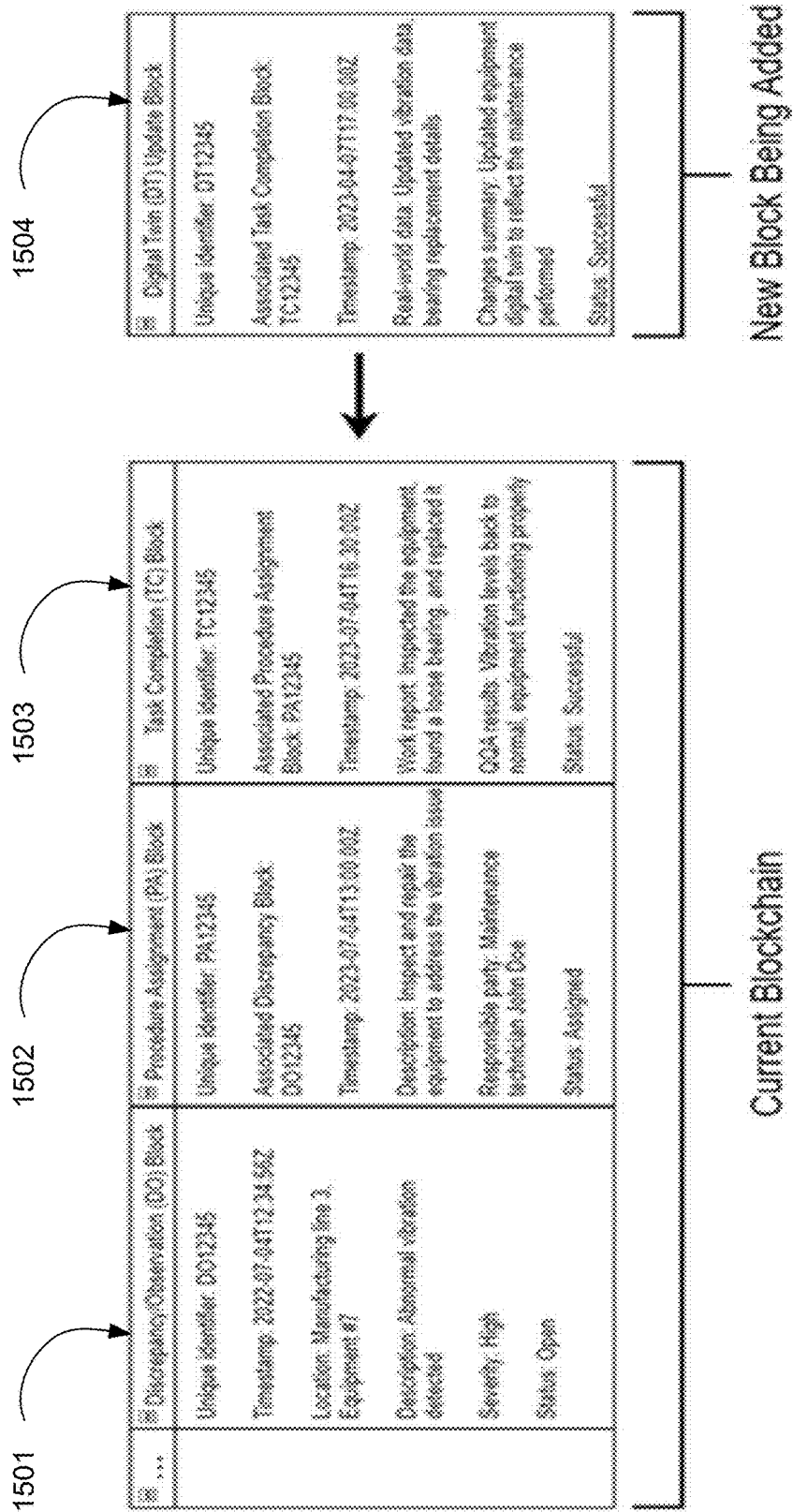
FIG. 29 illustrate an example of a block being added to the end of the blockchain after a maintenance procedure was performed and the system's digital twin was updated.

FIG. 29 illustrate an example of a block being added to the end of the blockchain after a maintenance procedure was performed and the system's digital twin was updated.

Non-Exclusive Set of General Types of Use-Cases

Agricultural equipment maintenance, Airport runway and infrastructure maintenance, Amusement park ride maintenance, Artwork and cultural heritage preservation, Avalanche prevention and monitoring, Bridge inspections and maintenance, Building and infrastructure inspections, Chemical plant equipment maintenance, Dam and levee inspections and maintenance, Data center equipment maintenance, Elevator and escalator maintenance, Environmental monitoring and cleanup, Flood management infrastructure maintenance, Forest management and wildfire prevention, HVAC system maintenance and optimization, Hotel and resort facility maintenance, Industrial robot maintenance, Medical equipment maintenance, Mining equipment maintenance, National park and protected area management, Natural disaster recovery and reconstruction, Nuclear facility maintenance and decommissioning, Oil and gas pipeline inspections, Port and harbor infrastructure maintenance, Power grid and transformer maintenance, Power plant equipment maintenance, Production line optimization and maintenance, Public transportation maintenance (e.g., buses, trams), Railway track and rolling stock maintenance, Road and highway maintenance, Sewer and stormwater system maintenance, Shipping and maritime vessel maintenance, Smart city infrastructure maintenance, Solar panel maintenance, Spacecraft and satellite maintenance, Stadium and arena upkeep, Submarine cable system maintenance, Traffic signal and streetlight maintenance, Tunnel and underground facility maintenance, Vehicle fleet management and maintenance, Warehouse and logistics equipment maintenance, Waste management facility maintenance, Water and wastewater treatment plant maintenance, Wildlife habitat restoration and maintenance, Wind turbine upkeep.

Novel Components
1. Rewinding digital twin states: The ability to rewind the digital twin to previous known states, allowing for enhanced testing, simulation, and analysis of historical events.
2. Integration with blockchain: Combining digital twins with a blockchain-based back end, providing increased security, transparency, and interoperability compared to traditional CMMS software.
3. Smart contracts: Automating interactions between different types of blocks using smart contracts, streamlining processes, and reducing manual intervention.
4. Decentralized and tamper-proof records: Ensuring that the entire maintenance history is securely stored in a decentralized, tamper-proof manner, protecting against data manipulation and fraud.
5. Real-time updates: Updating digital twins with real-world data in real-time, ensuring accurate and up-to-date information for decision-making.
6. Enhanced transparency: Providing stakeholders with transparent, auditable records of maintenance events, fostering trust and accountability.

7. Improved root cause analysis: Leveraging the ability to rewind digital twin states for thorough root cause analysis when system failures or issues occur.
8. Predictive maintenance: Utilizing historical data and simulations to develop predictive maintenance strategies, reducing downtime and maintenance costs.
9. Training and validation: Utilizing simulations of previous states for improved training of maintenance personnel and validation of maintenance procedures, tools, and equipment.
10. Cross-industry applicability: Providing a versatile solution that can be implemented in various industries, addressing diverse maintenance management challenges.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for parallel content authoring conversion, the method comprising:
providing, by a memory storage device, a legacy document for conversion;
identifying one or more procedure steps of a source procedure from one or more source information of the legacy document;
parsing the identified one or more procedure steps into one or more components;
categorizing the parsed one or more components;
generating one or more workflow images or one or more workflow videos from one or more source images or from known information of the one or more procedure steps;
storing, by the memory storage device, the categorized one or more components into a workflow data structure as one or more converted workflow steps;
associating the one or more converted workflow steps with a portion of a 3D model of equipment within a mixed reality environment; and
enabling, through the mixed reality environment, access and editing of the 3D model of equipment;
wherein the steps are identified by of one or more methods of identifications consisting of: a user manually selecting the steps, programmatically, observed interactions, and machine learning algorithms.

2. The method of claim 1, wherein the legacy document is selected from the group consisting of: video, text, voice recordings, and augmented reality.

3. The method of claim 1, wherein the one or more components are parsed by one or more methods of parsing consisting of artificial intelligence classification or advanced human tool sets.

4. The method of claim 1, further comprising leveraging artificial intelligence-based technology by generating 3D scene information from prompts or extracting visual information from multimedia sources.

5. The method of claim 1, wherein the one or more components is selected from the group of characteristics consisting of: verbs, objects, tools used, and reference images.

6. The method of claim 1, wherein the legacy document is a plurality of unstructured data.

7. The method of claim 1, wherein the legacy document is a plurality of interactive modality-derived information.

8. The method of claim 1, wherein each of the categorized one or more components comprises a maintenance action, a maintenance tool, and maintenance instructions.

9. A system for parallel content authoring conversion, the system comprising a non-transitory computer readable medium storing instruction for execution by a processor, wherein the instructions comprise instructions to:
provide, by a memory storage device, a legacy document for conversion;
identify one or more steps of a source procedure from one or more source information of the legacy document;
parse the identified one or more procedure steps into one or more components;
categorize the parsed one or more components;
generate one or more workflow images or one or more workflow videos from one or more source images or from known information of the one or more procedure steps;
store, by the memory storage device, the categorized one or more components into a workflow data structure as one or more converted workflow steps;
associate the one or more converted workflow steps with a portion of a 3D model of equipment within a mixed reality environment; and
enable, through the mixed reality environment, access and editing of the 3D model of equipment;
wherein the steps are identified by of one or more methods of identifications consisting of: a user manually selecting the steps, programmatically, observed interactions, and machine learning algorithms.

10. The method of claim 9, wherein the legacy document is selected from the group consisting of: video, text, voice recordings, and augmented reality.

11. The method of claim 9, wherein the one or more components are parsed by one or more methods of parsing consisting of artificial intelligence classification or advanced human tool sets.

12. The method of claim 9, further comprising: leverage Artificial intelligence-based technology by generating 3D scene information from prompts or extracting visual information from multimedia sources.

13. The method of claim 9, wherein the one or more components is selected from the group of characteristics consisting of: verbs, objects, tools used, and reference images.

14. The method of claim 9, wherein the legacy document is a plurality of unstructured data.

15. The method of claim 9, wherein the legacy document is a plurality of interactive modality-derived information.

16. The method of claim 9, wherein each of the categorized one or more components comprises a maintenance action, a maintenance tool, and maintenance instructions.

17. A parallel content authoring conversion device comprising:
a processor, a memory device, and an augmented reality system configured to perform a method comprising:
providing, by a memory storage device, a legacy document for conversion;
identifying one or more steps of a source procedure from one or more source information of the legacy document;
parsing the identified one or more procedure steps into one or more components;
categorizing the parsed one or more components;
generating one or more workflow images or one or more workflow videos from one or more source images or from known information of the one or more procedure steps;
storing, by the memory storage device, the categorized one or more components into a workflow data structure as one or more converted workflow steps; and
associating the one or more converted workflow steps with a portion of a 3D model of equipment within a mixed reality environment;
enabling, through the mixed reality environment, access and editing of the 3D model of equipment; and
leveraging artificial intelligence-based technology by generating 3D scene information from prompts or extracting visual information from multimedia sources;
wherein the legacy document is selected from the group consisting of video, text, voice recordings, and augmented reality;
wherein the steps are identified by of one or more methods of identifications consisting of: a user manually selecting the steps, programmatically, observed interactions, and machine learning algorithms;
wherein the one or more components are parsed by one or more methods of parsing consisting of artificial intelligence classification or advanced human tool sets;
wherein the one or more components is selected from the group of characteristics consisting of: verbs, objects, tools used, and reference images;
wherein the legacy document is a plurality of unstructured data;
wherein the legacy document is a plurality of interactive modality-derived information; and
wherein each of the categorized one or more components comprises a maintenance action, a maintenance tool, and maintenance instructions.

* * * * *